(12) United States Patent
Filippou et al.

(10) Patent No.: US 12,156,071 B2
(45) Date of Patent: Nov. 26, 2024

(54) V2X SERVICES FOR PROVIDING JOURNEY-SPECIFIC QoS PREDICTIONS

(71) Applicant: Intel Corporation, Santa Clara, CA (US)

(72) Inventors: Miltiadis Filippou, Munich (DE); Dario Sabella, Munich (DE)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 17/437,553

(22) PCT Filed: May 6, 2020

(86) PCT No.: PCT/US2020/031715
§ 371 (c)(1),
(2) Date: Sep. 9, 2021

(87) PCT Pub. No.: WO2020/227435
PCT Pub. Date: Nov. 12, 2020

(65) Prior Publication Data
US 2023/0074288 A1    Mar. 9, 2023

Related U.S. Application Data

(60) Provisional application No. 62/854,871, filed on May 30, 2019, provisional application No. 62/844,413, filed on May 7, 2019.

(51) Int. Cl.
*H04W 28/02* (2009.01)
*H04W 4/024* (2018.01)
*H04W 4/40* (2018.01)

(52) U.S. Cl.
CPC ....... *H04W 28/0226* (2013.01); *H04W 4/024* (2018.02); *H04W 4/40* (2018.02)

(58) Field of Classification Search
CPC .... H04W 28/0226; H04W 4/024; H04W 4/40
(Continued)

(56) References Cited

U.S. PATENT DOCUMENTS

| | | | |
|---|---|---|---|
| 2012/0013093 A1 | 5/2012 | Tamano | |
| 2014/0008938 A1 | 3/2014 | Diaz et al. | |
| 2022/0039082 A1* | 2/2022 | Belleschi | H04W 72/51 |

FOREIGN PATENT DOCUMENTS

| | | | |
|---|---|---|---|
| JP | 5696541 B2 | | 4/2015 |
| JP | 6450672 B2 | | 1/2019 |
| WO | WO 2016-123497 A1 | | 8/2016 |

OTHER PUBLICATIONS

ETSI GR MEC 017, "Mobile Edge Computing (MEC); Deployment of Mobile Edge Computing in an NFV environment", Feb. 2018, 32 pages, V1.1.1, France.

(Continued)

*Primary Examiner* — Faisal Choudhury
(74) *Attorney, Agent, or Firm* — Schwabe, Williamson & Wyatt, P.C.

(57) ABSTRACT

Disclosed embodiments are related to techniques for implementing Vehicle-to-Everything (V2X) communications in Multi-access Edge Computing (MEC) systems and networks. V2X system scenarios characterized by high mobility and dynamic topologies, where the accuracy and timeliness of radio network information, location information may be hampered by environmental conditions and deployment density of network infrastructure. The disclosed embodiments provide a V2X Information Service (VIS) framework for cooperative acquisition, partitioning, and distribution of information for efficient, journey-specific quality-of-service (QoS) predictions. The VIS framework identifies space/time correlations between radio condition/quality data collected in V2X system(s) and a vehicle's planned journey for better prediction of the radio conditions/

(Continued)

quality of the communication network along the designated route. As a consequence, the VIS may expose journey-specific information about the QoS prediction to authorized devices. Other embodiments may be described and/or claimed.

24 Claims, 21 Drawing Sheets

(58) Field of Classification Search
USPC ......................................................... 370/230
See application file for complete search history.

(56) References Cited

OTHER PUBLICATIONS

ETSI GR MEC 022, "Multi-access Edge Computing(MEC); Study on MEC Support for V2X Use Cases", Sep. 2018, 19 pages, V2.1.1, France.
ETSI GR MEC 002, "Multi-access Edge Computing (MEC); Phase 2: Use Cases and Requirements", Oct. 2018, 66 pages, V2.1.1, France.
ETSI GR MEC 003, "Multi-access Edge Computing (MEC); Framework and Reference Architecture", Jan. 2019, 21 pages, V2.1.1, France.
ETSI GR MEC 012. "Mobile Edge Computing (MEC); Radio Network Information API", Jul. 2017, 57 pages, V1.1.1, France.
ETSI GR MEC 013, "Mobile Edge Computing (MEC); Location API", Jul. 2017, 24 pages, V1.1.1, France.
ETSI GR MEC 015, "Mobile Edge Computing(MEC); Bandwidth Management API", Oct. 2017, 20 pages, V1.1.1, France.
ETSI GR MEC 029, "Multi-access Edge Computing(MEC); Fixed Access Information API", Jul. 2019, 50 pages, V2.1.1, France.
ETSI GS NFV-IFA 004, "Network Functions Virtualisation (NFV) Release 2; Acceleration Technologies; Management Aspects Specification", Feb. 2018, 25 pages, V2.4.1, France.
ETSI GS NFV-IFA 009, "Network Functions Virtualisation (NFV); Management and Orchestration; Report on Architectural Options", Jul. 2016, 31 pages, V1.1.1, France.
ETSI GS NFV-IFA 003, "Network Functions Virtualisation (NFV) Release 2; Acceleration Technologies; vSwitch Benchmarking and Acceleration Specification", Feb. 2018, 22 pages, V2.4.1, France.
ETSI GS NFV-IFA 005, "Network Functions Virtualisation (NFV) Release 3; Management and Orchestration; Or-Vi reference point—Interface and Information Model Specification", Apr. 2019, 193 pages, V3.2.1, France.
ETSI TS 123 032, "Digital cellular telecommunications system (Phase 2+) (GSM); Universal Mobile Telecommunications System (UMTS); Universal Geographical Area Description (GAD) (3GPP TS 23.032 version 15.1.0 Release 15)", Sep. 2018, 33 pages, V15.1.0, France.
T. Berners-Lee et al., "Uniform Resource Identifier (URI): Generic Syntax", Jan. 2005, 61 pages.
J. Polk et al., "Dynamic Host Configuration Protocol Options for Coordinate-Based Location Configuration Information", Jul. 2011, 36 pages.
D. Hardt, "The OAuth 2.0 Authorization Framework", Oct. 2012, 76 pages.
M. Jones et al., "The OAuth 2.0 Authorization Framework: Bearer Token Usage", Oct. 2012, 18 pages.
M. Nottingham, "Uri Design and Ownership", Jul. 2014, 9 pages.
W. Denniss et al., "OAuth 2.0 for Native Apps", Oct. 2017, 21 pages.
ETSI GS MEC 028, "Multi-access Edge Computing (MEC); WLAN Information API", Jun. 2020, 46 pages, V2.1.1, France.
Mario Collotta et al., "A Fuzzy Data Fusion Solution to Enhance the QoS and the Energy Consumption in Wireless Sensor Networks", 2017, 11 pages, vol. 2017, Article ID 3418284.
Ya Luo et al., "Data Fusion in Wireless Communication Network Node Positioning", Dec. 27, 2018, 10 pages, vol. 6, No. 6, ISSN: 2054-7420, China.
Luis Torres-Figueroa et al., "QoS Evaluation and Prediction for C-V2X Communication in Commercially-Deployed LTE and Mobile Edge Networks", Feb. 18, 2020, 7 pages, arXiv:2002.07883v1, Germany.
Hao Ye et al., "Machine Learning for Vehicular Networks", Feb. 26, 2018, 16 pages, arXiv:1712.07143v2.
International Search Report and Written Opinion mailed Aug. 24, 2020 for International Patent Application No. PCT/US2020/031715, 13 pages.
3GPP TS 22.261, "3rd Generation Partnership Project; Technical Specification Group Services and System Aspects; Service requirements for the 5G system; Stage 1 (Release 16)", Mar. 2019, 72 pages, v16.7.0, Valbonne, France.
3GPP TS 23.285 , "3rd Generation Partnership Project; Technical Specification Group Services and System Aspects; Architecture enhancements for V2X services (Release 16)", Mar. 2019, 37 pages, V16.0.0 , Valbonne, France.
3GPP TS 23.501, "3rd Generation Partnership Project; Technical Specification Group Services and System Aspects; System Architecture for the 5G System; Stage 2 (Release 16)", Apr. 2019, 317 pages, V16.0.2, Valbonne, France.
3GPP TS 28.531, "3rd Generation Partnership Project; Technical Specification Group Services and System Aspects; Management and orchestration; Provisioning; (Release 15)", Mar. 2019, 65 pages, V15.2.0, Valbonne, France.
3GPP TS 28.532, "3rd Generation Partnership Project; Technical Specification Group Services and System Aspects; Management and orchestration; Generic management services; (Release 15)", Mar. 2019, 162 pages, V15.2.0, Valbonne, France.
3GPP TS 29.387, "3rd Generation Partnership Project; Technical Specification Group Core Network and Terminals; V2X Control Function to V2X Application Server Aspects; Stage 3 (Release 14)", Oct. 2016, 7 pages, V0.1.0, Valbonne, France.
3GPP TS 29.388, "3rd Generation Partnership Project; Technical Specification Group Core Network and Terminals; V2X Control Function to Home Subscriber Server (HSS) aspects (V4); Stage 3 (Release 15)", Jun. 2018, 28 pages, V15.0.0, Valbonne, France.
3GPP TS 29.389, "3rd Generation Partnership Project; Technical Specification Group Core Network and Terminals; Inter-V2X Control Function Signalling aspects (V6); Stage 3 (Release 15)", Jun. 2018, 21 pages, V15.0.0, Valbonne, France.
3GPP TS 36.214, "3rd Generation Partnership Project; Technical Specification Group Radio Access Network; Evolved Universal Terrestrial Radio Access (E-UTRA); Physical layer; Measurements (Release 15)", Sep. 2018, 25 pages, V15.3.0, Valbonne, France.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2019, 363 pages, V15.5.0, Valbonne, France.
3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", Mar. 2019, 131 pages, V15.5.0, Valbonne, France.
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 15)", Apr. 2019, 948 pages, V15.5.1, V15.5.0, Valbonne, France.
3GPP TS 38.214, "3rd Generation Partnership Project;Technical Specification Group Radio Access Network; NR; Physical layer procedures for data (Release 15)", Mar. 2019, 103 pages, V15.5.0, Valbonne, France.
3GPP TS 38.215, "3rd Generation Partnership Project; Technical Specification Group Radio Access Network; NR; Physical layer measurements (Release 15)", Dec. 2018, 15 pages, V15.4.0, Valbonne, France.

(56) References Cited

OTHER PUBLICATIONS

3GPP TS 38.300, "3rd Generation Partnership Project; Technical Specification Group Radio Access Network; NR; NR and NG-RAN Overall Description; Stage 2 (Release 15)", Mar. 2019, 97 pages, V15.5.0, Valbonne, France.
3GPP TS 38.321, "3rd Generation Partnership Project; Technical Specification Group Radio Access Network; NR; Medium Access Control (MAC) protocol specification (Release 15)", Mar. 2019, 78 pages, V15.5.0, Valbonne, FRANCE.
3GPP TS 38.331, "3rd Generation Partnership Project; Technical Specification Group Radio Access Network; NR; Radio Resource Control (RRC) protocol specification (Release 15)", Apr. 2019, 491 pages, V15.5.1, Valbonne, FRANCE.
Intel Corporation, "MEC002—In-vehicle MEC hosts supporting automotive workloads", 2018, 4 pages.

* cited by examiner

V2X SERVICES FOR PROVIDING JOURNEY-SPECIFIC QoS PREDICTIONS

RELATED APPLICATIONS

The present application is a national phase entry under 35 U.S.C. § 371 of International Application No. PCT/US2020/031715, filed on May 6, 2020, which claims priority to U.S. Provisional App. No. 62/844,413, filed on May 7, 2019, and U.S. Provisional App. No. 62/854,871, filed on May 30, 2019, the contents of each of which are hereby incorporated by reference in their entireties.

TECHNICAL FIELD

Embodiments described herein generally relate to edge computing, network communication, and communication system implementations, and in particular, to techniques for implementing Vehicle-to-Everything (V2X) communications in Multi-access Edge Computing (MEC) systems and networks.

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network.

However, these advanced use cases have also introduced a number of corresponding technical challenges related to security, processing/computing resources, network resources, service availability and efficiency, among many other issues. With respect to Vehicle-to-Everything (V2X) services, there are currently no mechanisms to efficiently predict the Quality of Service (QoS) along a vehicle's planned trajectory or travel route.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
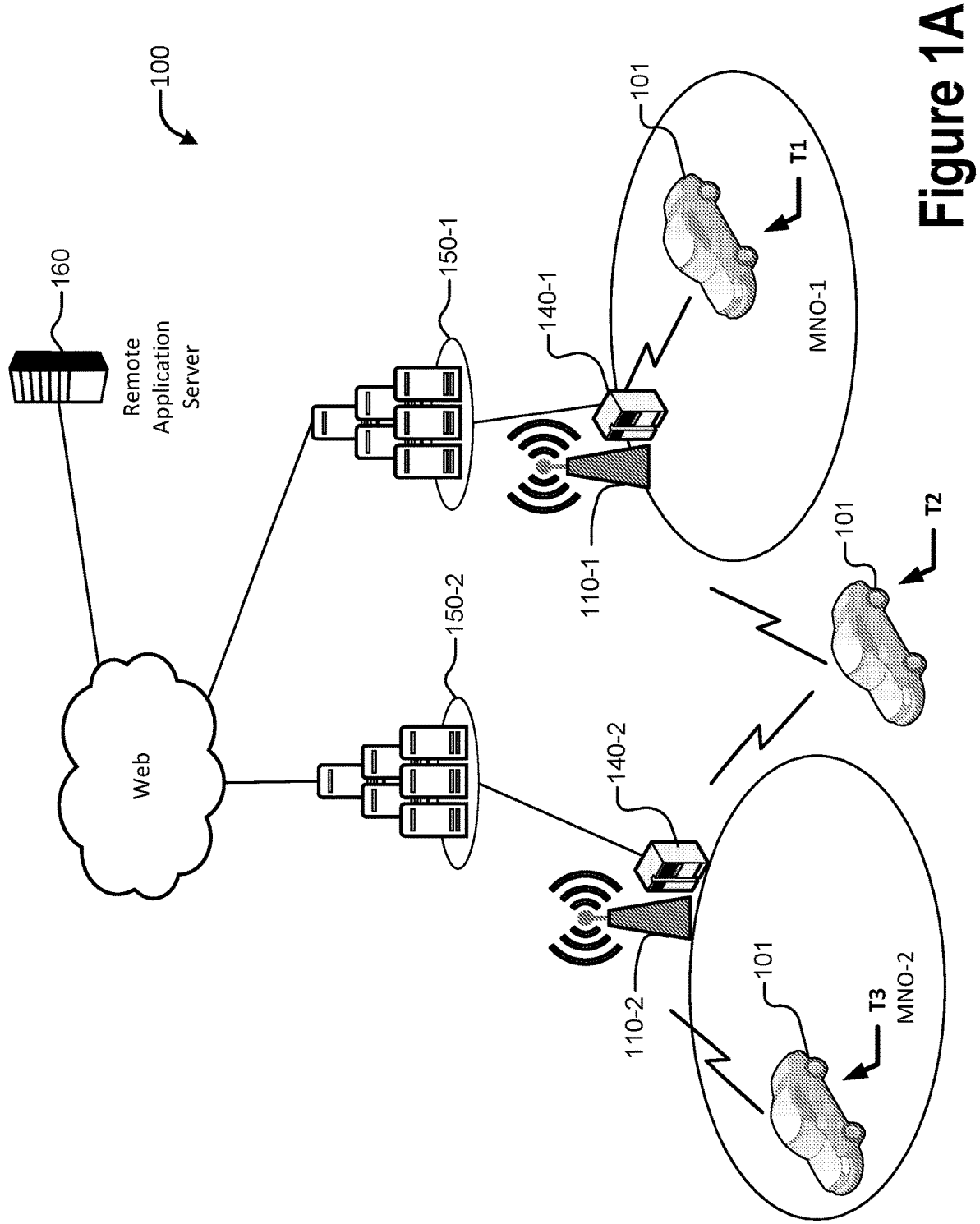
FIGS. 1A and 1B depict an example V2X communication system utilizing MEC technology providing support for V2X applications, according to various embodiments.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment. In particular, disclosed embodiments are related to techniques for implementing Vehicle-to-Everything (V2X) communications in Multi-access Edge Computing (MEC) systems. V2X system scenarios characterized by high mobility and dynamic topologies, where the accuracy and timeliness of radio network information, location information may be hampered by environmental conditions and deployment density of network infrastructure. The disclosed embodiments provide V2X Information Service (VIS) framework for cooperative acquisition, partitioning, and distribution of information for efficient, journey-specific quality-of-service (QoS) predictions. The VIS framework identifies space/time correlations between radio condition/quality data collected in V2X system(s) and a vehicle's planned journey for better prediction of the radio conditions/quality of the communication network along the designated route. As a consequence, the VIS may expose journey-specific information about the QoS prediction to authorized devices. Other embodiments may be described and/or claimed. Accurate and timely predictions of the radio environment at various intermediate locations along a planned route/journey can either trigger, modify, or postpone enablement/activation of certain V2X functionalities and/or data transfers between user equipment (UE) and network infrastructure (including downlink (DL) and uplink (UL) data transfers). Other embodiments may be described and/or claimed.

I. MEC V2X Information Services (VIS)

The Vehicle-to-Everything (V2X) applications (referred to simply as "V2X") include the following four types of communications Vehicle-to-Vehicle (V2V), Vehicle-to-Infrastructure (V2I); Vehicle-to-Network (V2N), and Vehicle-to-Pedestrian communications (V2P). V2X applications can use co-operative awareness to provide more intelligent services for end-users. This means that entities, such as vehicle stations or vehicle user equipment (vUEs), roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like. V2X applications utilize an underlying access technology or radio access technology (RAT) to convey messages for cooperative awareness. These RATs may include, for example, IEEE 802.11p based protocols such as DSRC and ITS-G5, 3GPP cellular-based protocols such as 5G-V2X and/or LTE-V2X protocols. Although the embodiments herein are discussed in the context of automotive vehicles, the embodiments may also apply to other types of vehicles including, aircraft, watercraft, and/or the like.

Multi-access Edge Computing (MEC) is a technology that allows applications to be instantiated at the edge of an access network, and provides a low-latency and a close proximity environment to user equipment (UEs). As a result, vertical industries, such as the automotive industry, are expected to significantly benefit from the deployment of MEC infrastructure together with the deployment of Radio Access Networks (RANs). These RANs may be operated by different MNOs and/or operate different RATs.

Wireless communication is a key enabling technology of co-operative intelligent transportation systems (ITS). Road users (e.g., vehicles, cyclists, and pedestrians) involved in V2X communication may use services provided by different operators providing different networks and/or using different Radio Access Technologies (RATs). Environments that include networks provided by different operations and that include different RATs are referred to as "multi-vendor, multi-network, and multi-access environments." Examples of multi-vendor, multi-network, and multi-access environments are shown by FIGS. 1A and 1B.

Figure 1B:
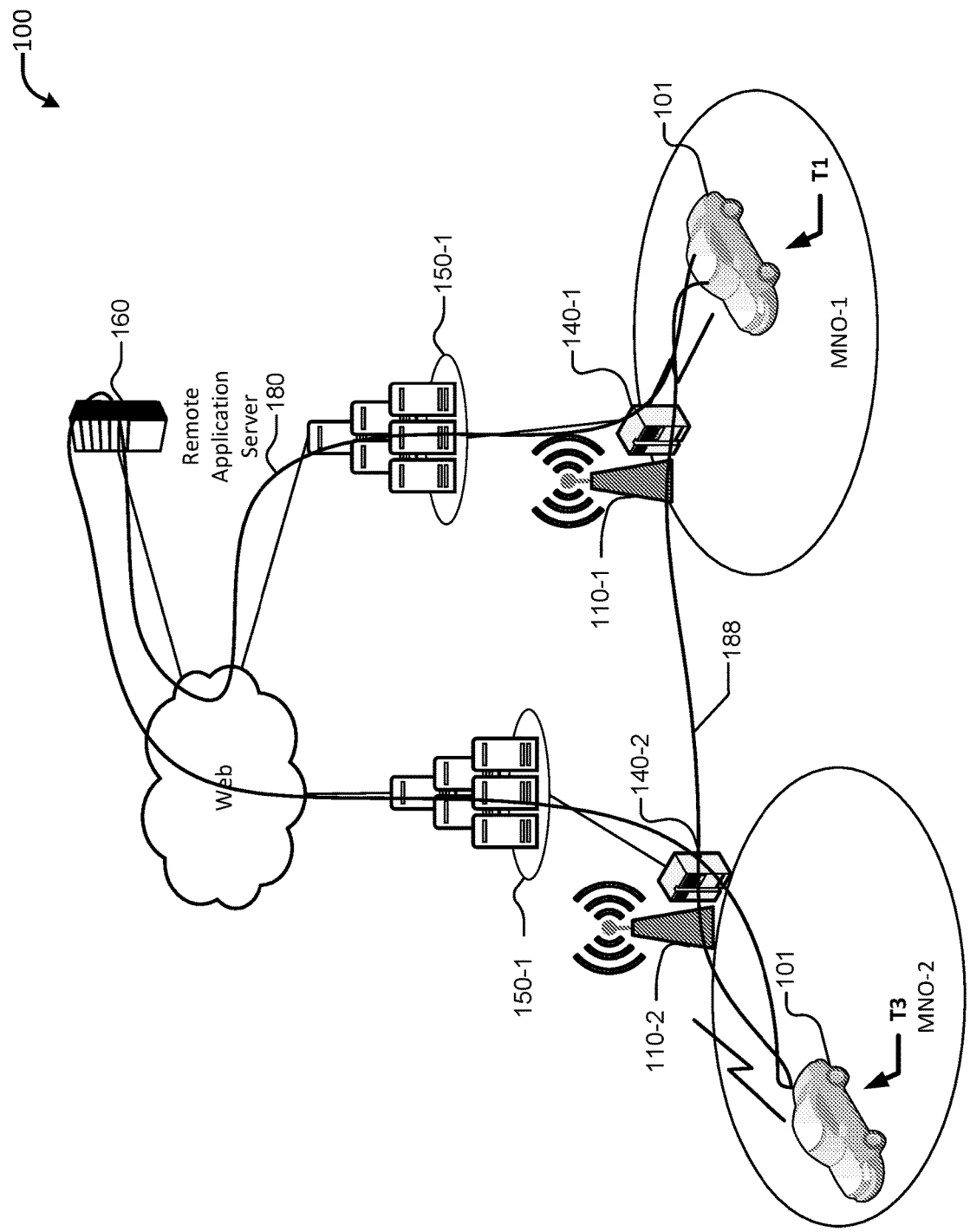

FIG. 1A depicts an example V2X communication system 100 utilizing MEC technology providing support for V2X applications. Specifically, FIG. 1A depicts a V2X communication system 100 involving the use of a MEC system, where a Road Operator (or an ITS operator) is aiming at offering V2X services in a cross-country, cross-operator, cross-vendor environment. The MEC system supports and/or provides various services to endpoint devices (e.g., vehicle UEs (vUEs) 101 in FIG. 1A), each of which may have different requirements or constraints. For example, some services may have priority or Quality of Service (QoS) constraints (e.g., traffic data for autonomous vUEs 101 may have a higher priority than infotainment data), reliability and resiliency (e.g., traffic data may require mission-critical reliability, while infotainment data may be allowed some error variance), as well as power, cooling, and form-factor constraints. A variety of interfaces are used by a UE application (app) to request the MEC system to run an app (e.g., MEC app) in the MEC system, or to move an app in or out of the MEC system. Such interfaces include, for example, the Mp3 reference point used for internal MEC management, used for control communication between MEC platforms, and the Mx2 reference point used for external access.

In the typical multi-operator scenario, multiple operators (e.g., MNO-1 and MNO-2 in FIG. 1A) provide infrastructure to enable network connectivity for vehicle user equipment (vUEs) 101 (also referred to as "vehicle stations," "vehicle ITS stations," or "V-ITS-S") including for example, Network Access Node (NAN) 110-1 and core network 150-1 provided by MNO-1 and NAN 110-2 and core network 150-2 provided by MNO-2. An "operator" refers to an entity or organization that owns or controls infrastructure equipment (including radio infrastructure, core network and/or back haul infrastructure, and the like) necessary to provide communications and/or network-related services, including radio spectrum allocation including one or more radio spectrum licenses from a regulatory agency, billing and subscription-related services, device provisioning, and/or other like services. An operator provides technical capabilities to access a mobile network or wireless environment using an Over-the-Air (OTA) or wireless communication channel. The term "operator" as used herein may be considered synonymous to and/or referred to as a network operator, mobile network operator (MNO), cellular network operator, wireless service provider, wireless carrier, mobile network carrier, virtual MNO, and/or the like.

Furthermore, the NANs 110-1 and 110-2 may be macro cell base stations, remote radio heads (RRHs), small and/or micro cell base stations, access points (APs), and/or other like network elements. The APs may be, for example, wireless routers, roadside ITS stations or roadside units, gateway appliances, central hubs, or the like. The base stations may be, for example, 3GPP Long Term Evolution (LTE) evolved NodeBs (eNBs), 3GPP 5G/NR next generation NodeBs (gNBs), and/or the like. A collection of NANs 110 may be referred to as an "access level edge network" or "access level edge." The NANs 110 are configurable or operable to perform setup of transport resources, (e.g., for CDN services and/or other application level services) as well as scheduling signaling resources for providing network service of the underlying access network/RAT.

In the example of FIG. 1A, NAN 110-1 is co-located with a MEC host 140-1 and NAN 110-2 is co-located with a MEC host 140-2. The MEC Hosts 140 are entities that contain a MEC platform and a virtualization infrastructure to provide compute, storage and network resources to MEC apps. A MEC platform is a collection of functionality (including hardware and software elements) that is required to run MEC apps on a specific MEC host's 140 virtualization infrastructure and to enable them to provide and consume MEC services, and that can provide itself a number of MEC services. MEC apps are applications that can be instantiated on a MEC host 140 within the MEC system 100 and can potentially provide or consume MEC services, and MEC services are services provided via a MEC platform either by the MEC platform itself or by a MEC app. The MEC hosts 140 may be provided by MNO-1 and MNO-2, respectively, or the MEC hosts 140 may be provided by a separate edge networking service provider. In this example, the vUE 101 at T1 is able to receive network connectivity from MNO-1 via the NAN 110-1 and core network 150-1, and is able to receive services from the remote application server 160 via the MNO-1 infrastructure. As the vUE 101 travels, a temporary absence of radio coverage is experienced by vUE 101 at T2 resulting in a roaming situation, and is then able to receive service via the MNO-2 infrastructure (e.g., the NAN 110-2 and core network 150-2). The core networks 150 may be, for example, LTE or 5G/NR core networks.

One challenging situation is when ITS operators attempt to provide the same or continuous V2X service to vUEs 101 connected to different operators (e.g., MNO-1 and MNO-2) even in temporary absence of radio coverage. This use case is also complicated by the presence of multiple MEC vendors, which leads to the need to enable communication between different MEC systems. This use case is further complicated when UE apps have relatively high QoS constraints. Furthermore, the allocation of sufficient radio resources within a cell coverage area of a NAN 110 does not necessarily guarantee a particular QoS (or QoS performance) in V2X communications. Poor QoS performance is also linked to poor signal reception due to lack of coverage, signal interference, inefficient handover mechanisms, and inadequate transmission power management and handover mechanisms at the NANs 110.

As shown by FIG. 1B, in a traditional V2X system (without VIS service) the interconnection between MNOs (e.g., MNO-1 and MNO-2) is terminated at the remote side (e.g., remote application server 160), with clear disadvantages in terms of high end-to-end (e2e) latency. On the other hand, exploitation of the VIS service, which enables a "horizontal communication" over interconnection 188 between MEC systems 140, the interconnection between MNOs can be realized with low e2e latency. VIS exposes information on PC5 configuration parameters along with information related to the Uu interface (e.g., unicast and Multimedia Broadcast Multicast Service (MBMS)), and manages multi-operator environments, which allows vUEs 101 leaving the coverage area of one MNO-1 and entering the coverage area of another MNO-2 to continue to receive service without any service disruption and guaranteeing e2e performance.

V2X applications and services include, for example, safety apps/services, convenience apps/services, advanced driving assistance apps/services, and vulnerable road user (VRU) apps/services, among many others. Examples of the safety apps/services include Intersection Movement Assist (IMA) and Queue Warning (QW). IMA is designed to avoid intersection crossing crashes by warning drivers of vehicles approaching from a lateral direction at an intersection. Intersection crashes include intersection, intersection-related, driveway/alley, and driveway access related crashes. QW queue of vehicles on the road may pose a potential danger and cause delay of traffic (e.g., when a turning queue extends to other lanes). Using the V2X services, the queue information can be made available to other vUEs 101 beforehand, which minimizes the likelihood of crashes and allows for mitigation actions.

Convenience apps/services include, for example, telematics, software updates, infotainment, and the like. Some of these apps/services can be implemented with existing access technology and are partly already supported by some car manufacturers. This group of V2X use cases requires cost effective communication to be enabled between the vUEs 101 and backend servers/services.

Advanced driving assistance apps/services (also referred to as "advanced driver-assistance systems" or "ADAS") are electronic systems (comprising hardware and software elements) that help a vehicle driver while driving or parking a vehicle, and typically employ various microcontrollers, electronic control units (ECUs), sensors, and/or power semiconductor devices/systems (collectively referred to herein as "driving control units" or "DCUs") implemented in the vehicle. collect the most challenging requirements for V2X. These apps/services are also applicable to autonomous driving apps/services. These V2X apps/services can require distribution of a relative large amount of data with high reliability and low latency in parallel, and usually benefit from predictive reliability. This means that vUEs 101 utilizing ADAS should have the possibility to receive a prediction of the network availability and/or QoS to plan ahead. Real time situational awareness is essential for autonomous vehicles especially at critical road segments in cases of changing road conditions (e.g., new objects/obstructions detected by another vehicle some time ago, changing weather and/or environmental conditions, and the like). For this and other purposes, the relevant high definition (local) maps need to be made available via downloading from a backend server/service (e.g., remote application server 160). The use case for real time situational awareness and High Definition (Local) Maps should not only be seen as a case to distribute information on relatively slow changing road conditions. The case should be extended to distribute and aggregate locally available information in real time to the traffic participants via road side units. Another ADAS app/service is See-Through (or High Definition Sensor Sharing). In this type of use cases vehicles such as trucks, minivans, cars, etc., in platoons are required to share sensor data such as images/video of road conditions ahead of them to vehicles behind them.

Additionally, ADAS and/or autonomous driving apps/services may involve the use of artificial intelligence (AI) agents and/or machine learning (ML) models operable to observe environmental conditions and determine actions to be taken in furtherance of a particular goal. The particular environmental conditions to be observed and the actions to take may be based on an operational design domain (ODD). An ODD includes the operating conditions under which a given AI agent/ML model or feature thereof is specifically designed to function. An ODD may include operational restrictions, such as environmental, geographical, and time-of-day restrictions, and/or the requisite presence or absence of certain traffic or roadway characteristics. In embodiments, individual AI agents and/or trained ML models/algorithms are configurable or operable to control respective control systems/DCUs of a host vUE 101. In these embodiments, the actions to be taken and the particular goals to be achieved may be specific or individualized based on the control system itself and/or DCUs involved. Additionally, some of the actions or goals may be dynamic driving tasks (DDT), object and event detection and response (OEDR) tasks, or other non-vehicle operation related tasks depending on the particular context in which an AI agent and/or trained ML models/algorithms is implemented. DDTs include all real-time operational and tactical functions required to operate a vUE 101 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task. Some of these features may be triggered by the AI agent/ML model involved, or may be triggered by an external entity such as the remote application server 160 and/or MEC host(s) 140. The events/triggers may be AI agent/ML model specific, and may vary depending on the particular embodiment.

VRUs are non-motorized road users as well as users of VRU vehicles. A "VRU device" refers to a portable device used by a VRU integrating a standard ITS station (e.g. smartphone, tablets, wearables, etc.), although the term "VRU" by itself may refer to both a VRU and a VRU device. VRU-related V2X apps/services utilize information provided by VRUs for the purpose of traffic safety (e.g., collision avoidance, etc.) These apps/services usually require high accuracy of positioning information provided by these traffic participants. Additional means to use available information for better and reliable accuracy is crucial to allow a real-world usage of information shared from VRUs. Cooperation between vehicles and VRUs through their VRU devices is an important key element to improve traffic safety and to avoid accidents.

For these V2X apps/services the MEC system 100 (or MEC hosts 140) provides feedback information from the network to the vUE 101 in support of V2X functions/apps/services, predicting whether a communication channel is currently reliable or not (e.g., in terms of latency requirements, packet arrival rates, QoS for data service/connectivity, and/or the like). The MEC system 100 also provides interoperability by supporting V2X information exchange among vUEs 101 and/or other road users (e.g., VRUs, etc.) connected through different station/equipment types/platforms, access technologies, networks, or MNOs, and enabling multi-operator operation for V2X apps/services and/or individual vUEs 101 to provide service continuity across access network coverage areas nationwide and across borders of different MNO networks. The MEC system 100 (or individual MEC hosts 140) may need to provide timely accurate positioning assisted by available positioning technologies including radio network functions, and/or predictive quality related information to the vehicle when the various connectivity parameters (like Latency, PER, signal-strength, etc.) are going to change. MEC includes a V2X Information Service (VIS) Application Programming Interface (API), which is designed to facilitate V2X interoperability in multi-vendor, multi-network, and multi-access environments for automotive use cases. These use cases may involve different vehicle manufacturers, Original Equipment Manufacturer (OEM) suppliers, network infrastructure vendors, MEC vendors, application/content providers, and other stakeholders.

MNOs are typically region specific or country specific, and provide services directly to their own customers (subscribers) while providing communications to other MNOs' customers at the core network level using interworking between the MNOs' networks. Each MNO operates its own Public Land Mobile Network (PLMN), which is often referred to as a home PLMN (HPLMN) from the perspective of a particular MNO's subscribers or a visiting PLMN (VPLMN) from the perspective of users that are not subscribers of the particular MNO. For vehicular applications, maintaining V2X service continuity (often with low latency requirement) for road users becomes challenging, especially when such road users move from one MNO's coverage area to another MNO's coverage area.

Mobile network level interworking among different PLMNs is used to enable service continuity in such use cases as specified in 3GPP specifications, such as ETSI GS MEC 003 v2.1.1 (2019 January) ("[R05]")[R05], ETSI GS MEC 011 V1.1.1 (2017 July) ("[R08]"), ETSI GS MEC 013 v1.1.1 (2017 July) ("R[10]"), ETSI GS MEC 014 V1.1.1 (2018 February) ("[R11]"), and ETSI GS MEC 015 V1.1.1 (2017 October) ("[R12]"). Furthermore, inter-MEC system coordination is also required to prepare UEs in transit (e.g., based on the agreements among MNOs, roaming, and/or handover to a new PLMN) and reduce interruption time.

The service consumers communicate with the VIS 280 over the V2X API to get the necessary V2X service provisioning information for the visiting PLMN in support of inter-PLMN service continuity. Both MEC applications (apps) and MEC platforms may consume the VIS 280; and both MEC platforms and the MEC apps may be the providers of the V2X information. The V2X API may also be referred to as the "VIS API" or the like. MEC apps and MEC platforms are discussed in more detail infra with respect to FIGS. 14, 15, and 16.

Figure 2:
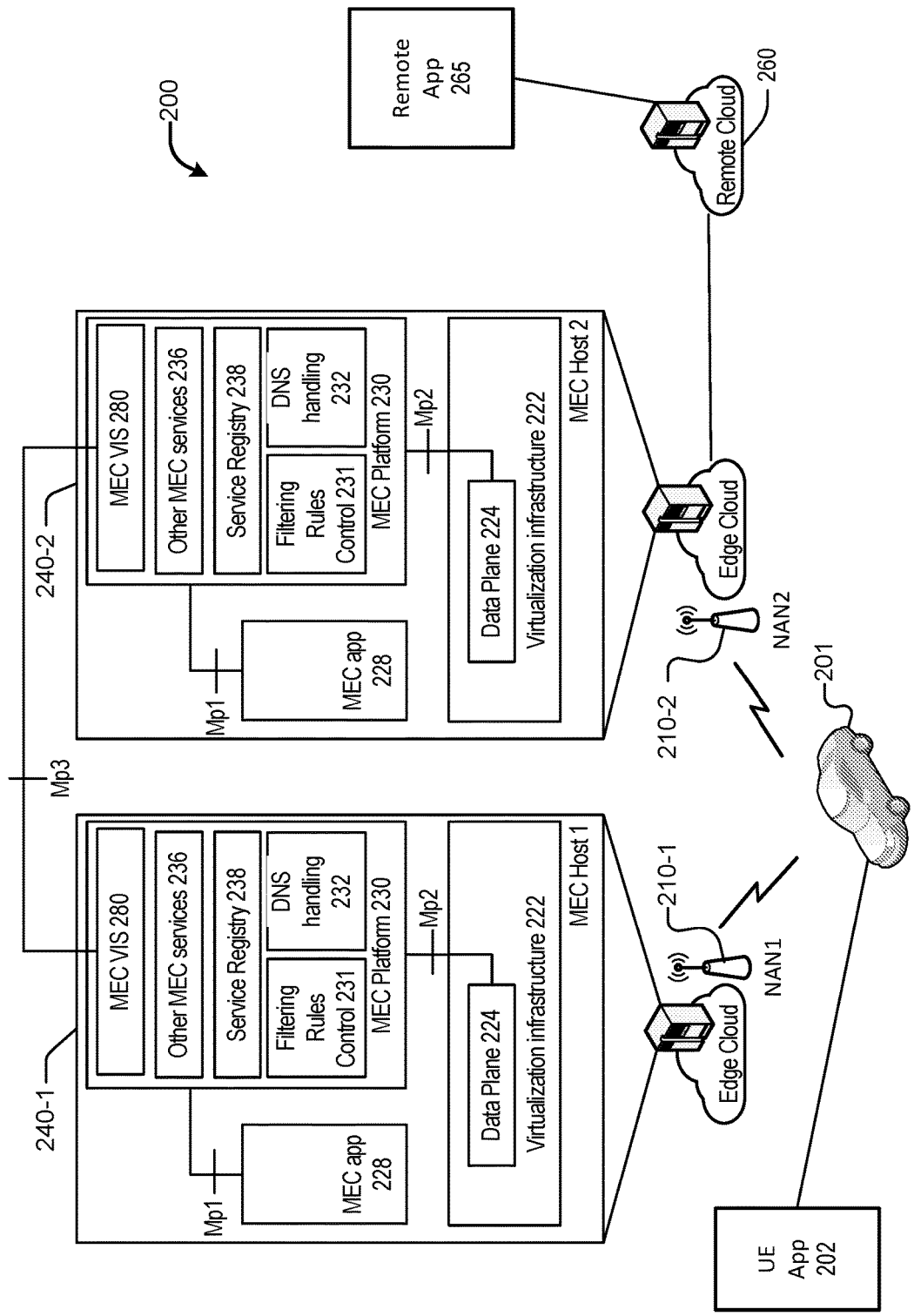
FIG. 2 depicts an example V2X system including a MEC system architecture according to various embodiments.

FIG. 2 illustrates an example V2X system 200 including a MEC system architecture according to various embodiments. The MEC system architecture includes each of the multiple MEC hosts 240 (including MEC host 240-1 and MEC host 240-2), each of which may correspond to the MEC hosts 1502 in the MEC system 1500 of FIG. 15. As mentioned previously, MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X applications need to exchange data, provide data to aggregation points and access to data in databases which provide an overview of the local situation derived from a multitude of sensors (by various cars, roadside units, etc.)

The V2X system 200 involves multiple MEC hosts 240 (including MEC host 240-1 and MEC host 240-2) and the use of the MEC VIS 280. The vUE 201, NANs 210 (including NAN 210-1 and NAN 210-2), MEC hosts 240, and remote cloud 260 may correspond to the vUE(s) 101, NANs 110, and MEC hosts 140 of FIGS. 1A and 1B, respectively. Each of the MEC host 240 and NAN 210 pairs may make up a respective edge cloud, and the remote cloud 260 may include one or more remote application servers (e.g., remote application server 160 of FIGS. 1A and 1B).

In various embodiments, the MEC system 200 (and individual MEC hosts 240) may support the feature V2Xservice. When the MEC system 200 supports the feature V2XService, the MEC system 200 includes the capability to provide feedback information from the network (e.g., the MNO networks in FIGS. 1a-1b and/or the edge clouds in FIG. 2) to the vUE 201 in support of V2X functions, which helps with predicting whether a communication channel is currently reliable or not (e.g. in terms of fulfilling latency requirements and/or a threshold packet arrival). The MEC system 200 supporting V2XService includes the capability to provide quality related information from the network to the vehicle about when the various connectivity parameters (like Latency, PER, signal-strength, etc.) are going to change. The MEC system 200 supporting V2XService includes the capability to provide interoperability by supporting V2X information exchange among road users connected through different access technologies, networks, and/or MNOs. The MEC system 200 supporting V2XService enables multi-operator operation for V2X stations/equipment to provide service continuity across access network coverage nationwide and across borders of different operators' networks. The MEC system 200 supporting V2XService includes the capability to provide interoperability in a multi-operator scenarios, enabling MEC apps in different systems to communicate securely with each other, in order to enable synchronization in multi-operator systems also in absence of cellular coverage (outside of 3GPP domain). The MEC system 200 supporting V2XService includes the capability to provide interoperability in multi-operator scenarios, enabling MEC apps to communicate securely with the V2X-related 3GPP core network logical functions (e.g., V2X control function 350 of FIG. 3 and/or other core network functions) and gathering PC5 V2X relevant information (e.g. PC5 configuration parameters) from the 3GPP network.

In the framework of V2X services, the vUE 201 is hosting a client app (UE app 202 in FIG. 2), and is connected to a certain MEC host 240 (and a related MEC app 228). In presence of multiple MEC hosts 240, the VIS 280 permits exposure of information between MEC apps 228 running on different MEC hosts 240. Each of the MEC hosts 240 can be owned/managed by a different operator or service provider (e.g., a MEC vendor or a third party). MEC apps 228 instantiated on MEC Host 240-1 and MEC Host 240-2 can be used to provide V2X-related services, and can be operated by the mobile services operator, by a MEC vendor, or by a third party (e.g., OEM, or OEM supplier, or system integrator). In addition, other remote application server instances can be located elsewhere, such as in remote cloud 260. Remote cloud 260 may be any type of cloud infrastructure, for example, one or more private clouds owned by an operator or by an OEM. The remote cloud 260 also operates one or more remote apps 265. The VIS 280 may be produced by the MEC platform 230 or by the MEC app 228.

Figure 15:
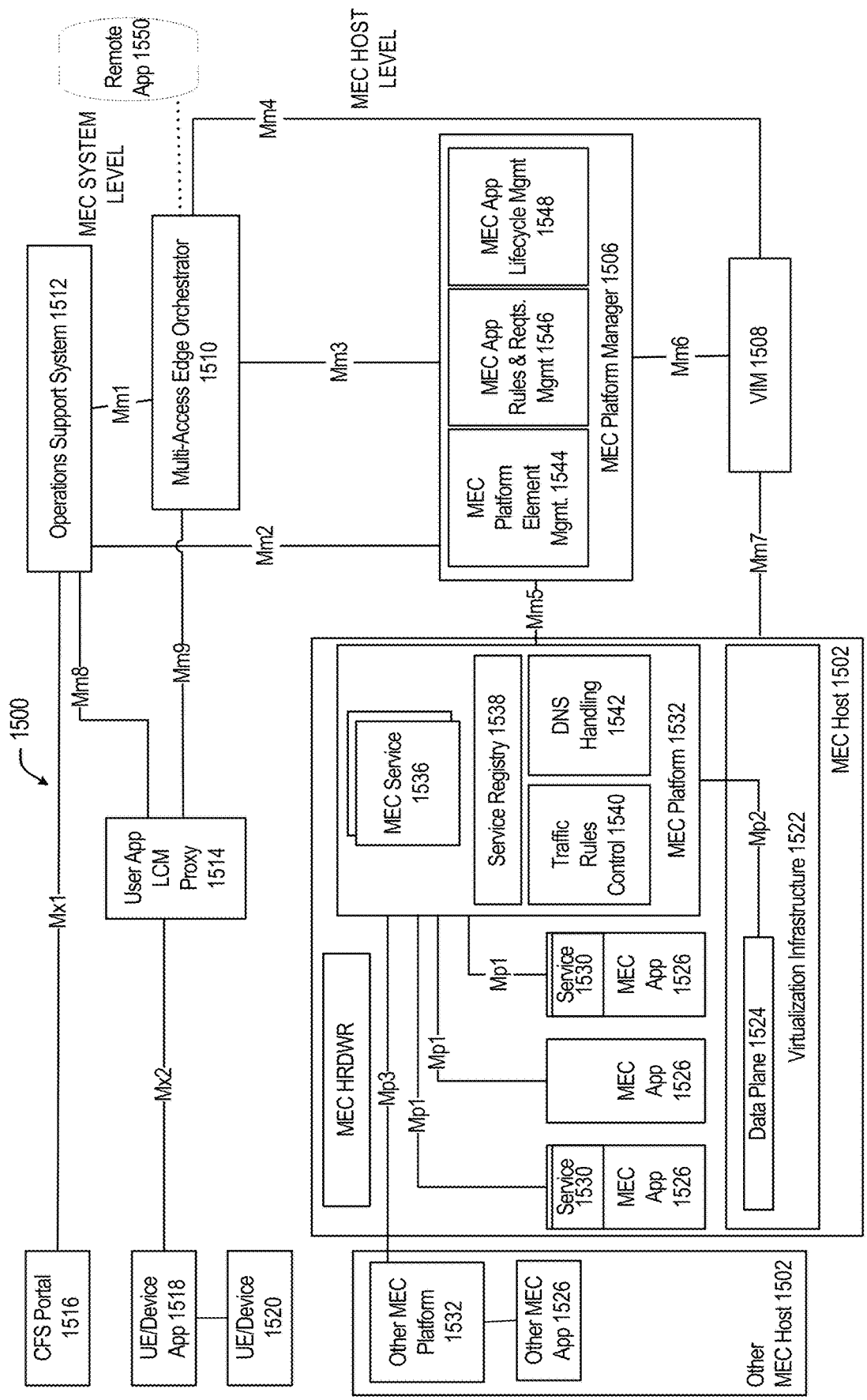
FIG. 15 illustrates an example MEC system reference architecture.
Figure 16:
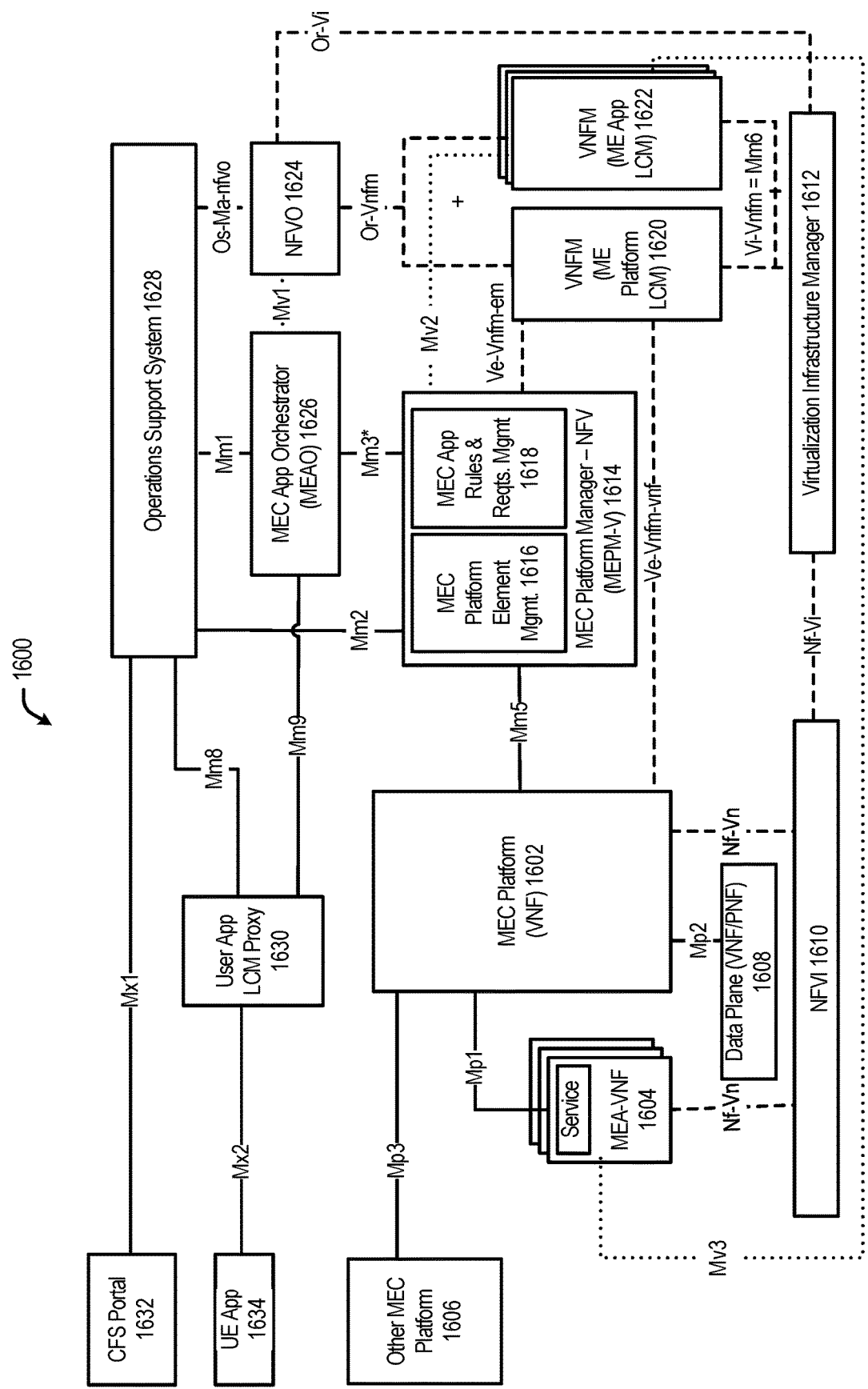
FIG. 16 illustrates a MEC reference architecture in a Network Function Virtualization (NFV) environment, deployable from an example edge computing system.

In some aspects, the MEC platform 230 (corresponding to MEC platform 1532 and/or MEC Platform VNF 1602 of FIG. 16) can include a MEC V2X API that provides MEC VIS 280. The VIS 280/V2X API supports both queries and subscriptions (e.g., pub/sub mechanism) that are used over a Representational State Transfer ("REST" or "RESTful") API or over alternative transports such as a message bus. For RESTful architectural style, HTTP protocol bindings may be defined for the VIS API. In particular, the VIS 280 permits information exposure, pertinent to the support of automotive use cases, to MEC app instances. The VIS 280 also permits a single ITS operator to offer V2X applications/services over a region that may span different countries and involve multiple network operators, MEC systems, and MEC app providers. For that purpose, the VIS 280 can include the following functionalities: (a) gathering of PC5 V2X relevant information from the 3GPP network for purposes of performing UE authorization for V2X communications (e.g., obtaining a list of V2X authorized UEs, obtaining relevant information about the authorization based on UE subscription, and obtaining V2X configuration parameters such as a common set of V2X configuration parameters which can include PC5 configuration parameters); (b) exposure of the information obtained in (a) to MEC apps 228 in the same MEC host 240 or MEC apps 228 in other MEC hosts 240; (c) enablement of MEC apps 228 to communicate securely with the V2X-related 3GPP core network logical functions (e.g., enabling communication between a MEC host 240 and a V2X control function in the core network); (d) enablement of MEC apps 228 in different MEC systems 240 to communicate securely with each other; and (e) gathering and processing information available in other MEC hosts/systems using suitable MEC APIs (e.g., gathering and processing information obtained via the V2X (VIS) API, Radio Network Information (RNI) API (see e.g., ETSI GS MEC 012 V1.1.1 (2017 July) ("[R09]")), Location API [R10], UE Identity (UE_ID) API [R11], Bandwidth Management (BWM) API [R12], WLAN Access Information (WAI) API, Fixed Access Information (FAI) API ETSI GS MEC 029 v2.1.1 (2019 July) ("[R13]"), and other like APIs for accessing other MEC services 236 that may be implemented within the MEC platform 230) in order to predict radio network congestion, and provide suitable notifications to the UE 201. The service registry 238, filtering rules control 231, DNS handling 232, data plane 224, and virtualization infrastructure 222 are discussed in more detail infra with respect to FIGS. 15 and 16.

Figure 14:
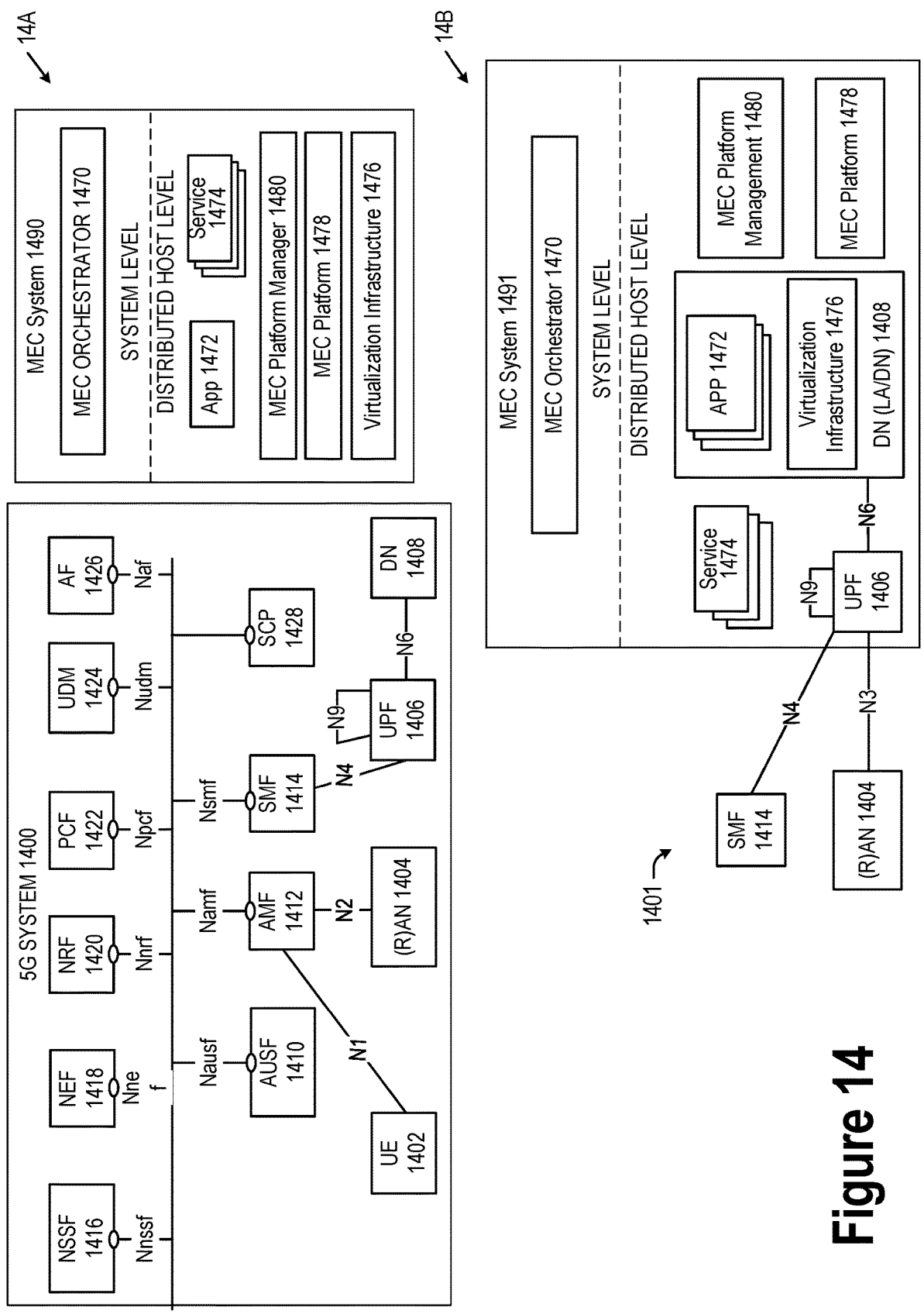
FIG. 14 illustrates a 5G service-based architecture and a MEC architecture deployable in an example edge computing system, and an integrated MEC deployment in a 5G network usable with an example edge computing system.

From that perspective, the VIS 280 is relevant to Mp1 and Mp3 reference points in the MEC architecture (see e.g., FIGS. 14, 15, and 16). In particular, relevant information is exposed from various services 228 and 236 to MEC apps 228 via the Mp1 reference point. The Mp3 reference point enables the transfer of this information between different MEC platforms 230. For example, the second MEC host 240-2 can also implement a MEC V2X API, which can provide an interface to one or more of the MEC apps 228 instantiated within MEC host 240-2. In this regard, MEC host 240-2 and MEC host 240-1 can communicate with each other via the Mp3 interface as well as the MEC V2X APIs. Additionally, one or more of the apps 228 instantiated within MEC Host 240-1 can communicate with one or more of the MEC apps 228 instantiated within MEC Host 240-2 via the MEC V2X APIs as well as the interface between the MEC Host 240-1 and MEC Host 240-2.

The MEC VIS API provides information to MEC apps 228 in a standardized way, which provides interoperability in multi-vendor scenarios. Nevertheless, MEC apps 228 may communicate in a direct way (e.g., without the use of MEC platform 230). In some embodiments, inter-system communication may be realized between MEC Orchestrators (MEOs). Additionally or alternatively, possible Mp3 enhancements (or new reference points between MEC systems 240) may be defined for MEC app 228 communication.

The MEC V2X APIs (e.g., to expose VIS 280) can be provided as a general middleware service, providing information gathered from vehicles 201 and other V2X elements, and exposed as a service within the hosts (e.g., as a RESTful API) for the higher layers (e.g., the MEC apps 228 instantiated within the hosts). In some aspects, the MEC V2X APIs can be configured to gather information and data from various sensors. In this regard, the deployment of the MEC V2X APIs is ensuring continuity of the service across different mobile networks, for the same OEM (e.g., automobile manufacturer). If a standard implementation of a V2X API is introduced (e.g., by ETSI MEC), this functionality can ensure the same basic V2X service characteristics for all OEMs in a 5G communication system with MEC functionalities.

Figure 11:
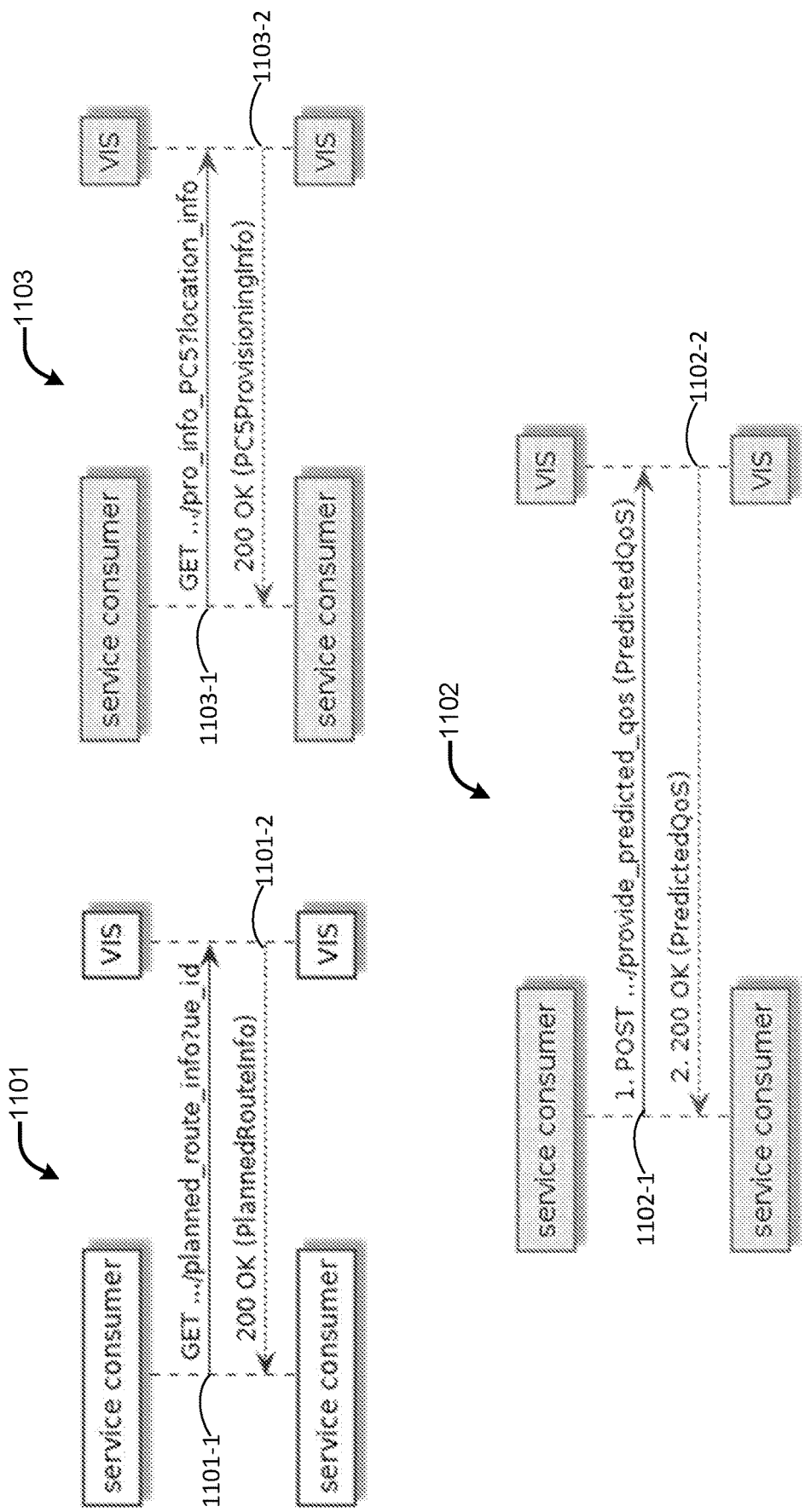
FIG. 11 depicts example V2X procedures, according to various embodiments.
Figure 12:
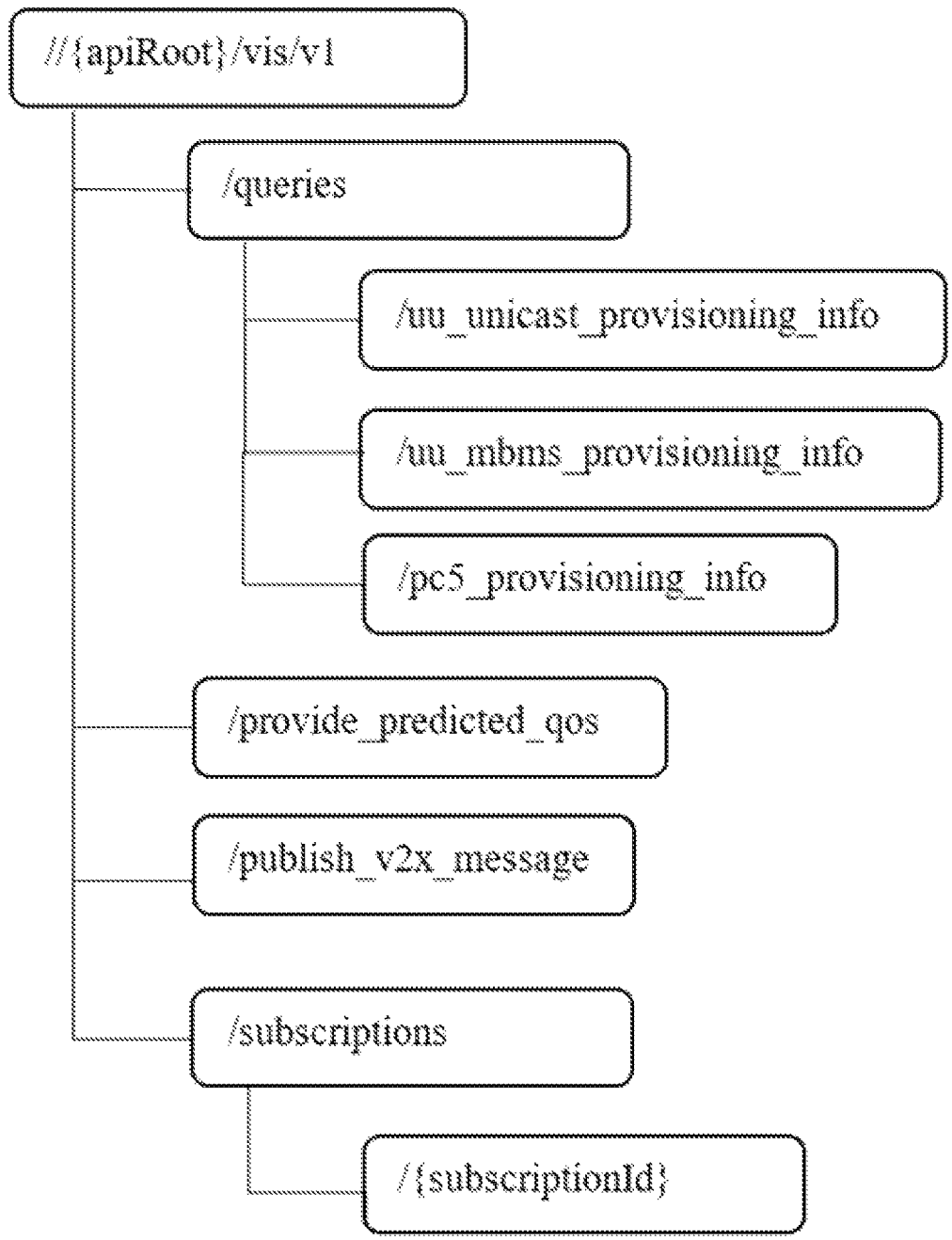
FIG. 12 depicts an example resource Universal Resource Indicator (URI) structure of a VIS API according to various embodiments.

The VIS API/V2X API includes resources and operations. A "resource" is an object with a type, associated data, a set of methods that operate on it, and relationships to other resources if applicable. A resource is a fundamental concept in a RESTful API. Resources are acted upon by the RESTful API using HTTP methods (e.g. POST, GET, PUT, DELETE, etc.). Operations on Resources affect the state of the corresponding managed entities. Some procedures/operations of the VIS API are depicted by FIG. 11. FIG. 12 illustrates a resource Universal Resource Indicator (URI) structure of the VIS API according to various embodiments. Table 0 provides an overview of the resources and the applicable HTTP methods defined by the VIS API. The VIS API supports additional application-related error information to be provided in the HTTP response when an error occurs (see e.g., clause 6.15 of ETSI GS MEC 009 V2.1.1 (2019 January) ("[R06]")).

"apiName" and "apiVersion" is called the root URI. The "apiRoot" is under control of the deployment, whereas the remaining parts of the URI are under control of the API specification. In the above root, "apiRoot" and "apiName" are discovered using the service registry 238. It includes the scheme ("http" or "https"), host and optional port, and an optional prefix string. For the VIS API, the "apiName" may be set to "vis" and "apiVersion" may be set to a suitable version number (e.g., "v1" for version 1). The MEC APIs support HTTP over TLS (also known as HTTPS). All resource URIs in the VIS procedures (see e.g., FIG. 11) are defined relative to the above root URI.

The JSON content format may also be supported. The JSON format is signaled by the content type "application/json". The VIS API may use the OAuth 2.0 client credentials grant type with bearer tokens (see e.g., [R06]). The token endpoint can be discovered as part of the service availability query procedure defined in [R08]. The client credentials may be provisioned into the MEC app using known provisioning mechanisms.

TABLE 0 example VIS API Resources and Methods

| Resource name | Resource URI | HTTP method | Meaning |
|---|---|---|---|
| Uu unicast provisioning information | /queries/uu_unicast_provisioning_info | GET | Retrieve provisioning information required for V2X communication over Uu unicast. |
| Uu MBMS provisioning information | /queries/uu_mbms_provisioning_info | GET | Retrieve provisioning information required for V2X communication over Uu MBMS. |
| PC5 provisioning information | /queries/pc5_provisioning_info | GET | Retrieve provisioning information required for V2X communication over PC5. |
| provide predicted QoS task | /provide_predicted_qos | POST | Provide predicted QoS based on route information. |
| Publish V2X message task | /publish_v2x_message | POST | Publish a V2X message to VIS. |
| all subscriptions for a subscriber | /subscriptions | GET | Retrieve a list of active subscriptions for this subscriber. |
|  |  | POST | Create a new subscription. |
| existing subscription | /subscriptions/{subscriptionId} | GET | Retrieve information on current specific subscription. |
|  |  | PUT | Modify existing subscription by sending a new data structure. |
|  |  | DELETE | Cancel the existing subscription. |
| notification callback | Client provided callback reference | POST | Send a notification. |

The syntax of each resource URI follows [R06], as well as IETF RFC 3986 (2005 January) or IETF RFC 7320 (2014 July). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., VIS/V2X API, RNI API, etc.). The "apiVersion" represents the version of the API, and the "apiSpecificSuffixes" define the tree of resource URIs in a particular API. The combination of "apiRoot", In some embodiments, the MEC apps 228 in their respective MEC hosts 240 can use the corresponding MEC V2X APIs to retrieve information from the 3GPP network. In some embodiments, the MEC apps 228 in their respective MEC hosts 240 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 228 in MEC host 240-1 can be configured to connect to MEC Host 240-2

(through V2X MEC API in MEC Host 240-2), and MEC app 228 in MEC host 240-2 can be configured to connect to MEC Host 240-1 (through V2X MEC API in MEC Host 240-1). In case of a multi-operator architecture, multiple MEC hosts 240 can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE (e.g., vUE 201) can have access to V2X configuration parameters even when the UE is not under coverage of its 3GPP network.

Figure 3:
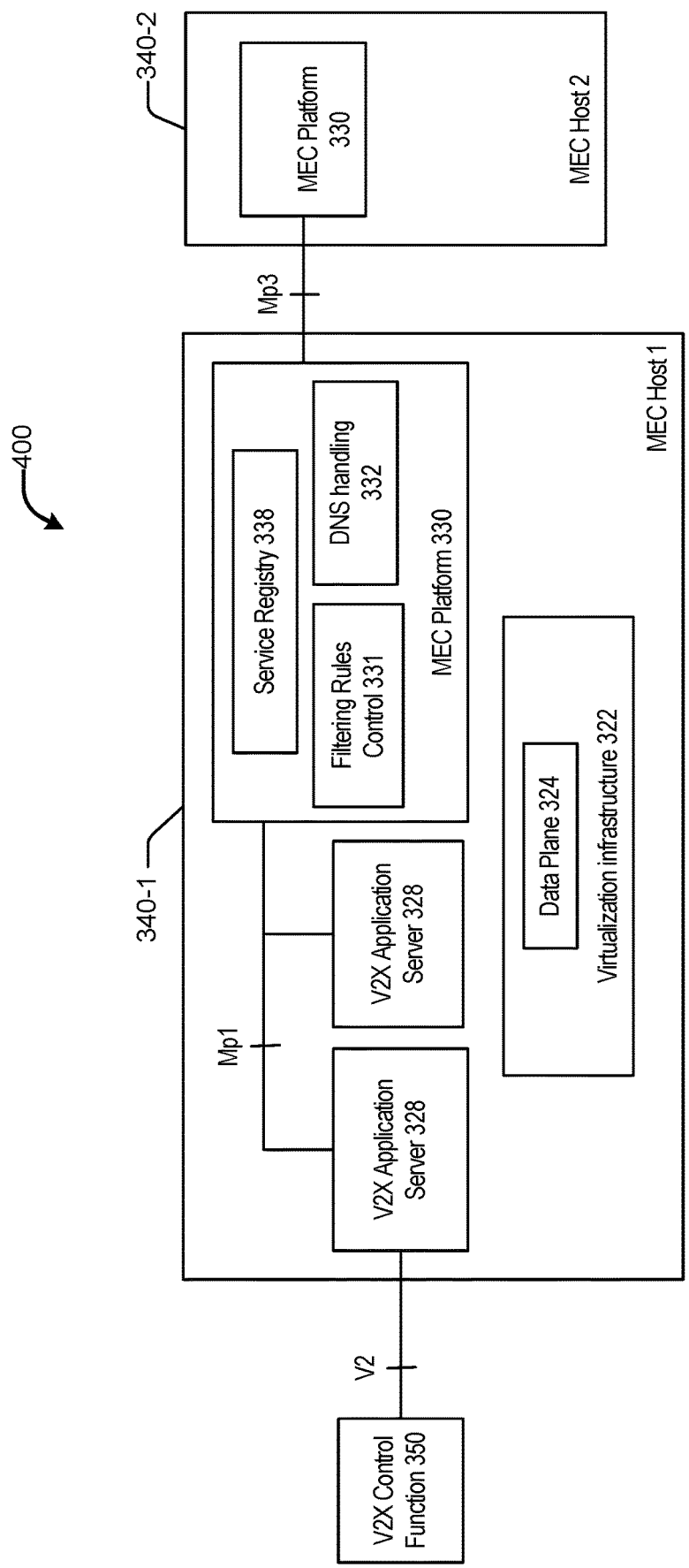
FIG. 3 depicts an example architecture enabling communication between the V2X Information Service (VIS) and a V2X Control Function, according to various embodiments.

In some embodiments, one or more MEC apps 228 within a MEC host 240 can be instantiated to perform functionalities of a V2X application function, which may include providing VIS 280. Additionally, MEC hosts 240 can use MEC V2X APIs to perform various V2X or VIS 280 functions. In particular, one or more MEC apps 228 can be instantiated within a MEC host 240 to perform functionalities associated with a V2X application function, as is shown by FIG. 3. These MEC apps 228 can be configured to perform one or more of the following V2X application functions: obtaining V2X subscription information for a vUE 201, determining whether the vUE 201 is authorized to perform V2X communications in response to a request for V2X services, communicating V2X configuration parameters such as a common set of V2X configuration parameters, and so forth.

FIG. 3 shows an example architecture 300 enabling communication between the VIS (e.g., VIS 280 of FIG. 2) and the V2X Control Function 350. In this example, the VIS is deployed in the MEC platform 322 of MEC host 340-1 and/or MEC host 340-2. In a 3GPP network, V2X applications can be deployed on one or more V2X Application Servers (V2X AS) 328. In 3GPP-V2X, there are two modes of operation for V2X communication, namely over the PC5 interface and over the LTE/5G Uu interface. The Uu interface can be unicast and/or MBMS. These two operation modes may be used by a UE (e.g., vUEs 101 and 201 in FIGS. 1A, 1B, and 2) independently for transmission and reception. For example, a UE can use MBMS for reception without using the Uu interface for transmission. The UE may also receive V2X messages via the Uu interface unicast DL.

The V2X AS 328 may receive UL data from one or more UEs over unicast, and deliver data to the UE(s) in a target area using Unicast Delivery and/or MBMS Delivery. The V2X AS 328 may map from geographic location information to appropriate target MBMS SAI(s) for broadcast, map from geographic location information to appropriate target 3GPP identities such as E-UTRAN Cell Global Identifier(s) (ECGI) and/or NR Cell Global Identifier(s) (NCGI) for the broadcast; and map from UE provided ECGI/NCGI to appropriate target MBMS Service Area Identifier(s) (SAI(s)) for the broadcast. The V2X AS 328 may also provide the appropriate ECGI(s)/NCGI(s) and/or MBMS SAI(s) to the Broadcast Multicast Service Center (BM-SC) for scheduling and transmission of broadcast/multicast content, billing, service announcements, security and content synchronization.

The V2X Control Function 350 is a network function (NF) in core network that is used for network-related actions required for V2X. The V2X Control Function 350 is used to provision a UE (e.g., vUEs 101 and 201) with necessary parameters in order to use V2X communication such as PLMN specific parameters that allow the UE to use V2X in a specific PLMN. The V2X Control Function 350 is also used to provision the UE with parameters that are needed when the UE is "not served by E-UTRAN" or "not served by NG-RAN". The V2X Control Function 350 may also be used to obtain V2X USDs for UEs to receive MBMS based V2X traffic via the V2 reference point from the V2X AS 328. The V2X Control Function 350 may also obtain the parameters required for V2X communications over the PC5 reference point from the V2X AS 328 via the V2 reference point. The V2 reference point is a reference point between the V2X AS 328 and the V2X Control Function 350 in the operator's network.

The V2X Control Function 350 of an HPLMN is discovered through interaction with a Domain Name Service (DNS) function. The Fully Qualified Domain Name (FQDN) of a V2X Control Function 350 in the HPLMN may either be pre-configured in the UE, provisioned by the network, or self-constructed by the UE (e.g., derived from the PLMN ID of the HPLMN or the like). The IP address of a V2X Control Function 350 in the HPLMN may also be provisioned in or to the UE. The Home Subscriber Server (HSS) in an LTE core network and/or a Unified Data Management (UDM) NF in a 5G core network (5GC) provides a list of the PLMNs where a UE (e.g., vUEs 101 and 201 of FIGS. 1A, 1B, and 2) is authorized to perform V2X communication over the PC5 reference point to the V2X Control Function 350 (see e.g., 3GPP TS 23.285 v16.0.0 (2019 Mar. 25) and ETSI TS 123 285 V14.2.0 (2017 May) (collectively "[R04]")).

In some implementations, an V2X AS 328 (or V2X AS logic) may be co-located with an RSU. The VIS 280 defined in MEC is used to facilitate V2X interoperability in a multi-vendor, multi-network, and multi-access environment. The VIS 280, or generic parts of it, can be deployed in the MEC platform 330 (the filtering rules control 331, DNS handling 332, and service registry 338 may correspond to the filtering rules control 231, DNS handling 232, and service registry 238 of FIG. 2, respectively). Therefore, the VIS 280 may be used to obtain a UE's subscription data (e.g., PC5 based V2X communication allowed PLMN), from the V2X Control Function 350. Because the V2X AS 328 bears (or serves) multiple V2X applications, it can be deployed in MEC platform 330 as one or more MEC apps 228 (see e.g., FIG. 2). The VIS 280 can communicate with the V2X AS 328 through the Mp1 interface, and it can obtain the UE's V2X subscription data from the V2X Control Function 350 through the V2X AS 328. In some embodiments, the V2 and Mp1 reference points may be enhanced to support the secure transfer of subscription data between the V2X Control Function 350 and the VIS 280. Additionally, current 3GPP specifications do not define an interface between two or more V2X AS 328 or the methods for message exchange between V2X AS 328. In some embodiments, the Mp1 reference point may be enhanced to support the secure transfer of data between two or more V2X AS 328 implemented by a same MEC host 340, and the Mp3 reference point may be enhanced to support the secure transfer of data between two or more V2X AS 328 implemented by different MEC hosts 340. In these embodiments, the V2X API and/or the VIS 280 may provide a means for exchanging such information among V2X AS 328.

A V2X MEC app (e.g., MEC app 228 and/or V2X AS 328) may be required to communicate with its peer applications in other MEC systems in order to fulfil the intended purpose of the application use case. The involved MEC systems enable the authorized applications in one MEC system to communicate with their peers in another MEC system. The discovery of the application peers may be facilitated by the VIS 280 and/or V2X API (or VIS API) by exposing the available communication end point information for peer to peer connectivity. Alternatively, the configured traffic rules (e.g., filtering rules control 231/331) for the V2X MEC app, together with the underlying inter-MEC system connectivity arrangements, may support the application peers' communication. Additionally or alternatively, the V2X MEC app may rely on non-MEC-specific means for its peer discovery and then rely on its authorized access to external interface for the communication. The required arrangements between the involved MEC systems for realizing secure connectivity with the application specific requirements may be application and/or deployment specific, and may vary from embodiment to embodiment.

Additionally, a V2X MEC app (e.g., MEC app 228 and/or V2X AS 328) in one MEC system may be required to consume a service in another MEC system in order to fulfil the intended purpose of the application use case. In this case, the V2X MEC app discovers the service in question in the service registry in its local MEC host 240/340. The required arrangements between the involved MEC systems for mapping a service produced in one MEC system to an endpoint in another MEC system may be application and/or deployment specific, and may vary from embodiment to embodiment.

As alluded to previously, the MEC hosts 240/340 also provide an RNI Service (RNIS). The RNIS is a service that provides radio network related information to MEC apps (e.g., MEC app 228 and/or V2X AS 328) and to MEC platforms 230/330. The RNIS is available for authorized MEC apps and is discovered over the Mp1 reference point. The granularity of the radio network information may be adjusted based on parameters such as information per cell, per UE, per QoS class (or QoS class identifier (QCI)) or it may be requested over period of time. The RNI may be used by the MEC apps 228 and MEC platforms 230/330 to optimize the existing services and to provide new type of services that are based on up to date information on radio conditions. The RNI that may be provided may include, for example, up-to-date radio network information regarding radio network conditions; measurement information related to the user plane based on 3GPP specifications; WLAN measurements; information about UEs connected to the radio node(s) associated with the MEC host (e.g., NANs 110, 210) their UE context and the related radio access bearers; changes on information related to UEs connected to the radio node(s) associated with the MEC host, their UE context and the related radio access bearers.

In the various embodiments herein (e.g., the first embodiment and second embodiments discussed infra), since the RNIS provides information on the vUEs 101/201 connected to a given NAN 110/210, the type of information provided by multiple NANs 110/210 "en route" can result in achieving real-time traffic flow predictions for a given vUE 101/201. Such information can then be taken into account for route planning/updates.

Furthermore, cellular handovers should not create the need to trigger the vUE journey-aware QoS prediction procedure from the beginning (e.g., Step 1 supra), because the planned journey and the data transfers (e.g., installed SW package versions, etc.) can be passed over or transferred from (master) MEC host 140/240 to (master) MEC host 140/240 along the planned journey (e.g., over an X2 or Xn interface between RAN nodes or the like). Such "data passing" is feasible as the MEC Orchestrator (discussed infra) of the MEC system is aware of MEC host deployment specifics. The communications between MEC hosts 140/240 and vUEs 101/201, and/or between multiple MEC hosts 140/240 may use security procedures/protocols such as, for example, OAuth 2.0 authorization framework, which enables a third-party application to obtain limited access to an HTTP service (https://restfulapi.net/security-essentials/); Transport Layer Security (TLS), which is cryptographic protocol that provide communications security over a computer network (https://blog.restcase.com/introduction-tor-est-api-security/); HTTPS, which secures the transmission of the message over the network and provides some assurance to the client about the identity of the server; and/or any other suitable communication mechanisms.

II. MEC VIS for Route-Specific QoS Predictions

Embodiments herein are related to V2X services and QoS predictions along planned trajectories of vehicles (e.g., vehicle UEs (vUEs), vehicle ITS stations (V-ITS-S), and the like), assuming the deployment of MEC infrastructure alongside RANs (and/or individual RAN nodes) such as 3GPP Fifth Generation (5G) RANs, 3GPP LTE E-UTRANs, WiFi wireless access points (WAPs), Intelligent Transport System (ITS) roadside equipment (R-ITS-S), and/or the like. In embodiments, accurate and timely predictions of the radio environment at locations planned to be visited by vehicles can either trigger, modify or postpone (i) the application of certain V2X functionalities and/or (ii) the download of software packages, delivery of content (e.g., streaming media), and/or the like. Multi-access Edge Computing (MEC) is a technology that allows applications to be instantiated at the edge of the access network, and provide a low-latency and close proximity environment to terminals/UEs. As a result, vertical industries, such as the automotive industry, are expected to significantly benefit from the deployment of MEC infrastructure together with the RAN.

Figure 4:
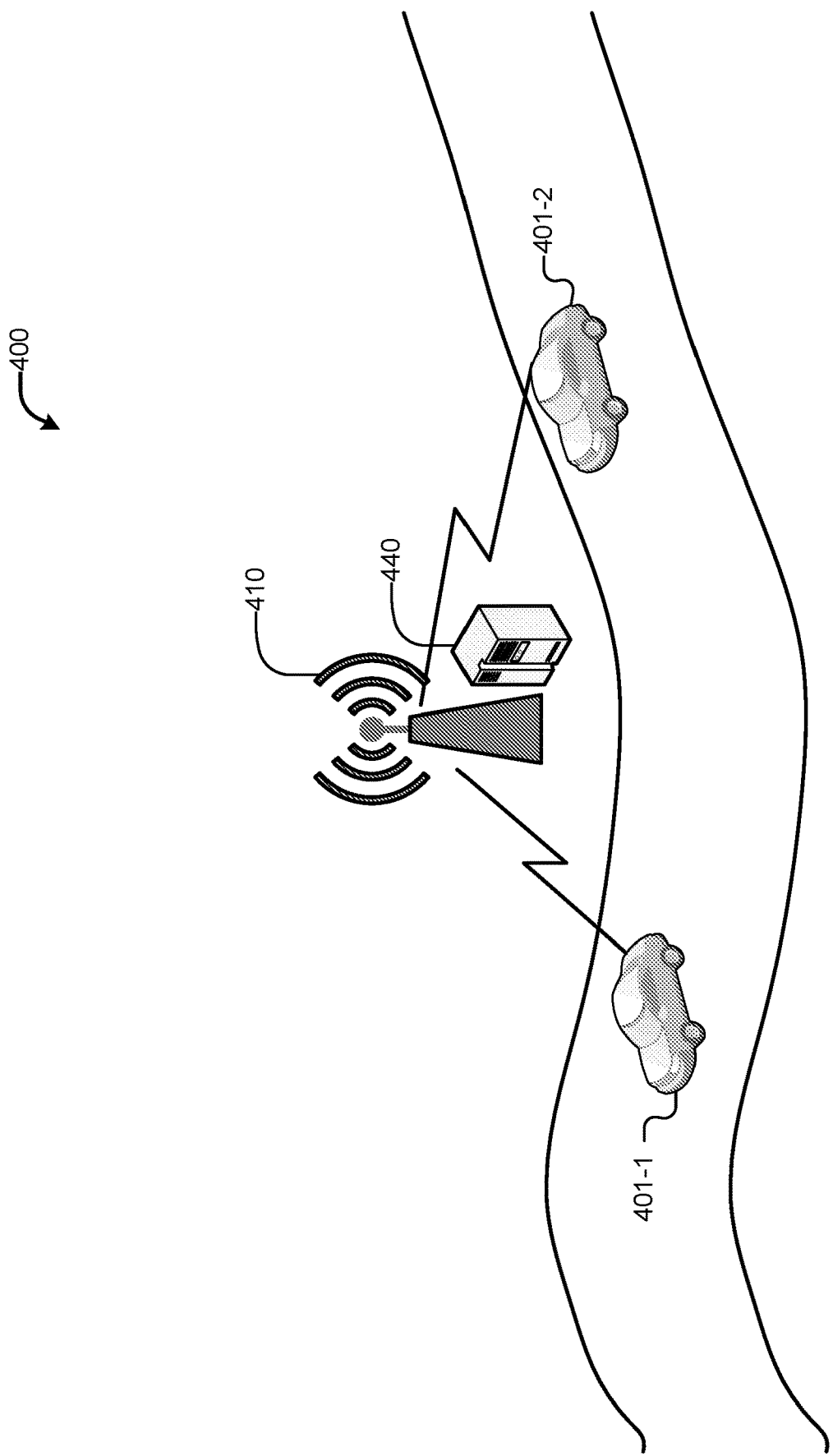
FIG. 4 depicts an exemplary V2X system scenario where a MEC host is co-located with a network access node (NAN) providing V2X communication services to vehicular user equipment (UEs), according to various embodiments.

FIG. 4 illustrates an exemplary V2X system scenario 400, where a MEC host 440 is deployed in collocation with a network access node (NAN) 410 providing coverage (e.g., V2X communication services). The NAN 410 may be a road side unit (RSU) or roadside ITS station (R-ITS-S), a cellular base station (e.g., an evolved nodeB (eNB), next generation nodeB (gNB), or the like), or some other network element providing network coverage (e.g., V2X communication services) to the vUEs 101 (including a first vUE 401-1 and a second vUE 401-2). The MEC host 440 provides, inter alia, VIS, RNI Services (RNIS), Location Services (LS), UE_ID Services, BWM Services (BWMS), WAI Services (WAIS), FAI Services (FAIS), and/or other MEC services. In FIG. 4, a planned trajectory of first vUE 401-1 and the second vUE 401-2 are not known at the NAN 410 or MEC host 440. However, since V2X system scenarios are characterized by high mobility and dynamic topology, the accuracy and the timeliness of information (e.g., radio network, location information, etc.) when centrally collected by a MEC host 440, are hampered by the environmental situation (e.g., the occurrence of network congestion events when multiple vUEs 401 attempt to provide radio measurements to the NAN 410, which is co-located with MEC host 440), as well as by the deployment density of the cellular network, together with the capabilities of the deployed MEC infrastructure.

An example illustrating the impact of the above mentioned limitations on system performance is the one of a vehicle planning to follow a trajectory from a first location ("location A") to a second location ("location B") and a related MEC app, which would need to be informed of radio conditions "en route", ahead of the vUE's 401 passing time, before reaching a decision. The "decisions" may include, for example, enabling/disabling autonomous driving features, downloading infotainment content (e.g., media streaming, immersive gaming, and the like), scheduling software over-the-air (SOTA) and/or firmware over-the-air (FOMA) updates (e.g., relevant to driving safety/convenience purposes), and the like. In current MEC systems, journey-specific environmental/situational information will only be available to vUEs 401 together with a bulk of data irrelevant to the planned route. In other words, the distributed data are "contaminated" with useless information, which is detrimental from a delay point of view, as it takes more time for a large file to be downloaded assuming the same data transmission rate.

To address such challenges, the VIS of the embodiments herein assists in implementing a framework for cooperative acquisition, partitioning, and distribution of information for efficient, journey-specific QoS prediction. That is, the VIS may be utilized to identify space/time correlations between radio quality data collected by different vUEs 401 in a V2X system and a specific vUE's 401 planned journey for better prediction of the quality of the communication network along the designated route. As a consequence, the VIS may expose relevant (e.g., journey-specific) information about the QoS prediction to authorized vUEs 401.

Current/previous solutions to the aforementioned issues include those discussed in Filippou et al., ETSI MEC(18) 000227r2, "MEC002—In-vehicle MEC hosts supporting automotive workloads", MEC #104-Tech (12 Jun. 2018) ("[R01]"), which proposes a new MEC use case on in-vehicle MEC hosts supporting automotive workloads. In particular, [R01] discusses a MEC architecture, materialized by means of MEC hosts deployed onboard vUEs 401 that can offer content storage and memory capabilities, and can enhance contextual awareness via exploiting radio network, location, and/or any other information relevant to the changing environment during journey time. Further, it is mentioned that, among others, possible types of workloads to be hosted by MEC apps instantiated on in-vehicle MEC hosts, can include machine learning (ML), data analytics, fused sensor measurements, and/or other workload types. As a result, ETSI GS MEC 002 v2.1.1 (2018 October) ("[R02]") incorporates an in-vehicle MEC host use case, which supports automotive workloads, along with a set of related requirements. Embodiments related to in-vehicle MEC hosts is also discussed in more detail infra. However, the MEC technology components and mechanisms of improving contextual awareness and predictive QoS are not explained in [R01] and [R02]. [R01] and [R02] also do not mention if and how such a paradigm shift in MEC deployment (and possibly architecture) is expected to improve the accuracy and timeliness of acquiring, and even predicting ahead of time, radio network information when V2X scenarios are considered. Furthermore, the solutions of [R01] and [R02] do not allow vUE's 401 without in-vehicle MEC hosts to exploit the benefits of improved contextual awareness and/or journey-specific predictive QoS.

The topic of intelligent, data-centric decision-making for efficient V2X communication has also been tackled by academic works, such as Ye et al. "Machine Learning for Vehicular Networks", arXiv:1712.07143v2 (26 Feb. 2018) ("[R03]"), which provides an overview of recent advances of ML towards solving problems faced by V2X communications systems, such as traffic flow prediction, congestion control and local data storage aspects. However, a practical solution setup was not proposed in [R03]. Instead, [R03] is related to adapting existing learning methods or develop V2X specific learning algorithms to better handle such characteristics remains a challenging task, and practical considerations to be taken care of prior to applying a ML method to facilitate decision making. The practical considerations include the increased dynamics of network topology, wireless channels and the traffic profile, algorithm complexity issues as the processing power at a vehicle is in general limited, while a cloud-based solution would incur possibly large latencies, as well as the challenges of distributed learning-based solutions. Moreover, [R03] does not discuss the practical dimension of the problem with respect to MEC infrastructure and information exchange setups/protocols (e.g., MEC APIs and/or relevant MEC apps).

The embodiments herein are related to journey-aware QoS prediction for vUEs. In particular, embodiments include a V2X system overlaid by MEC hosts. In a first embodiment (embodiment 1), MEC hosts are deployed only at the network infrastructure side. In a second embodiment (embodiment 2), the MEC hosts are deployed at the network infrastructure side and at the vUE side (e.g., "in-vehicle MEC hosts"). Embodiments herein also include a framework for cooperative acquisition, partitioning, and distribution of information for efficient, journey-specific QoS prediction.

From a technical standpoint, a first benefit of the MEC-based framework for cooperative acquisition, partitioning, and distribution of information for efficient, journey-specific QoS prediction is reaching correct decisions upfront (e.g., towards optimizing FOTA/SOTA downloads, content streaming, and/or any sort of content transfer). Such decisions will be based on journey-specific RNI and not on global information, which may provide little to zero relevance to a given planned route to be followed by a vUE. Also, with regards to embodiment 2, the obtained RNI information partition may be exploited for predictive QoS purposes, and also stored as history information to be considered the next time a vUE follows the same or similar route (e.g., office commuting). This historical information may be used to reduce computational overhead when allocating resources to vUEs that take the same or similar routes.

The following discussion describes the cooperative RNI prediction and content delivery decision framework embodiments in terms of SOTA/FOTA updates. However, the embodiments herein are also applicable to other types of content/data delivery in addition to, or alternative to SOTA/FOTA updates, including enabling/disabling autonomous driving features, downloading infotainment content, computational offloading, cooperative ML, and/or other like data conveyances such as according to other example use cases discussed herein.

II.A. Example Journey-Specific QoS Prediction & Task Decision Procedure

Figure 5:
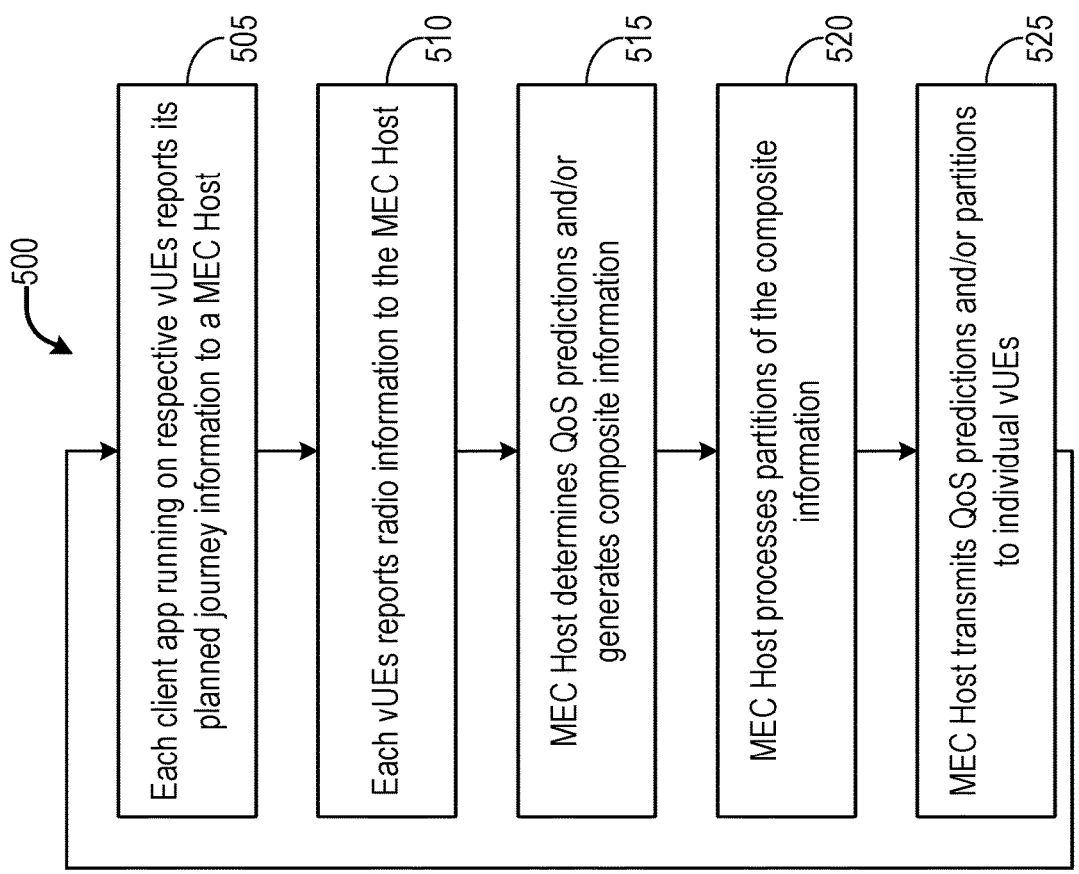
FIG. 5 depicts an example journey-specific QoS process according to various embodiments.

FIG. 5 depicts an example vUE journey-aware (or route-aware) QoS prediction process 500 for the first and second embodiments. The process 500 may be used to determine various tasks to perform and/or decisions to take on those tasks based on predicted, journey-specific QoS. The process 500 is discussed with respect to obtaining/downloading SW/FW package updates, however, the embodiments herein may be used for obtaining other types of data/content (e.g., decisions/tasks for streaming content such as video data, AR/VR or other interactive gaming data, etc.) or for determining other decisions/tasks (e.g., whether to enable or disable automation tasks, whether to change operational parameters of the vUE or component(s) therein, etc.). With reference to FIGS. 1A, 1B, 2, 3, and 4, an example process 500 according the embodiments herein may include the following operations.

Process 500 begins at operation 505, where each client app (e.g., UE App 202) running on respective vUEs (e.g., vUEs 101, 201, 301, 401) camping on a NAN (e.g., NAN 110, 210, 410) reports its planned journey information (e.g., map coordinates and/or route data) to a MEC Host (e.g., MEC host 140, 240, 340, 440). The MEC Host may be co-located with a NAN (RAN node or other network element), and may also run a (geo)location service and/or other services. The planned journey information may be complemented with information about the data transfer(s) that is/are to take place during the planned journey. For example, where the vUE is to obtain an updated SW/FW package, the information may include a version of a SW/FW package currently installed or running on the vUE. The SW/FW package may be the client app itself or some other SW/FW package.

Next at operation 510, each vUE provides radio information to the MEC Host. In embodiments, each vUE reports radio information either at a low periodicity or a high periodicity depending on the data transfer that is to take place, and/or other information about the data transfer. For example, the SW/FW package version number may be used to determine whether the radio information should be provided at a low or high periodicity. The radio information may be in the form of one or more measurement reports, and/or may include, for example, signal strength measurements, signal quality measurements, and/or the like. Each measurement report is tagged with a timestamp and the location of the measurement (e.g., the vUE's current location).

As examples, the measurements collected by the vUEs and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.3.0 (2018 Sep. 27) ("[R15]"), 3GPP TS 38.215 v15.4.0 (2019 Jan. 11) ("[R16]"), IEEE 802.11, Part 11: "Wireless LAN Medium Access Control (MAC) and Physical Layer (PHY) specifications, IEEE Std." ("[R17]"), and/or the like. Additionally or alternatively, any of the aforementioned measurements (or combination of measurements) may be collected by one or more NANs and provided to the MEC Host. In these embodiments, the MEC Host may request the measurements from the NANs at low or high periodicity, or the NANs may provide the measurements to the MEC Host at low or high periodicity. Additionally or alternatively, the MEC host may obtain other relevant data from other MEC Hosts, core network functions, and/or other vUEs, for determining the QoS predictions and/or generating the composite information. For example, other Key Performance Indicators (KPIs) may be collected from other MEC hosts via suitable MEC APIs and/or from core network functions via network exposure functions, and used for predicting the QoS along the planned route and/or generating composite information (discussed infra). Additionally or alternatively, the vUEs may obtain the other relevant information, and provide this information to the MEC Host with the measurement reports or separately from the measurement reports.

At operation 515, the MEC Host compiles or otherwise generates QoS predictions and/or composite information based on the planned route of each vUE and/or the measurement reports. The QoS predictions may include a predicted QoS for various points along the vUE's planned route. The composite information may include, for example, recommendations on whether to perform data transfers at the various points on the planned route, and/or content to be delivered to the vUE based on the predicted QoS along the planned journey. In some embodiments, the MEC host may operate a trained ML algorithm to predict the QoS along the planned route and/or generate the composite information. For example, a trained neural network, such as convolutional neural networks and/or recurrent neural networks, can determine inferences using input data indicating time-varying radio measurements and location information. The specific ML model/algorithms used may vary from embodiment to embodiment.

When generating composite information, the MEC host partitions or re-partitions the composite information into individual data blocks, chunks, or partitions, each of which is relevant to a particular planned route, a particular vUE, or a cluster or group of vUEs that plan to follow the same or similar route/journey (e.g., a vehicle platoon). Information (re-)partitioning is a pre-processing stage to obtain a useful data set to be used for journey-specific QoS predictions. The fused information at a master MEC Host is partitioned as per the relevance to the vUES' planned journeys, regardless of whether in-vehicle MEC hosts exist, do not exist, or are unavailable at the vUEs. Additionally or alternatively, fused information at in-vehicle MEC Hosts' is partitioned as per the relevance to the previously collected vUES' planned journeys.

Any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, etc.). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). Thus, in some embodiments, data fusion may be used to estimate various vUE parameters that are not provided by that vUE, as well as predicting QoS and/or signal quality of a particular journey or route. As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm.

At operation 520, a MEC App at the MEC Host (co-located with the NAN and/or the in-vehicle MEC host) processes each partition depending on the existence or absence of in-vehicle MEC hosts at each vUE. In embodiments, the MEC app may be triggered by an indication of the availability of a new SW/FW package to begin processing each partition. The partitions are processed according to a first embodiment when the vUEs do not host in-vehicle MEC hosts. The partitions are processed according to a second embodiment when the vUEs do host in-vehicle MEC hosts.

In the first embodiment (when there are no in-vehicle MEC hosts or the in-vehicle MEC hosts are unavailable), the composite information is partitioned into journey/route-specific partitions comprising radio signal quality for each planned journey/route. The journey-specific partitions, together with the SW/FW package versions running at each of the vUEs are used as inputs for decision making (e.g., for determining journey-specific QoS predictions). After a journey-specific QoS prediction is performed at the MEC Host, the decision of recommending the launch/downloading of a SW/FW update is taken by the MEC app at the MEC Host. Then at operation 525, the recommendation is forwarded by means of unicast or multicast transmissions to the client apps running at the vUE(s) that (i) have a planned route tailored to a journey-specific partition, (ii) run outdated SW/FW packages, and (iii) are expected to experience favorable radio conditions along their planned route.

In the second embodiment (when there are available in-vehicle MEC hosts), the composite information is partitioned into journey/route-specific RNI, which is packaged and transmitted to individual Client Apps at the vUEs at operation 525. Here, operation 525 may involve unicast transmissions to individual vUEs or multicast transmission(s) to a cluster or group of vUEs that have a same or similar planned route. Each client app performs journey-specific QoS prediction using the received journey-specific RNI and the version of the currently installed SW/FW package. Each client app may also take into account one or more other locally running applications, as well as other operational parameters (e.g., resource utilization and the like). Each client app decides upon scheduling tasks (e.g., SW/FW updates/package downloads) using an RNI analytics MEC application instantiated at the in-vehicle MEC host while traveling towards its destination.

When the MEC Host or the vUE detects a change to the planned journey, process 500 is repeated with updated journey information. The change to the planned journey/route may be based on sensor data, GPS data, 5G/LTE location service data, data from one or more applications, and/or the like. Each client app at each vUE may use a suitable API, driver, etc., to interact with the sensors, GPS circuitry, and/or other applications to obtain data for making such a determination.

II.B. Embodiment 1

The first embodiment is related to implementations where MEC hosts (e.g., MEC hosts 140, 240, 340, 440 of FIGS. 1A, 1B, 2, 3, and 4; MEC host 1502 of FIG. 15 or the like) is/are deployed at, or co-located with one or more NANs (e.g., NANs 110, 210, 410 of FIGS. 1A, 1B, 2, and 4).

The following data structures may be used to implement the cooperative RNI prediction and content delivery decision framework. As mentioned in Step 1 of the vUE journey-aware QoS prediction and task decision procedure, each client app running in a vUE reports planned journey/route information to a MEC host. A data structure for the planned route information with an identifier (ID) such as "UE_ID", includes the coordinates of the following locations: the origin location, which refers to point A in a route from point A to point B (e.g., "Origin A"); the destination location, which refers to point B in a route from point A to point B (e.g., "Destination B"); and a number of intermediate locations reflecting the trajectory or route that the vUE is to travel to or through on the route (e.g., specific streets, highways, etc.). Table 1 shows an example data structure that may be used to convey this location information.

TABLE 1

| UE_ID Route Points | Geolocation |
| --- | --- |
| Origin A | 41°24'12.2"N, 2°10'26.5"E |
| Intermediate location 1 | 41°23'14.9"N, 2°12'32.7"E |
| Intermediate location 2 | 41°22'31.8"N, 2°14'21.8"E |
| . . . | |
| Intermediate location N | 41°17'16.2"N, 2°19'34.1"E |
| Destination B | 41°15'23.6"N, 2°24'18.1"E |

A data structure representing the format of a message periodically transmitted by the vUE in Step 2 of the vUE journey-aware QoS prediction procedure, and received by the NAN co-located with the MEC host. The different attributes of the message may include: the ID of the vehicle "UE_ID", the message transmission time or timestamp ("TS"), the location of the vUE at the time of transmission ("UE_Loc"), and local radio measurements at the vUE (e.g., the RSRP/RSRQ values accumulated over a time window ending at time instant TS (e.g., the message transmission time)). An example of such a message format is depicted by table 2.

TABLE 2

| UE_ID | TS | UE_Loc | Measurements |
| --- | --- | --- | --- |

A data structure for the message transmitted by the RSU/eNB to inform the targeted UE (e.g., via a unicast transmission) or the targeted cluster of UEs (e.g., via a multicast transmission) at Step 4a of the vUE journey-aware QoS prediction procedure. This message is used to indicate the availability of an updated SW package version with ID "SW_Ver_New", the recommended time of download start, "DL_Start_Time" and the expected duration of the download, "DL_Exp_Dur", based on the predicted radio conditions along the vehicle(s) route.

TABLE 3

| SW_Ver_New | DL_Start_Time | DL_Exp_Dur |
|---|---|---|

Figure 6:
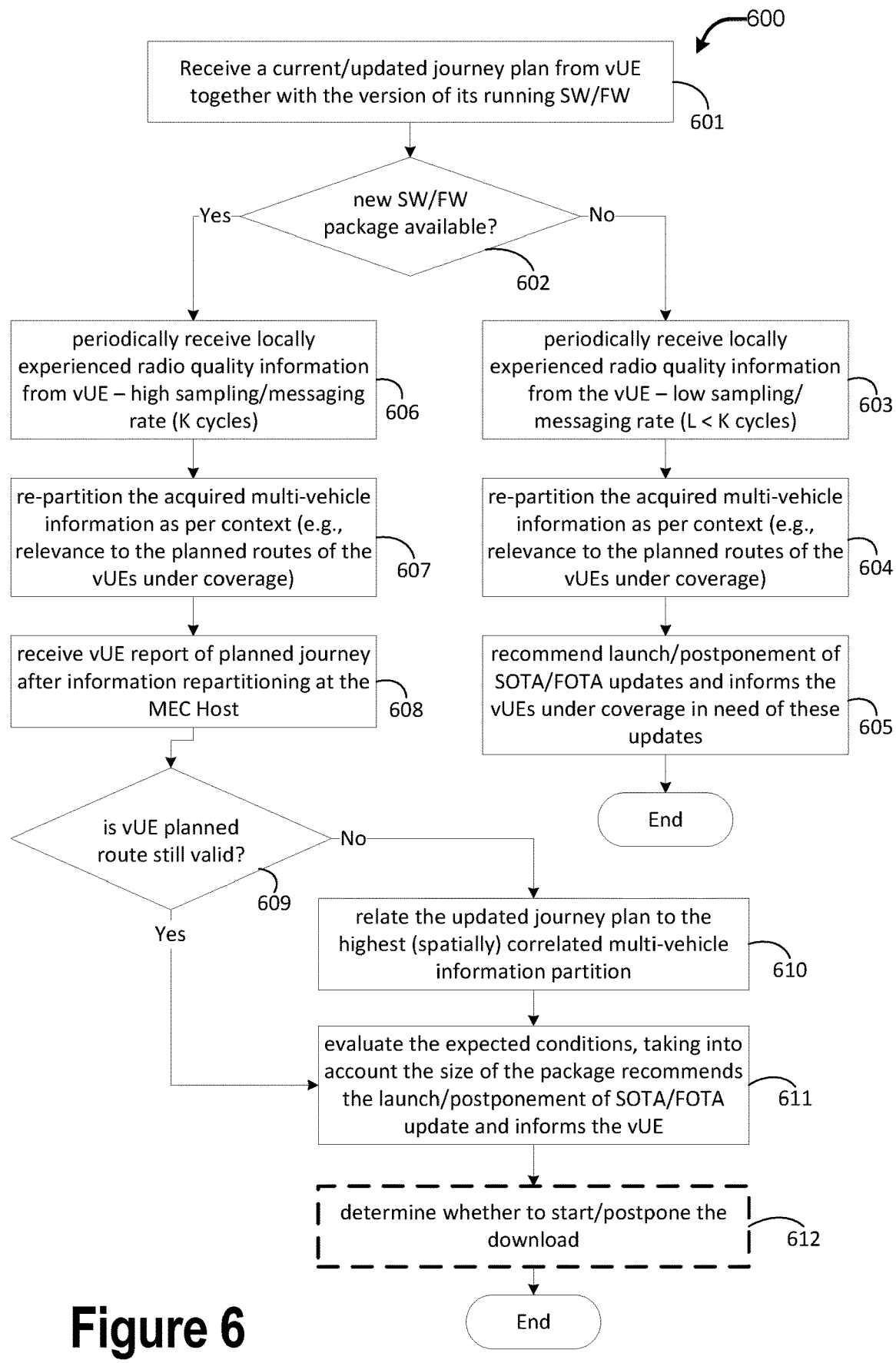
FIG. 6 depicts an example journey-specific QoS notification process according to a first embodiment.

FIG. 6 depicts an example process 600 according to the first embodiment. Process 600 is a single decision cycle that may be performed by a MEC host 440 co-located with NAN 410 and a vUE 401 within the coverage area of the NAN 410 (see e.g., FIG. 4). Process 600 is described as being used to make a decision on whether to download software (SW) and/or firmware (FW) updates, however, process 600 may be used to make decisions about other types of data transfer use cases such as those discussed herein.

Procedure 600 begins at operation 601 where the MEC host 440 receives a current/updated journey plan from vUE 401 together with the version of its running SW and/or FW to the MEC host 440 via the co-located/connected NAN 410. At operation 602, the MEC host 440 determines if there a new SW/FW package version available for the vUE. If the MEC host 440 determines that there is not a new SW/FW package version available for the vUE, then the MEC host 440 proceeds to operation 603 where the MEC host 440 periodically receives, from the vUE, locally experienced radio quality information at the vUE 401. This may involve a relatively low sampling/messaging rate (e.g., L<K cycles where L and K are numbers). At operation 604, the MEC host 440 re-partitions the acquired multi-vehicle information as per context (e.g., relevance to the planned routes of the vUEs under coverage), and at operation 605, the MEC host 440 recommends the launch/postponement of SW-OTA (SOTA)/FW-OTA (FOTA) updates and informs the vUEs under coverage in need of these updates. In some embodiments, if a currently installed SW package for a given vUE 401 is the latest version of that SW package, then no recommendation needs to be provided by the network via the MEC host 440 at operation 605. After operation 515, procedure 600 ends.

Referring back to operation 602, if the MEC host 440 determines that there is a new SW/FW package version available for the vUE 401, then the MEC host 440 proceeds to operation 606 where the MEC host 440 periodically receives, from the vUE, locally experienced radio quality information at the vUE 401. This may involve a high sampling/messaging rate (e.g., K cycles where K is a number). In other words, when the currently installed version of the SW/FW package is the latest and/or newest version, measurements are provided at a low rate (see e.g., operation 603); conversely, when the currently installed version of the SW/FW package is not the latest and/or newest version (e.g., a SW/FW package update is not needed or desired), measurements should be provided at a higher rate (see e.g., operation 606). At operation 607, the MEC host 440 re-partitions the acquired multi-vehicle information as per context (e.g., relevance to the planned routes of the vUEs under coverage). At operation 608, the vUE 401 reports its planned journey after information repartitioning at the MEC host 440.

In some embodiments, after the updated journey plan is communicated by the vUE 401, the MEC host 440 does not perform any further information partitioning. Instead, the MEC host 440 relates or associates the most appropriate partition (e.g., the most highly contextually correlated partition) to the vUE 401 (see e.g., operation 610), and then performs journey-specific QoS predictions and provides recommendations based on the journey-specific QoS predictions (see e.g., operation 611).

At operation 609, the MEC host 440 determines if the planned route of the vUE 401 is still valid. If the MEC host 440 determines that the planned route of the vUE 401 is not still valid, then the MEC host 440 proceeds to operation 610 to relate the updated journey plan to the highest (spatially) correlated multi-vehicle information partition. Then, at operation 611, the MEC host 440 evaluates the expected conditions, taking into account the size of the package recommends the launch/postponement of SOTA/FOTA update and informs the vUE. If at operation 609 the MEC host 440 determines that the planned route of the vUE 401 is still valid, then the MEC host 440 proceeds to perform operations 611 without performing operation 610. At operation 612, the vUE 401 decides whether to start/postpone the download as per functional needs, policies, preferences, etc., or the MEC host 440 determines whether to start/postpone the download to the vUE 401 as per functional needs, policies, preferences, etc. of the vUE 401 or MEC host 440. After operation 612, procedure 600 may end.

Figure 7:
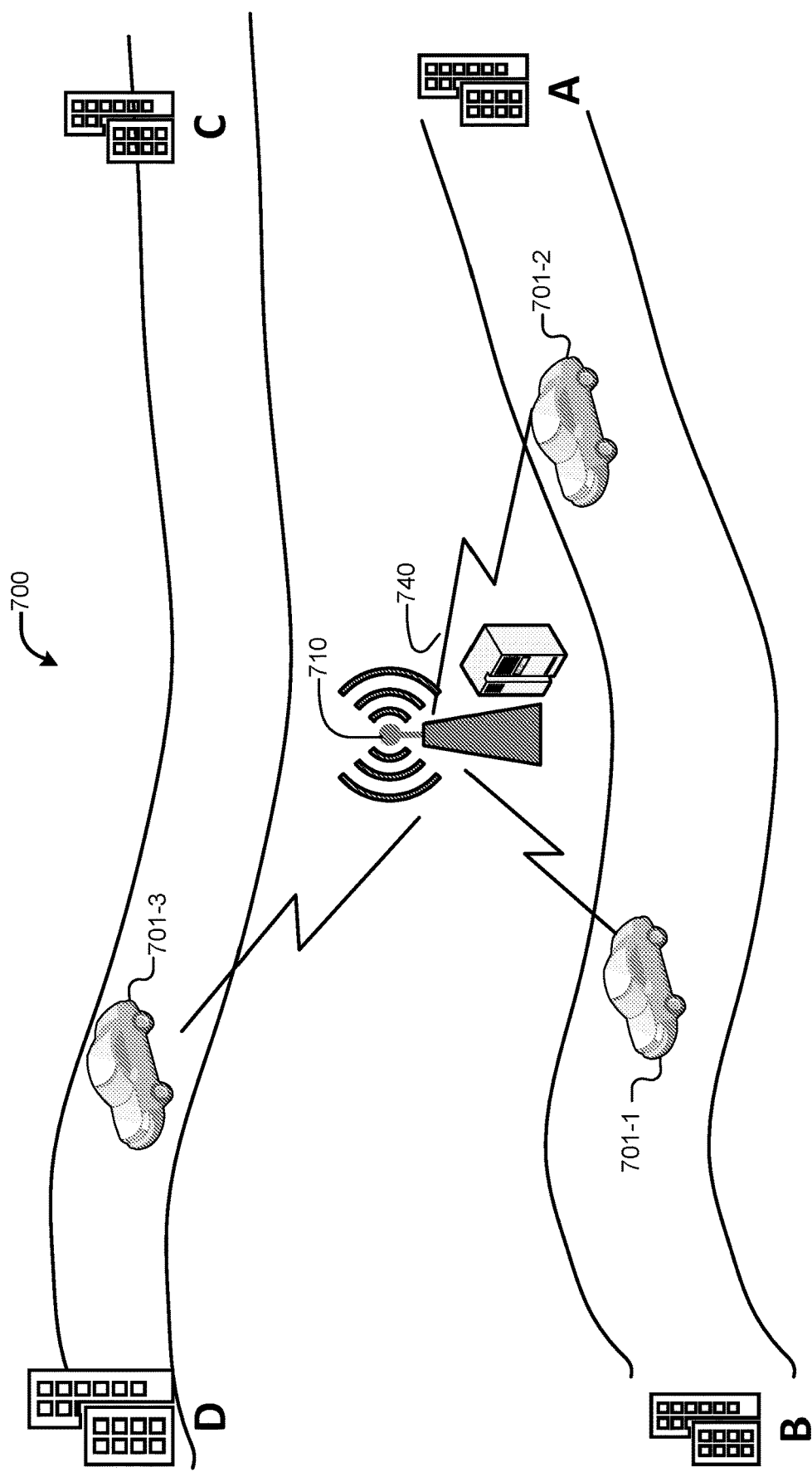
FIG. 7 depicts another exemplary scenario of a MEC host is co-located with a NAN providing V2X communication services, according to various embodiment.

FIG. 7 depicts an exemplary scenario 700 where a MEC Host 740 (which is the same or similar as MEC host 440 of FIG. 4) co-located with a NAN 710 (which is the same or similar as NAN 410 of FIG. 4), and three vUEs 701 (including vUE 701-1, vUE 701-2, and vUE 701-3, which are the same or similar to vUEs 401 of FIG. 4) are under coverage of the NAN 710 (or camping on the NAN 710). The NAN 710 may be a radio infrastructure node (e.g., RSU or R-ITS-S), radio access point (RAP) providing ITS-G5 and/or DSRC network service, or a RAN node providing cellular network service (e.g., an eNB, gNB, or the like). In scenario 700, vUE 701-1 and vUE 701-2 have a same planned route from location A to location B, and vUE 701-3 has planned a different route from location C to location D. In this example, each vUE 701 is attempting to obtain SOTA and/or FOTA updates, where vUE 701-1 has a latest version (e.g., v1.3) of a specific SW package installed, and vUE 701-2 and vUE 701-3 have an outdated version (e.g., v1.2) installed. For vUE 701-2 and vUE 701-3 to obtain a recommendation upon launching or postponing SW package download, process 600 of FIG. 6 may be performed, which may be as follows.

At operation 1, vUE 701-1 reports, to the MEC Host 740 via transmission to the NAN 710, a planned journey from location A to location B and indicates that SW package v1.3 is installed at vUE 701-1. At operation 2, vUE 701-2 reports, to the MEC Host 740 via transmission to the NAN 710, a planned journey from location A to location B and indicates that SW package v1.2 is installed at vUE 701-2. At operation 3, vUE 701-3 reports, to the MEC Host 740 via transmission to the NAN 710, a planned journey from location C to location D and indicates that SW package v1.2 is installed at vUE 701-3. At operation 4, each of vUE 701-1, vUE 701-2, and vUE 701-3 upload respective radio signal quality measurements, tailored to vUE locations and time-stamps. In this example, vUE 701-1 uploads fewer tagged measurements as compared to vUE 701-2 and vUE 701-3, as it is not in need of a SW package update (for the moment). At operation 5, the MEC Host 740 acquires and repartitions all raw data according to a journey-based criterion; two data partitions are obtained: one relevant to the route between locations A and B and one relevant to the route between locations C and D.

At operation 6, the MEC Host 740, based on the first data partition (sourced by vUE 701-1 and vUE 701-2), and for example, by using statistical tools, ML/AI algorithms, etc., predicts the radio signal quality that vUE 701-2 is expected to experience and, taking into account the SW package's size recommends vUE 701-2 to start or postpone the download. In case of a recommended start, the starting time of download is also recommended. At operation 7, the MEC Host 740 predicts the radio signal quality that vUE 701-3 is expected to experience, and taking into account the SW package's size recommends vUE 701-3 to start or postpone the download. The prediction is based on the second data partition, which may be enriched with past measurements obtained, relevant to the route between locations C and D. In case of a recommended start, the starting time of download is also recommended.

Although embodiment 1 is discussed as being implemented by MEC hosts co-located with network access infrastructure, in some implementations, an in-vehicle MEC host (see e.g., FIGS. 8-9) could provide journey-specific QoS predictions for its own local MEC apps, or for other MEC hosts (including other in-vehicle MEC hosts), in case Vehicle-to-Vehicle (V2V) communication is feasible, e.g., by utilizing sidelink/short-range connectivity.

II.C. Embodiment 2

The second embodiment is related to MEC system implementations where MEC hosts is/are deployed at, or co-located with one or more NANs and MEC hosts co-located at or implemented by vUEs. The NANs may be the same or similar as NANs 110, 210, 410, and 710 of FIGS. 1A-6, discussed previously, and the MEC hosts may be the same or similar as MEC hosts 140, 240, 340, 440, and 740 of FIGS. 1A-6, and/or MEC host 1502 of FIG. 15 or the like. MEC hosts co-located at or implemented by vUEs are referred to as "in-vehicle MEC hosts" or the like.

Figure 8:
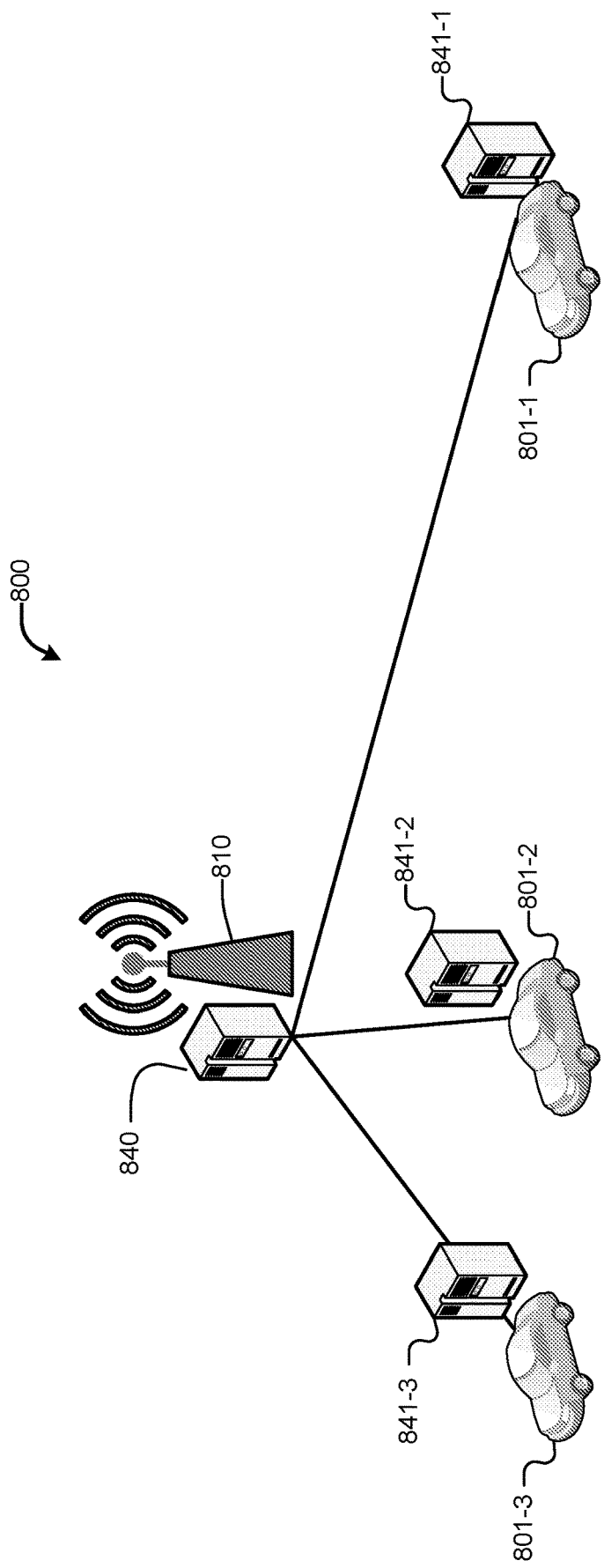
FIG. 8 depicts an example layered MEC system comprising a Master MEC host co-located with a NAN, and in-vehicle MEC hosts co-located with a respective vUEs.

Today's passenger vehicles incorporate a diverse embedded computing environment, responsible for handling various functionalities of different nature. Such an environment is composed of processing units and processes, where, information is exchanged by means of specific industrial message buses, however it is rather complex, hardly reconfigurable and also highly specialized in order to cater to dissimilar functions. To remedy such issues, the proposed use case consists in the availability of in-vehicle MEC hosts supporting automotive workloads encountered in a passenger vehicle. Such workloads may be tailored to several similar or diverse functions (e.g. relevant to safety, telematics, high resolution maps for navigation, as well as video and other infotainment applications) impacting different On-Board Units (OBUs), for instance, Engine Control Units (ECUs) of a passenger vehicle. As an example, FIG. 8 illustrates a system scenario 800, according to which, two vUEs 801 running different applications, are connected to a given radio node 810 (e.g., cellular connectivity). Each application is running on a MEC host 841 embedded within the corresponding vUE 841.

FIG. 8 depicts an example layered MEC system 800 comprising a Master MEC host 810 co-located with a NAN 810 (e.g., RAP or RAN node), and in-vehicle MEC hosts 841 co-located with a respective vUE 801 under coverage. For instance, in-vehicle MEC host 841-1 is co-located with vUE 801-1, in-vehicle MEC host 841-2 is co-located with vUE 801-2, and in-vehicle MEC host 841-3 is co-located with vUE 801-3.

As a recent trend in automotive industry is to develop the software architecture utilizing less processing units and encompassing more open operating systems, MEC technology can add constructively to such a trend as it offers an open, standardized environment for efficiently integrating applications running on a passenger vehicle. Additionally, MEC architecture, materialized by means of MEC hosts deployed on-board passenger vehicles, can offer content storage and memory capabilities and can enhance contextual awareness via exploiting radio network, location, and/or any other information relevant to the changing environment during journey time. It is noteworthy that the fluctuating connectivity conditions an in-vehicle MEC host may experience, together with its possibly limited processing, memory and storage capabilities and vehicle ownership aspects may impact its efficient management. In the example of FIG. 8, the three vUEs 801 are running different applications. Today's passenger vehicles incorporate a diverse embedded computing environment, responsible for handling various functionalities of different nature. Such an environment is composed of processing units and processes, where, information is exchanged by means of specific industrial message buses, however it is rather complex, hardly reconfigurable and also highly specialized in order to cater to dissimilar functions. To remedy such issues, the in-vehicle MEC hosts 841 support automotive workloads encountered in V2X applications. Such workloads may be tailored to several similar or diverse functions (e.g., relevant to safety, telematics, high resolution maps for navigation, as well as video and other infotainment applications) impacting different On Board Units (OBUs), for instance, the Engine Control Unit (ECU) of a passenger vehicle. As an example, FIG. 1 illustrates a system scenario, according to which, two passenger vehicles running different applications, are connected to a given radio node (cellular connectivity). Each application is running on a MEC host embedded within the corresponding passenger vehicle.

The functionalities for in-vehicle MEC hosts 841 may include hosted MEC apps running different types of workloads (e.g., Machine Learning (ML), data analytics, sensor measurement fusion from vehicles and the environment, privacy enforcement for data streams destined to a cloud (e.g. face blurring in video streams from on-board cameras), and/or the like). Different MEC apps can either share data directly, or also through the MEC V2X API. The in-vehicle MEC hosts 841 may also enable offloading processing-demanding tasks from vUEs 801 to the network (e.g., relevant to computation-hungry applications such as Augmented Reality (AR), Virtual Reality (VR), Artificial Intelligence (AI), etc.) The in-vehicle MEC hosts 841 may also provide a common application framework for independent deployment across service providers, through the adoption of interoperable RESTful APIs, thus, also enabling cost-effective and efficient application lifecycle and V2X service provisioning.

In this example, the master MEC host 840 runs and/or provides various enhanced (e.g., cell/coverage area-wide) MEC services via respective MEC APIs (hereinafter referred to as "Master MEC APIs", "Master APIs", or the like). Other entities, such as the vUEs 801, in-vehicle MEC hosts 841, in-vehicle MEC apps, other MEC hosts 840, remote application servers, or the like, use the Master MEC APIs to access information/services from the master MEC host 840. The master MEC APIs are discussed in more detail infra.

Additionally, each vUE 841 runs and/or provides local UE MEC services, which may be UE-based versions of the MEC services that can be accessed via respective MEC APIs (hereinafter referred to as "UE MEC APIs", "UE APIs", or the like). Other entities, such as NAN 810, Master MEC host 840, other vUEs 801, other in-vehicle MEC hosts 841, MEC apps hosted by the in-vehicle MEC host 841, external MEC apps, other MEC hosts 840, remote application servers, or the like, use the UE MEC APIs to access information/services from an in-vehicle MEC host 841. The UE MEC APIs are discussed in more detail infra.

The procedure for accessing and/or providing journey-specific QoS predictions for the second embodiment is similar to the procedure of the first embodiment, with the difference being that the decision to launch/postpone an action (e.g., content delivery, SW updates, etc.) is not taken centrally at the MEC Host 840 co-located with the NAN 810, but instead is determined at the respective in-vehicle MEC hosts 841 via an analytics MEC app, such as a specialized RNI analytics MEC app. In this way, each vUE 801 can control its own networking and processing performance based on journey-specific partitions of cell/region/area/-wide measurements gathered at the network side.

Figure 9:
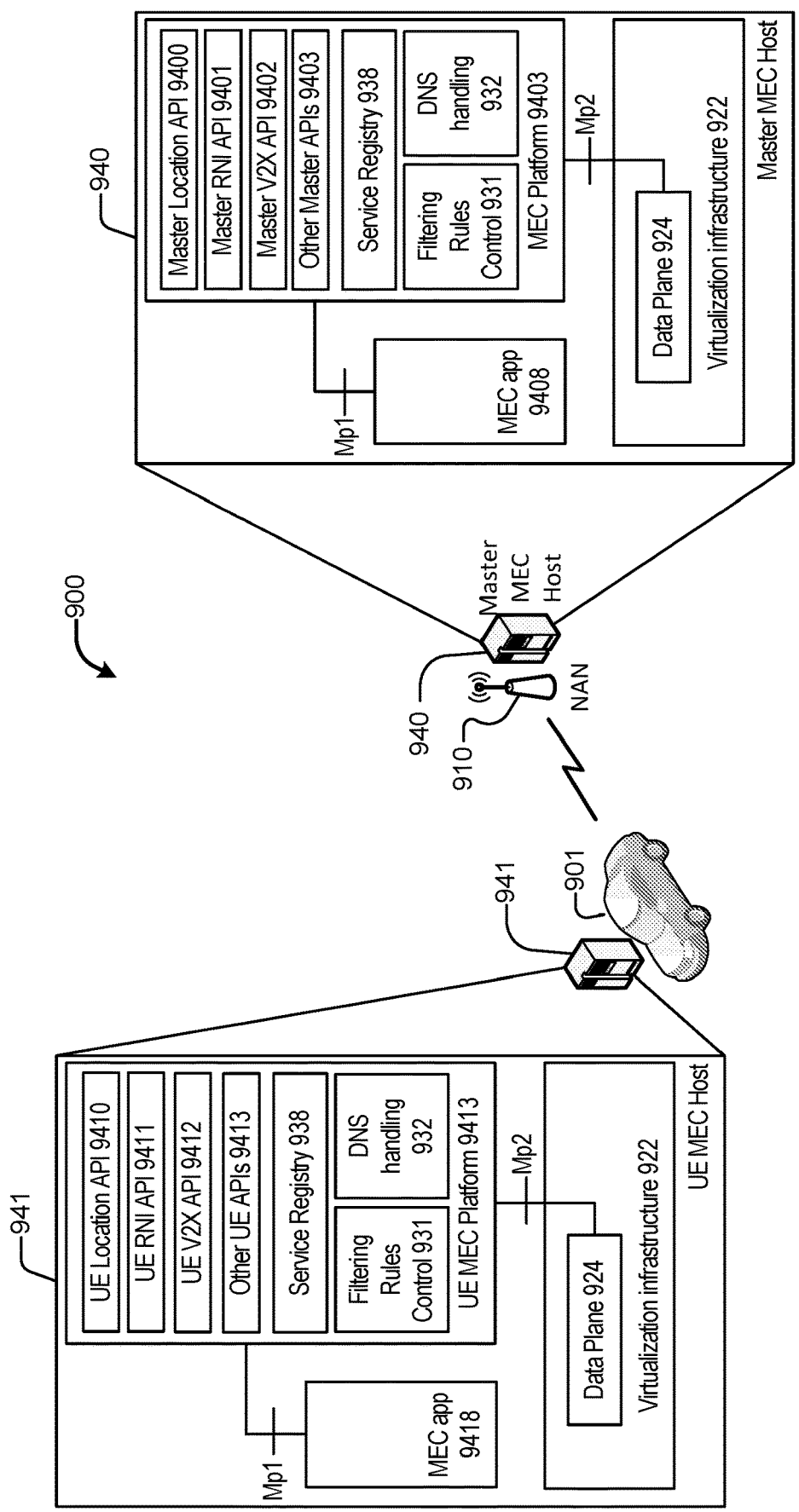
FIG. 9 depicts an information collection framework according to the various embodiments.

FIG. 9 depicts an information collection framework 900 according to the second embodiment. In this embodiment, the Master MEC host 940 (corresponding to master MEC host 840 of FIG. 8) is co-located with NAN 910 (corresponding to NAN 810 of FIG. 8). Additionally, the vUE 901 (corresponding to any of the vUEs 801 of FIG. 8) is hosting an in-vehicle MEC host 941 (corresponding to any of the in-vehicle MEC hosts 841 of FIG. 8).

The master MEC host 940 hosts or implements MEC apps 9408 (corresponding to any of the MEC apps discussed herein) and MEC platforms 9403. The in-vehicle MEC host 941 hosts or implements local instances of MEC apps 9418 (corresponding to any of the MEC apps discussed herein) and MEC platforms 9413. The MEC hosts 940, 941 each include their own virtualization infrastructure 922 and their own data plane instances 924. The MEC platforms 9403, 9413 include respective instances of a service registry 938, filtering rules control 931, DNS handling 932, and various MEC APIs.

As mentioned previously, the master MEC host 940 provides various MEC services including, for example, the VIS, RNIS, BWMS, LS, WAIS, FAIS, and/or other like services. Access to the MEC services is provided by respective MEC APIs such as the Location API 9400 (providing access to the LS), Master RNI API 9401 (providing access to the RNIS), Master V2X API 9402 (providing access to the VIS), and other Master MEC APIs 9403. The other Master MEC APIs 9403 may include, for example, the UE_ID API (providing access to the UE_ID Services), BWM API (providing access to the BWMS), WAI API (providing access to the WAIS), FAI API (providing access to the FAIS), and/or other like APIs. In some embodiments, the Master V2X API 9402 may have a Resource URI structure as depicted by FIG. 12, and the methods shown by table 7.2-1 supra.

Additionally, the in-vehicle MEC host 941 runs and/or provides local UE MEC services, which may be UE-based versions of the VIS, RNIS, LS, BWMS, UE_ID services, WAIS, FAIS, and/or the like, which may be accessed using respective UE RNI APIs such as the UE Location API 9410, UE RNI API 9411, UE V2X API 9412, and other UE MEC APIs 9413. The other UE MEC APIs 9412 may include, for example, UE-based UE_ID API, BWM API, WAI API, FAI API, and/or the like. The UE MEC APIs may be the same as the Master MEC APIs, or the UE MEC APIs may be specifically adapted/tailored to in-vehicle MEC hosts 941. In some embodiments, the UE V2X API 9412 may have a Resource URI structure as depicted by FIG. 12, and the methods shown by table 7.2-1 supra.

In various embodiments, the Master MEC host 940, by making use of the Master V2X API 9402 (or UE V2X API 9412), periodically collects UE information (e.g., RNI, location, UE identity, V2X information, etc.) from all vUEs 901 under network coverage of the NAN 910, while each in-vehicle MEC host 941 collects local information to be fed back to the Master MEC host via the UE MEC APIs (e.g., UE V2X API 9412 and/or Master V2X API 9402). The Master MEC host 940 uses the collected information to generate the partitions as discussed previously, and the in-vehicle MEC hosts 941 processes journey-related information partition received from the Master MEC host 940 with the aim of reaching a decision to launch/postpone a particular action (e.g., downloading SOTA/FOTA updates, streaming content at a particular data rate, buffering data downloads at a particular location/time, and/or the like). This decision is made by a locally instantiated MEC app 9418 at the in-vehicle MEC host 941, such as an RNI analytics MEC app 9418 or the like.

For example, at Step 4b of the vUE journey-aware QoS prediction procedure, upon one or more content delivery requests (e.g., SOTA/FOTA updates), the in-vehicle MEC host 941 instantiates or executes an RNI analytics MEC app 9418, consuming journey-specific parts of the acquired composite UE context information distributed by the master MEC host 940. The RNI analytics MEC app 9418 schedules content delivery requests and/or recommends the activation/deactivation of particular V2X application features (e.g., autonomous driving features, etc.) subject to the obtained journey-specific partition of the composite RNI information. These embodiments may be useful when a vUE 901 moves out of network (e.g., cellular) coverage since the collected RNI referring to such geographical areas (possibly by more capable UEs) will be already known beforehand. Therefore, the vUE 901 will be able to adapt its operation (e.g., postpone or reduce the download rates to adapt to unfavorable radio conditions) even without network (e.g., cellular) coverage by one or more NANs 910.

Example Data Structures. The data/information structures may be the same or similar as described in the first embodiment, with a difference being the message transmitted by the NAN 910 at Step 4b of the vUE journey-aware QoS prediction procedure. In this embodiment, as the decision is to be taken at the in-vehicle MEC Host 941, a journey-specific set of measurements (e.g., information partition) is transmitted from the NAN 910 exclusively to a vUE 901 using unicast transmission, or to a cluster of vUEs 801/801 by means of multicast transmission. An example of such a data structure is depicted by table 4.

TABLE 4

| Route Point | Measurement Timestamp | Measurement Location | Measurement Value |
| --- | --- | --- | --- |
| 1 | TS_1 | Loc_1 | Meas_1 |
| 2 | TS_2 | Loc_2 | Meas_2 |
| ... | ... | ... | ... |
| S | TS_S | Loc_S | Meas_S |

The data structure of table 4 provides each of a measurement timestamp, measurement location, and measurement value for respective route points 1 to S, where S is a number. In the example of table 4, "TS" refers to a particular timestamp value, "Loc" refers to a particular location value, and "Meas" refers to a particular radio measurement value. The timestamp refers to a time when a measurement is taken, as determined by the vUE 801/801 with respect to some reference time which may be based on some suitable internal or external clock that provides the reference time. The timestamp may be a universal clock indication and/or the TimeStamp data type provided by the MEC LS via the Location API 9400, 9410. The measurement location is a location (e.g., geolocation, cell location, or the like) at which the measurement was taken, and may be expressed using any suitable location/geolocation indication such as the LocationInfo data type provided by the MEC LS via the Location API 9400, 9410 (e.g., GPS/GNSS coordinates based on the World Geodetic System 1984 (WGS 84) and/or 3GPP-based location services (see e.g., [R10] and ETSI TS 123 032 V15.1.0 (2018 September)). Additionally or alternatively, WLAN location services may be used for the measurement location. For example, the Dynamic Host Configuration Protocol (e.g., DHCPv4 and DHCPv6) coordinate-based geographic locations of the vUE 901 may be used, which includes Location Configuration Information (LCI) and the LCI includes latitude, longitude, and altitude data/coordinates with resolution or uncertainty indicators for each data/coordinate (see e.g., IETF RFC 6225 (2011 July)). The measurement values may be any of the aforementioned measurement types thereof (e.g., RSRP, RSRQ, etc.) or combinations. In some embodiments, the measurement values may be provided by any of the UE measurement reports discussed in [R09], for example, by Layer 2 measurements information (L2Meas), 5G UE measurement report (NrMeasRepUeSubscription), and/or the like. Additionally or alternatively, the data structure of table 4 may be, or include, the RNIS measurement reports provided by the RNIS, which includes timestamp and cell ID information. Additionally or alternatively, the measurement reports provided by the RNIS may include additional or supplemental location information provided by the MEC LS to provide a more precise (geo)location of the vUEs 901.

Figure 10:
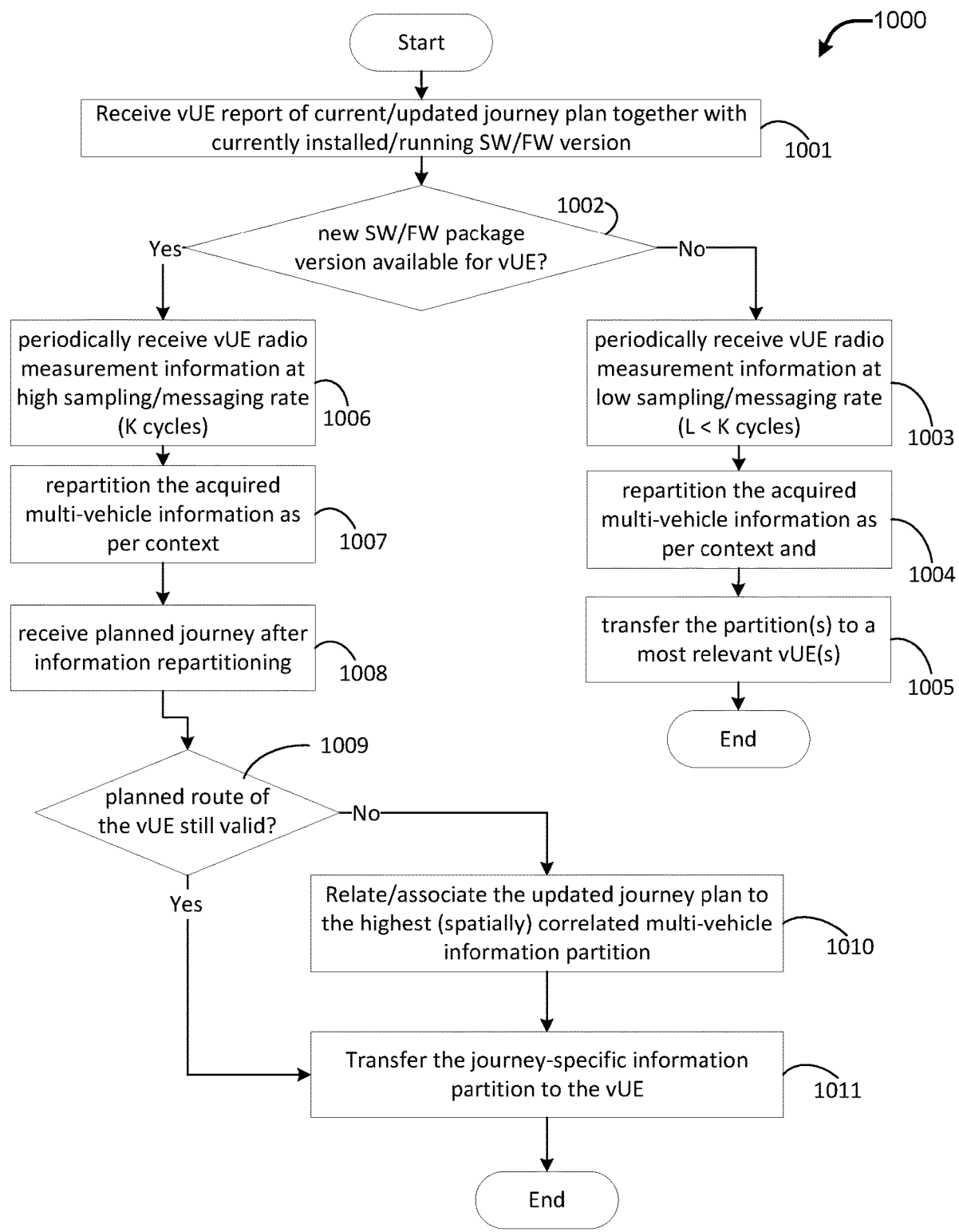
FIG. 10 depicts example QoS notification process according to a second embodiment.

FIG. 10 depicts an example process 1000 according to the second embodiment. The procedure of FIG. 10 is a single decision cycle that may be performed by a MEC host 940 co-located with a NAN 910 and/or one or more vUEs 901 with in-vehicle MEC hosts 941 within the coverage area of the NAN 910. Process 900 is described as being used to make a decision on whether to download SW and/or FW updates, however, process 1000 may be used to make decisions about other types of data transfer use cases such as those discussed herein.

Procedure 1000 begins at operation 1001 where the master MEC host 940 (or in-vehicle MEC host 941) receives a report of the vUE's 901 current and/or updated journey plan together with the version of its running SW/FW. (When performed by an in-vehicle MEC host 941, the vUE 901 whose route is being analyzed may be the vUE 901 in which the in-vehicle MEC host 901 is disposed or another vUE 901 that implements another in-vehicle MEC host 941; in the latter case, it is assumed that V2V communication is feasible (e.g., sidelink/short range communication). At operation 1002, the Master MEC host 940 (or in-vehicle MEC host 941) determines if there a new SW/FW package version available for the vUE 901. If there is no new SW/FW package version available for the vUE 901, then at operation 1003 to vUE 901 periodically provides locally experienced radio quality information to the MEC Host 940 at a low sampling/messaging rate. In embodiments, the vUE 901 reports its radio measurements at a low sampling/messaging rate (e.g., L<K cycles wherein K and L are numbers). At operation 1004, the Master MEC host 940 (or in-vehicle MEC host 941) repartitions the acquired multi-vehicle information as per context (e.g., relevance to the planned routes of the vUEs 901 under coverage), and at operation 1005, the master MEC host 940 (or in-vehicle MEC host 941) undertakes to transfer each information partition to the most relevant vUE(s) 901 via unicast/multicast transmissions (and/or sideline/PC5 transmission(s) when performed by the in-vehicle MEC host 941). Here, the most relevant vUE(s) 901 may be based on the context information (e.g., relevance to the planned routes of the vUEs 901). Additionally, at or after operation 1005, each vUE 901 in need of a SW/FW update processes the received information partition at a respective in-vehicle MEC host 941. In embodiments, an RNI analytics MEC app 9418 decides upon the start time, location, and/or postponement (if necessary) of the download. After performance of operation 1005, procedure 1000 ends.

Referring back to operation 1002, if the master MEC host 940 (or in-vehicle MEC host 941) determines that there is a new SW/FW package version available for the vUE 901, then at operation 1006 the master MEC host 940 (or in-vehicle MEC host 941) periodically receives radio measurements at a high sampling/messaging rate. In embodiments, the vUE 901 periodically provides locally experienced radio quality information to the Master MEC Host 940 (or in-vehicle MEC host 941) at the high sampling/messaging rate (e.g., K cycles wherein K is a number). In other words, when the currently installed version of the SW/FW package is the latest and/or newest version, measurements are provided at a low rate (see e.g., operation 1003); conversely, when the currently installed version of the SW/FW package is not the latest and/or newest version (e.g., a SW/FW package update is needed or desired), measurements are provided at a higher rate (see e.g., operation 1006). At operation 1007, the master MEC host 940 (or in-vehicle MEC host 941) repartitions the acquired multi-vehicle information as per context (e.g., relevance to the planned routes of the vehicles under coverage), and at operation 1008, the master MEC host 940 (or in-vehicle MEC host 941) receives the vUE's 901 planned journey after information repartitioning. In embodiments, the vUE 901 reports its planned journey after information repartitioning at the master MEC host 940 (or in-vehicle MEC host 941).

At operation 1009, the master MEC host 940 (or in-vehicle MEC host 941) determines whether the planned route of the vUE 901 is still valid based on the updated journey information obtained at operation 1008. If the planned route of the vUE 901 is not still valid, the master MEC host 940 (or in-vehicle MEC host 941) proceeds to operation 1010, where the master MEC host 940 (or in-vehicle MEC host 941) relates or associates the most appropriate partition (e.g., the most highly contextually correlated partition) to the focused vUE 901 (e.g., the vUE 901 whose route is being analyzed/processed). In some embodiments, after the updated journey plan is communicated by the vUE 901, the master MEC host 940 (or in-vehicle MEC host 941) does not perform any further information partitioning; instead, the master MEC host 940 (or in-vehicle MEC host 941) performs operation 1010.

Referring back to operation 1009, if the master MEC host 940 (or in-vehicle MEC host 941) determines that the planned route of the focused vUE 901 is still valid, then the master MEC host 940 (or in-vehicle MEC host 941) proceeds directly to operation 1011 to transfer the journey-specific information partition to the focused vUE 901 via a unicast or multicast transmission. After operation 1009 or 1010, at operation 1011, the master MEC host 940 undertakes to transfer the journey-specific information partition to the focused vUE 901 via a unicast or multicast transmission (and/or sidelink/PC5 transmission(s) when performed by the in-vehicle MEC host 941). Additionally, at or after operation 1011, the vUE 901 (or an RNI analytics MEC app 9418 instantiated at the in-vehicle MEC host 941) performs journey-specific QoS predictions and provides recommendations based on the journey-specific QoS predictions. Here, the vUE 901 (or an RNI analytics MEC app 9418 instantiated at the in-vehicle MEC host 941) decides upon the start time, location, and/or postponement (if necessary) of the download or other data transfer. After performance of operation 1011, procedure 1000 ends.

II.D. MEC VIS Planned Route Aware QoS Notification

In the embodiments discussed supra, the usefulness of the MEC VIS API is highlighted when it comes to obtaining journey-aware QoS predictions. These predictions are used by MEC apps that need to be informed of radio conditions "en route", ahead of a vUE's passing time, before reaching a decision on whether to transfer data in either or both of the DL or UL directions (e.g., enabling/disabling autonomous driving features, downloading infotainment content, scheduling SOTA/FOTA updates, etc.). A challenge for the MEC VIS (e.g., VIS 280 of FIG. 2) is to identify space/time correlations between radio data (RNI) collected by different vUEs in a V2X (e.g., C-V2X) system and a specific vUE's planned journey/route for better prediction of the quality of the communication network (e.g., radio conditions, QoS, etc.) along the designated route. To obtain timely and accurate QoS predictions along a planned vUE route, the VIS API may need to gather and process information available by other MEC APIs (see e.g., FIGS. 2, 3, and 8). As a consequence, new VIS API resource elements are needed to gather and process information available by other MEC API, each of which may be useful to a use case/set of V2X use cases.

Currently, no solutions have been proposed to exploit the space-time correlations between RNI communicated by vUEs under network (e.g., cellular) coverage and the planned routes of these vUEs (or other vUEs under network coverage) in order for the system to produce journey-specific QoS notifications. On top of that, no solutions have proposed any processes/procedures and/or data types to accomplish these tasks.

The embodiments herein emphasize the role of the VIS when it comes to producing journey-specific QoS notifications. To accomplish such a task, embodiments herein provide procedures and/or processes (e.g., sequence diagrams) and a data type reflecting the planned journey of a vUE. The embodiments herein provide a framework for cooperative acquisition, partitioning, and distribution of information for journey-specific QoS prediction in MEC implementations. According to various embodiments, a VIS consumer (e.g. a MEC app or a MEC platform) sends a request to the VIS to receive planned route information of a particular vUE. One or more data types representing the planned route (e.g., location) information of a vUE are also provided. This information is per UE (e.g., tailored to a specific UE identity). Attributes of the data type refer to times and locations of interest for a given vehicular UE. The procedures/processes and data types discussed herein may be included in the ETSI MEC V2X service (VIS) specifications. The embodiments may also be part of service subscriptions/notifications and the resource tree of the MEC VIS API. The embodiments herein provide energy efficiency in V2X communications by enabling communication/signaling resource conservation through resource allocation over large areas/regions, as well as better Quality-of-Experience (QoE) V2X users.

Embodiments 1 and 2 discussed above concentrate on the role of the VIS when it comes to producing journey-specific QoS predictions. The MEC VIS notification embodiments may be used in embodiments 1 and 2 to exchange other relevant information for the journey-specific QoS predictions and task decisions. The MEC VIS notification embodiments include example procedures/processes, according to which a service consumer (e.g. MEC Apps 1526 and/or MEC platform 1532 of FIG. 15) sends a request for planned route information of a particular vUE, and example data type(s) representing the planned route (location) information of the vUE. This information is per vUE (e.g., tailored to a specific UE identity). Attributes of the data type(s) refer to times and locations of interest for a given vUE.

FIG. 11 illustrates example V2X/VIS API procedures 1101, 1102, and 1103, according to various embodiments. In the procedures of FIG. 11, a service consumer (e.g., a VIS consumer such as a MEC app or a MEC platform) sends a request for information of a particular vUE (e.g., vUEs 101, 201, 401, 701, 801, 901 discussed previously). In response to the request, a service provider, which is a VIS (e.g., VIS 280 of FIG. 2, VIS provided by V2X APIs 9402 and 9412 of FIG. 9, and the like) generates a response including the requested information, and sends the response to the service consumer. The service consumer receives the response including the requested information from the VIS.

FIG. 11 includes a first procedure 1101, which is a procedure where the service consumer requests the planned route information of a particular vUE. Procedure 1101 begins at operation 1101-1 where the service consumer (or VIS consumer) sends a request message to the VIS, which is the service producer (or "VIS producer"). In this embodiment, the VIS is a resource representing the planned route information, and the VIS consumer uses the GET method to obtain (e.g., read) the planned route information resource. In embodiments, the request contains UE identity information of the vUE as an input parameter. The request message may be an HTTP GET message with the request line "GET . . . /planned_route_info?ue_id" where the "ue_id" parameter is the UE identity information. Here, the resource URI is "{apiRoot}vis/v1/planned_route_info?ue_id". In some embodiments, the request may include a service consumer instance ID as an input parameter, which may be included in a message body of the request message.

At operation 1101-2, the service producer (e.g., the VIS) responds with a response/reply message including a message body containing the planned route information. In this embodiment, the response message is an HTTP response message including the status code "200 OK" in the header of the HTTP message, which indicates that the service consumer's request succeeded. Additionally, the requested planned route information data structure (PlannedRouteInfo) is included in the body of the HTTP response message. In some embodiments, the response message may include a PlannedRouteInfo IE, field, data field, data element, or the like to include the PlannedRouteInfo data structure. In this embodiment, the GET method is used to request the planned route information corresponding to the potential routes of the vUE whose ID is provided in the request. This method supports the URI query parameters, request and response data structures, and response codes, as specified in tables 5 and 6.

TABLE 5

URI query parameters supported by the GET method on PlannedRouteInfo resource

| Name | Data type | Cardinality | Remarks |
|---|---|---|---|
| ue_id | String | 1 | Comma separated list of locations to identify a cell of a base station or a particular geographical area, formatted as follows for the two cases. .../planned_route_info?ue_id,{String} Where the String is made up of 1 to N comma separated ue_id values, where each value corresponds to a particular vehicular UE. |

TABLE 6

Data structures supported by the PlannedRouteInfo GET resources

| Data type | Cardinality | Response Codes | Remarks |
|---|---|---|---|
| PlannedRouteInfo | 1 | 200 OK | Upon success, a response body containing the planned route information corresponding to potential routes of a vUE is returned. |
| ProblemDetails | 0 . . . 1 | 400 Bad Request | Used to indicate that incorrect parameters were passed to the request. In the returned ProblemDetails structure, the "detail" attribute should convey more information about the error. |
| ProblemDetails | 0 . . . 1 | 401 Unauthorized | Used when the client did not submit credentials. In the returned ProblemDetails structure, the "detail" attribute should convey more information about the error. |
| ProblemDetails | 1 | 403 Forbidden | Indicates that the operation is not allowed given the current status of the resource. More information shall be provided in the "detail" attribute of the "ProblemDetails" structure. |
| ProblemDetails | 0 . . . 1 | 404 Not Found | Used when a client provided a URI that cannot be mapped to a valid resource URI. In the returned ProblemDetails structure, the "detail" attribute should convey more information about the error. |

The PlannedRouteInfo is a resource data type. The PlannedRouteInfo type represents the planned route (location) information of a vUE. This information is per UE based (e.g., tailored to a specific UE identity). The attributes of the PlannedRouteInfo may follow the notations provided in table 7.

TABLE 7

Attributes of PlannedRouteInfo

| Attribute name | Data type | Cardinality | Description |
|---|---|---|---|
| origin | LocationInfo | 1 | Route origin. |
| destination | LocationInfo | 1 | Route destination. |
| intermediateLocations | Structure (inlined) | 0 . . . N | Set of intermediate locations to be visited by the vehicular UE. |
| >intermediateLocation | LocationInfo | 1 | An intermediate location among the set of intermediate locations to be visited by the vehicular UE. |
| timeJourneyStart | TimeStamp | 0 . . . 1 | Time of journey start. |
| timeJourneyEnd | TimeStamp | 0 . . . 1 | Expected Time of journey end. |

FIG. 11 also includes a second procedure 1102 where the service consumer requests the planned route information of a particular vUE. Procedure 1102 is a scenario where, the service consumer (e.g., a V2X application, MEC app, etc.) sends a request to the VIS to receive predicted QoS corresponding to potential routes of a vUE, and receives a response containing the required/requested information (e.g., the predicted QoS information).

Procedure 1102 begins at operation 1102-1 where the service consumer (e.g., VIS consumer) sends a request message to the VIS, which is the service producer (or "VIS producer"). In this embodiment, the VIS is a resource representing the planned route information and/or predicted QoS for the relevant vUE. The (request) message body contains the data structure for the predicted QoS relevant to potential routes of the vehicular UE (discussed infra). The request message may be an HTTP POST message with the request line "POST . . . /provide_predicted_qos". Here, the resource URI is "{apiRoot}/vis/v1/provide_predicted_qos". In some embodiments, the request may also include a service consumer instance ID as an input parameter, which may be included in a message body of the request message.

At operation 1102-2, the service producer (e.g., the VIS) responds with a response/reply message including a message body containing the predicted QoS information data structure (PredictedQoS). In this embodiment, the response message is an HTTP response message including the status code "200 OK" in the header of the HTTP message, which indicates that the service consumer's request succeeded. Additionally, the requested PredictedQoS is included in the body of the HTTP response message. In some embodiments, the response message may include a PredictedQoS IE, field, data field, data element, or the like to include the PredictedQoS data structure.

In this embodiment, the POST method is used to request the predicted QoS correspondent to potential routes of a vUE. This method supports the URI query parameters, request and response data structures, and response codes, as specified in table 8.

TABLE 8

Data structures supported by the PredictedQos POST request/response

| | Data type | Cardinality | Remarks |
|---|---|---|---|
| Request body | PredictedQos | 1 | Entity body in the request contains the predicted QoS as requested by the VIS consumer. |

| | Data type | Cardinality | Response Codes | Remarks |
|---|---|---|---|---|
| Response body | PredictedQos | 1 | 200 OK | The response body contains the predicted QoS corresponding to potential routes of a vehicular UE. |
| | ProblemDetails | 0 . . . 1 | 400 Bad Request | Used to indicate that incorrect parameters were passed to the request. In the returned ProblemDetails structure, the "detail" attribute should convey more information about the error. |
| | ProblemDetails | 0 . . . 1 | 401 Unauthorized | Used when the client did not submit credentials. In the returned ProblemDetails structure, the "detail" attribute should convey more information about the error. |
| | ProblemDetails | 1 | 403 Forbidden | Indicates that the operation is not allowed given the current status of the resource. More information is to be provided in the "detail" attribute of the "ProblemDetails" structure. |
| | ProblemDetails | 0 . . . 1 | 404 Not Found | Used when a client provided a URI that cannot be mapped to a valid resource URI. In the returned ProblemDetails structure, the "detail" attribute should convey more information about the error. |

The PredictedQos is a resource data type. The PredictedQos type represents the predicted QoS of a vehicular UE. This information is per UE potential route based. The attributes of the PredictedQos may follow the notations provided in table 9.

TABLE 9

Attributes of the PredictedQos

| Name | Data type | Cardinality | Remarks |
|---|---|---|---|
| timeGranularity | TimeStamp | 0 . . . 1 | Time granularity of visiting a location. |
| locationGranularity | String | 1 | Granularity of visited location. Measured in meters. |
| routes | Structure (inlined) | 1 . . . N | Information relating to the potential routes of a vehicular UE. |
| >routeInfo | Structure (inlined) | 2 . . . N | Information relating to a specific route. The first structure relates to the route origin and the last to the route destination. Intermediate waypoint locations may also be provided. |

TABLE 9-continued

Attributes of the PredictedQos

| Name | Data type | Cardinality | Remarks |
| --- | --- | --- | --- |
| >>location | LocationInfo | 1 | Vehicular UE location. |
| >>time | TimeStamp | 0 . . . 1 | Estimated time at the location. |
| >>rsrp | Uint8 | 0 . . . 1 | RSRP as defined in [R15], [R16]; only included in the response. |
| >>rsrq | Uint8 | 0 . . . 1 | RSRQ as defined in [R15], [R16]; only included in the response. |

NOTE:
The data type of locationGranularity is a string which indicates the granularity of a visited location by means of latitudinal and longitudinal margins.
NOTE:
The data type of Uint8 is an unsigned integer of 8 bits.

In the example of table 9, the rsrp and rsrq attributes are only included in the response message. In other embodiments, the rsrp and rsrq attributes could also be included in the request message and the RSRP and RSRQ values contained therein could be used for journey-specific QoS predictions. For example, these RSRP and RSRQ values could be used as the radio information reported at step 2 of the journey-specific QoS prediction procedure discussed in section II.A supra. In this example, the RSRP and/or RSRQ values are "tagged" with the LocationInfo and the TimeStamp in the location and time data elements. As mentioned previously, other types of measurements could be additionally or alternatively included in the request or response messages in other embodiments.

In some embodiments, the time attribute may be included to indicate an actual time of visiting a particular location indicated by the LocationInfo, or a predicted time that the vUE is expected to visit the particular location. For example, the first routeInfo structure relating to the route origin may include an actual time that the vUE was at the route origin point, and the last routeInfo structure relating to the route destination point may be a predicted or expected time that the vUE is to arrive at the destination point. Intermediate routeInfo structures corresponding to waypoint locations can include actual times that the vUE visits those waypoint locations, predicted/expect times for arriving at the waypoint locations, or some combination thereof.

FIG. 11 also includes an example procedure 1103 for requesting PC5 provisioning information according to various embodiments. In procedure 1103, the service consumer (or a VIS consumer) (e.g., a MEC application or a MEC platform) sends a request to receive provisioning information for V2X communication over the PC5 interface for a particular location, and the response contains the required information.

Procedure 1103 begins at operation 1103-1 where the service consumer (or VIS consumer) sends a request message to a service producer (or VIS producer). The VIS is a resource representing the PC5 provisioning information. In embodiments, the location information (e.g., the serving cell ID of or the geographical area information of the UE) as an input parameter. In this example the request message may be an HTTP GET message with the request line "GET . . . /pro_info_PC5?location_info" where the "location_info" parameter is the location information. Here, the Resource URI is "{apiRoot}/vis/v1/queries/pc5_provisioning_info". In some embodiments, the request may include a service consumer instance ID as an input parameter, which may be included in a message body of the request message.

At operation 1103-2, the service producer (e.g., the VIS) responds with a response/reply message including a the message body containing the PC5 Provisioning Information. In one embodiment, the response message is an HTTP response message including the status code "200 OK" in the header of the HTTP message, which indicates that the service consumer's request succeeded. Additionally, the requested planned route information ("PC5ProvisioningInfo") is included in the body of the HTTP response message in, for example, a PC5ProvisioningInfo IE, field, data element, or other like data structure.

In this embodiment, the GET method is used to query provisioning information for V2X communication over PC5. This method supports the URI query parameters, request and response data structures, and response codes, as specified in tables 10 and 11.

TABLE 10

URI query parameters supported by the PC5ProvisioningInfo GET method

| Name | Data type | Cardinality | Remarks |
| --- | --- | --- | --- |
| location_info | String | 1 | Comma separated list of locations to identify a cell of a base station or a particular geographical area, formatted as follows for the two cases. . . . /pc5_provisioning_info?location_info=ecgi,{String} Where the String is made up of 1 to N comma separated ecgi values. . . . /pc5_provisioning_info?location_info=latitude,{String},longitude,{String} Where the two strings are made up of 1 to N comma separated latitude and longitude values respectively (reference clause 6.5.3), such that the number of latitude and longitude values shall be equal. |

TABLE 10-continued

URI query parameters supported by the PC5ProvisioningInfo GET method

| Name | Data type | Cardinality | Remarks |
|---|---|---|---|
| | | | Examples of query formats when N = 2 locations are provided below:<br>. . . /pc5_provisioning_info?location_info=ecgi,1357924680,1357924681<br>. . . /pc5_provisioning_info?location_info=latitude,000.000,001.000,longitude,000.000,001.000 |

TABLE 11

Data structures supported by the PC5ProvisioningInfo GET response

| Data type | Cardinality | Response Codes | Remarks |
|---|---|---|---|
| Pc5ProvisioningInfo | 1 | 200 OK | Upon success, a response body containing the PC5 provisioning information is returned. |
| ProblemDetails | 0 . . . 1 | 400 Bad Request | Used to indicate that incorrect parameters were passed to the request. In the returned ProblemDetails structure, the "detail" attribute should convey more information about the error. |
| ProblemDetails | 0 . . . 1 | 401 Unauthorized | Used when the client did not submit credentials. In the returned ProblemDetails structure, the "detail" attribute should convey more information about the error. |
| ProblemDetails | 1 | 403 Forbidden | The operation is not allowed given the current status of the resource. More information is to be provided in the "detail" attribute of the "ProblemDetails" structure. |
| ProblemDetails | 0 . . . 1 | 404 Not Found | Used when a client provided a URI that cannot be mapped to a valid resource URI. In the returned ProblemDetails structure, the "detail" attribute should convey more information about the error. |
| ProblemDetails | 0 . . . 1 | 406 Not Acceptable | Used to indicate that the server cannot provide any of the content formats supported by the client. In the returned ProblemDetails structure, the "detail" attribute should convey more information about the error. |
| ProblemDetails | 0 . . . 1 | 429 Too Many Requests | Used when a rate limiter has triggered. In the returned ProblemDetails structure, the "detail" attribute should convey more information about the error. |

The Pc5ProvisioningInfo is a resource data type. The Pc5ProvisioningInfo type represents the provisioning information required for V2X communication over PC5. This information is per location based (e.g., a cell of a base station, RSU, WAP/RAP, or a geographical area). The attributes of the Pc5ProvisioningInfo may follow the notations provided in table 12, and as defined in [R04], 3GPP TS 36.300 v15.5.0 (2019 Apr. 17), 3GPP TS 38.300 v15.5.0 (2019 Apr. 9), 3GPP TS 36.321 v15.5.0 (2019 Apr. 11) ("[R18]"), 3GPP TS 38.321 v15.5.0 (2019 Apr. 9) ("[R19]"), 3GPP TS 36.331 v15.5.1 (2019 Apr. 22) ("[R20]"), and 3GPP TS 38.331 v15.5.1 (2019 Apr. 16) ("[R21]").

TABLE 12

Attributes of the Pc5ProvisioningInfo

| Attribute name | Data type | Cardinality | Description |
|---|---|---|---|
| timestamp | TimeStamp | 0 . . . 1 | Time stamp. |
| proInfoPc5 | Structure (inlined) | 1 . . . N | The provisioning information per location as defined below. |
| >locationInfo | LocationInfo | 1 | Location information to identify a cell of a base station or a particular geographical area. |

TABLE 12-continued

Attributes of the Pc5ProvisioningInfo

| Attribute name | Data type | Cardinality | Description |
| --- | --- | --- | --- |
| >dstLayer2Id | String | 1 | For sidelink communication, the Destination Layer-2 ID is set to the ProSe Layer-2 Group ID or Prose UE ID, see e.g., [R18], [R19]. PLMN operators coordinate to make sure Destination Layer-2 ID(s) for different V2X services are configured in a consistent manner. |
| >neighbourCellInfo | Pc5NeighbourCellInfo | 0 ... N | The information of the neighbour cells in a visiting PLMN that support V2X communication over PC5. |

The Pc5NeighbourCellInfo attribute in table 12 may include a PLMN ID, an ECGI/NCGI, and SystemInformationBlockType21 as defined in [R20] and/or [R21].

According to various embodiments, the service (VIS) consumer uses the provided information to partition the acquired radio quality information per a journey-specific criterion (e.g., as discussed previously). As a result, by means of processing each radio information partition, journey-specific QoS predictive notifications are sent to the corresponding vUE (e.g., via a unicast transmission) or to a cluster of vUEs (e.g., via multi-cast transmission), which are characterized by similar planned routes.

As mentioned previously, PlannedRouteInfo, PredictedQos, and Pc5ProvisioningInfo are each resource data types. A resource is an object with a type, associated data, relationships to other resources, and a set of methods that operate on the resource. Tables 7, 9, and 12 define the data types and attributes that can be used for each of the resource representations. A data type is a particular kind of data item defined by the values it can take and/or the operations that can be performed on it. As shown by tables 7, 9, and 12, some of these attributes have simple data types where each data item can only store one value at a time (e.g., strings, unsigned integers ("Uint"), etc.), and structured data types where each data item is a collection of other data items. Some of the structured data types are defined by attributes listed in the same table (denoted as "Structured (inline)"). For example, in table 9 the routes attribute is a structured data type that includes one or more routeInfo attributes, and each routeInfo attribute includes location and time attributes, and rsrp and rsrq attributes if included in a response message. Some of the structured data types are common to each resource data type, such as the TimeStamp data type and the LocationInfo data type. The attributes of the TimeStamp data type and the LocationInfo data type may follow the notations provided in table 13 and table 14, respectively.

TABLE 13

Attributes of the Timestamp

| Attribute name | Data type | Cardinality | Description |
| --- | --- | --- | --- |
| seconds | Uint32 | 1 | The seconds part of the time. Time is defined as Unix-time since Jan. 1, 1970, 00:00:00 UTC. |

TABLE 13-continued

Attributes of the Timestamp

| Attribute name | Data type | Cardinality | Description |
| --- | --- | --- | --- |
| nanoseconds | Uint32 | 1 | The nanoseconds part of the time. Time is defined as Unix-time since Jan. 1, 1970, 00:00:00 UTC. |

NOTE:
The data type of Uint32 is an unsigned integer of 32 bits

TABLE 14

Attributes of the LocationInfo

| Attribute name | Data type | Cardinality | Description |
| --- | --- | --- | --- |
| ecgi | ECGI | 0 ... 1 | E-UTRAN Cell Global Identifier of the serving cell. |
| ncgi | NCGI | 0 ... 1 | 5G/NR Cell Global Identity of the serving cell. |
| geoArea | Structure (inlined) | 0 ... 1 | Information of a geographical area. |
| >latitude | Float | 1 | Latitude (DATUM = WGS84) −90 to 90 in decimal degree format DDD.ddd |
| >longitude | Float | 1 | Longitude (DATUM = WGS84) −180 to 180 in decimal degree format DDD.ddd |

NOTE:
Either ecgi/ncgi or geoArea shall be present, but not both.

In table 14, the "ECGI" refers to an E-UTRAN Cell Global Identifier, which is used to identify cells globally. The ECGI is constructed from a Mobile Country Code (MCC), Mobile Network Code (MNC), and the E-UTRAN Cell Identifier (ECI). The "NCGI" refers to an NR/5G Cell Global Identifier, which is used to identify cells globally, although a gNB may include multiple NCGI's. The NCGI is a concatenation of the PLMN Identifier (PLMN-Id) and the 36 bit NR Cell Identity (NCI).

In each of the procedures of FIG. 11, when the request is unsuccessful, fails, or includes error(s), the HTTP response message may include other HTTP status codes, such as a bad request status code (400) (e.g., when incorrect parameters are passed in the request), a not found status code (404) (e.g., when a URI provided in the request cannot be mapped to a valid resource URI), a forbidden status code (403) (e.g., when the operation is not allowed given the current status of the resource), and/or other like HTTP status codes. In the aforementioned examples, the response body may include a ProblemDetails IE, field, data element, or other like data structure indicating/including information about the particular error. Other message formats may be used in other embodiments, and the request/response data may be located in the header or body portion of such messages.

III. Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

Figure 13:
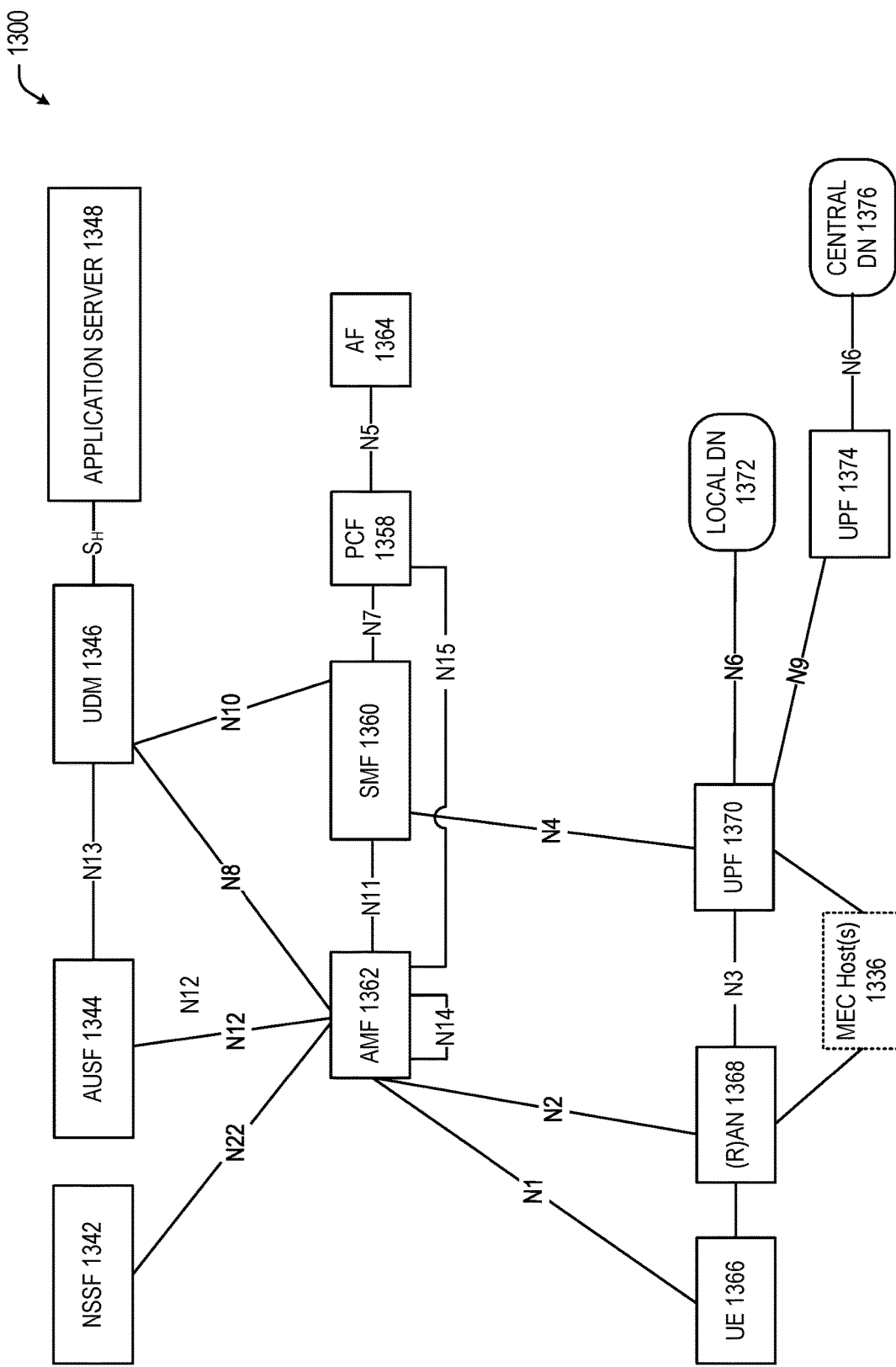
FIG. 13 illustrates an example 5G system architecture deployable in an edge computing system.

FIG. 13 illustrates a non-roaming 5G system architecture 1300 in a reference point representation, according to various embodiments. In FIG. 13, the UE 1366 is in communication with RAN 1368 as well as one or more other 5GC entities. The 5G system 1300 includes a plurality of network functions (NFs), such as access and mobility management function (AMF) 1362, session management function (SMF) 1360, policy control function (PCF) 1358, application function (AF) 1364, user plane function (UPF) 1370 and 1374, network slice selection function (NSSF) 1342, authentication server function (AUSF) 1344, and unified data management (UDM) 1346. The 5G system 1300 also includes an application server (AS) 1348 and one or more MEC hosts 1336, which may be the same or similar to any of the MEC hosts 140, 240, 340, 440, 740, 840, 841, 940, and/or 941 discussed previously.

The (R)AN 1368 may be a next generation RAN (NG-RAN) that includes a plurality of nodes, such as Next Generation NodeBs (gNBs) and NG Evolved Node-Bs (NG-eNBs). The AMF 1362 and the UPF 1370 can be communicatively coupled to the gNBs and/or the NG-eNBs via respective NG interfaces (not shown). The gNBs include node(s) providing NR/5G user plane and control plane terminations towards the UE 1366, and NG-eNBs include node(s) providing evolved universal terrestrial radio access (E-UTRA) user plane and control plane protocol terminations towards the UE 1366 and is connected via the NG interface to the 5GC. Specifically, the gNBs and/or NG-eNBs can be connected to the AMF 1362 by NG-C interfaces, and to the UPF 1370 by NG-U interfaces. The gNBs and the NG-eNBs can be coupled to each other via respective Xn interfaces. The NG-RAN can also use reference points between various nodes as provided by 3GPP TS 23.501 v16.0.2 (2019 Apr. 1) ("[R14]").

The UPF 1370, 1374 acts as an anchor point for intra-RAT and inter-RAT mobility. an external PDU session point of interconnect to a local data network (DN) 1372 and/or central DN 1376, either of which can include, for example, operator services, Internet access, or third-party services.

DNs 1372, 1376 may include, or be similar to, application server(s) 1348 discussed previously. The UPF 1370, 1374 may also perform packet routing and forwarding, perform packet inspection, enforce the user plane part of policy rules, lawfully intercept packets, perform traffic usage reporting, perform QoS handling for the user plane, perform UL traffic verification, transport level packet marking in the UL and DL, and perform DL packet buffering and DL data notification triggering. The UPF 1370 may interact with the SMF 1360 via an N4 reference point between the SMF 1360. The UPF 1370 can connect via an N9 interface to another UPF 1374 connected to a central DN 1376 via an N6 interface. The UPF 1370, 1374 can be deployed in one or more configurations according to the desired service type.

The AUSF 1344 stores data for authentication of UE 1366 and handle authentication-related functionality. The AUSF 1344 may facilitate a common authentication framework for various access types. The AUSF 1344 may communicate with the AMF 1362 via an N12 reference point between the AMF 1362 and the AUSF 1344; and may communicate with the UDM 1346 via an N13 reference point between the UDM 1346 and the AUSF 1344. Additionally, the AUSF 1344 may exhibit an Nausf SBI.

The UDM 1346 handles subscription-related information (e.g., subscriber profiles and data) to support the network entities' handling of communication sessions (similar to an HSS in 4G systems). Subscription data may be communicated between the UDM 1346 and the AMF 1362 via an N8 reference point. The UDM 1346 may interact with the SMF 1360 via an N10 reference point. The UDM 1346 can also be coupled to the AS 1348 over the Sh reference point. The AS 1348 can be or include a telephony application server (TAS) a MEC host (e.g., MEC host 140, 240, 340, 440, 740, 840, 841, 940, and/or 941 discussed previously, or the same or similar to MEC host(s) 1336). The 5G system 1300 can use one or more MEC hosts 1336 to provide an interface and offload processing of wireless communication traffic. For example and as illustrated in FIG. 13, a MEC host 1336 can provide a connection between the RAN 1368 and UPF 1370 in the 5GC. The MEC host 1336 can use one or more NFV instances instantiated on virtualization infrastructure within the MEC host 1336 to process wireless connections to and from the RAN 1368 and UPF 1370.

The AMF 1362 is responsible for registration management (e.g., for registering UE 1366 with the 5G network), connection management, reachability management, mobility management, and access authentication and authorization. The AMF 1362 is responsible for the termination of RAN control plane and NAS procedures, and as such, the AMF 1362 is the termination point for the RAN control plane (CP) interface (N2 reference point), and is also the termination point for Non-Access Stratum (NAS) signaling with the UE 1366 (N1 reference point). The AMF 1362 is also responsible for protecting the integrity of signaling, interfacing with any interception function for access and mobility events, providing authentication and authorization for the access layer, and hosting the Security Anchor Functionality (SEAF). The AMF 1412 provides communication and reachability services for other NFs and it may allow subscriptions to receive notifications regarding mobility events. The AMF 1362 also provisions external parameters (e.g., Expected UE Behaviour parameters or Network Configuration parameters).

The AMF 1362 is also the termination point for the an N11 reference point, which is used for interactions with the SMF 1360, which allows the AMF 1362 to provide transport for session management (SM) messages between the UE 1366 and the SMF 1360. AMF 1362 may also provide transport for SMS messages between UE 1366 and an Short Message Service Function (SMSF) (not shown by FIG. 13). The SMSF is responsible for SMS subscription checking and verification, and relaying SM messages to/from the UE 1366 to/from other SMS entities. The AMF 1362 is also a termination point for an N14 reference point between two AMFs 1362 and an N17 reference point between the AMF 1362 and a 5G-EIR (not shown by FIG. 13). In addition to the functionalities of the AMF described above, the AMF may include other functionalities as described in [R14] and 3GPP TS 23.503 v16.0.0 (2019 Mar. 26).

The SMF 1360 may be responsible for SM functionality (e.g., session establishment, modify and release, including tunnel maintain between UPF 1370 and (R)AN 1368); IP address allocation and management (including optional authorization); dynamic host configuration protocol (DHCP) services; (re)selection and control of UPFs 1370; configuring traffic steering rules at the UPF 1370 to route traffic to proper destination; interception for SM events; termination of interfaces toward policy control functions; controlling part of policy enforcement and QoS; termination of SM parts of NAS messages; DL data notification; initiating (R)AN 1368 specific SM information, sent via the AMF 1362 over N11 and then N2 to (R)AN 1368; and determining SSC mode of a session. SM may refer to management of a PDU session, and a PDU session or "session" may refer to a PDU connectivity service that provides or enables the exchange of PDUs between a UE 1366 and a DN 1372, 1376 identified by a Data Network Name (DNN). As MEC services may be offered in both centralized and distributed edge systems, the SMF 1414 can be configured to select and control the UPF 1370 as well as to configure its rules for traffic steering. The SMF 1414 is also configured to expose service operations to allow MEC as a 5G AF 1364 to manage the PDU sessions, control the policy settings and traffic rules, as well as to subscribe to notifications on session management events.

The PCF 1358 provides policy rules to CP function(s) to enforce them, and also supports unified policy framework to govern network behavior (similar to PCRF in 4G systems). The PCF 1358 may communicate with the AMF 1362 via an N15 reference point. The PCF 1358 may communicate with the AF 1364 via an N5 reference point, and with the SMF 1360 via an N7 reference point.

The AF 1364 provides application influence on traffic routing, provides access to the NEF (e.g., NEF 1418 of FIG. 14) and interacts with the policy framework for policy control. The AF 1364 may send requests to influence SMF 1360 routing decisions for traffic of a PDU Session. The AF 1364 requests may influence UPF 1370, 1374 (re)selection and allow routing user traffic to a local access to a DN 1372, 1376 (identified by a DNAI). For edge computing, operator and 3rd party services are hosted close to the UE's 1366 access point of attachment (e.g., (R)AN 1368) so as to achieve an efficient service delivery through the reduced e2e latency and load on the transport network. The 5GC selects a UPF 1370, 1374 close to the UE and executes the traffic steering from the UPF 1370, 1374 to the local DN 1372 via the N6 interface. This may be based on the UE's subscription data, UE location, information from the AF 1364, policy, and/or other related traffic rules. Some AFs 1364 may not be allowed to directly access NFs, and must use the external exposure framework via the NEF 1418 to interact with relevant NFs.

The NSSF 1342 selects a set of network slice instances serving the UE 1366. The NSSF 1342 may also determine allowed NSSAI and the mapping to the subscribed S-NS-SAIs, if needed. The NSSF 1342 may also determine the AMF 1362 set to be used to serve the UE 1366, or a list of candidate AMF(s) 1362 based on a suitable configuration and possibly by querying an NRF (see e.g., NRF 1420 of FIG. 14). The selection of a set of network slice instances for the UE 1366 may be triggered by the AMF 1362 with which the UE 1366 is registered by interacting with the NSSF 1342, which may lead to a change of AMF 1362. The NSSF 1342 may interact with the AMF 1362 via an N22 reference point between AMF 1362 and NSSF 1342; and may communicate with another NSSF 1342 in a visited network via an N31 reference point (not shown). Additionally, the NSSF 1342 may exhibit an Nnssf SBI.

FIG. 13 illustrates a reference point representation of a 5G network. A reference point representation shows that interaction can exist between corresponding NF services. FIG. 13 includes following reference points: N1 (between the UE 1366 and the AMF 1362), N2 (between the RAN 1368 and the AMF 1362), N3 (between the RAN 1368 and the UPF 1370), N4 (between the SMF 1360 and the UPF 1370), N5 (between the PCF 1358 and the AF 1364), N6 (between the UPF 1370 and the DN 1372, 1376), N7 (between the SMF 1360 and the PCF 1358), N8 (between the UDM 1346 and the AMF 1362), N9 (between UPFs 1370 and 1374), N10 (between the UDM 1346 and the SMF 1360), N11 (between the AMF 1362 and the SMF 1360), N12 (between the AUSF 1344 and the AMF 1362), N13 (between the AUSF 1344 and the UDM 1346), N14 (between two AMFs 1362, N15 (between the PCF 1358 and the AMF 1362 in case of a non-roaming scenario, or between the PCF 1358 in a visited network and AMF 1362 in case of a roaming scenario), N16 (between two SMFs 1360, not shown), and N22 (between AMF 1362 and NSSF 1344). There may be many more reference points between the NFs; however, these reference points have been omitted from FIG. 13 for clarity. Additionally, the 5G system 1300 may also include other elements that are not shown by FIG. 13, such as a Data Storage system/architecture, 5G-EIR, SEPP, SMSF, and the like.

FIG. 14 illustrates a non-integrated MEC deployment 14A including a 5G service-based architecture 1400 and a MEC architecture 1490, and an integrated MEC deployment 14B including a MEC system 1491 in a 5G network 1401, where some of the functional entities of the MEC system 1491 interact with the NFs of the 5G network. Referring to deployment 14A, the 5G system architecture 1400 is illustrated in a service-based representation and can be substantially similar to (or the same as) system architecture 1300 of FIG. 13. For example, the 5G system architecture 1400 includes the following entities that also appear in the system architecture 1400: NSSF 1416, PCF 1422, UDM 1424, AF 1426, AUSF 1410, AMF 1412, SMF 1414, UE 1402, RAN 1404, UPF 1406, and DN 1408. In addition to these network entities, the 5G system architecture 2800 also includes a network exposure function (NEF) 1418 and a network repository function (NRF) 1420. The 5G system architectures can be service-based and interaction between NFs can be represented by corresponding point-to-point reference points Ni (as illustrated in FIG. 13) or as SBIs (as illustrated in FIG. 14).

The 5G system 1400 in FIG. 14 is a service-based representation, which is used to represent NFs within the CP that enable other authorized NFs to access their services. The 5G system 1400 includes the following service-based interfaces (SBIs): Namf (an SBI exhibited by the AMF 1412), Nsmf (an SBI exhibited by the SMF 1414), Nnef (an SBI exhibited by the NEF 1318), Npcf (an SBI exhibited by the PCF 1422), Nudm (an SBI exhibited by the UDM 1424), Naf (an SBI exhibited by the AF 1426), Nnrf (an SBI exhibited by the NRF 1420), Nnssf (an SBI exhibited by the NSSF 1416), Nausf (an SBI exhibited by the AUSF 1410). Other SBIs not shown in FIG. 14 can also be used (e.g., Nudr, N5g-eir, and Nudsf).

The NEF 1318 provides means for securely exposing the services and capabilities provided by 3GPP NFs for third party, internal exposure/re-exposure, AFs 1464, edge computing or fog computing systems, etc. The NEF 1318 may authenticate, authorize, and/or throttle the AFs 1464. The NEF 1318 may also translate information exchanged with the AF(s) 1464 and information exchanged with internal NFs. The NEF 1318 may also receive information from other NFs based on exposed capabilities of other NFs. This information may be stored at the NEF 1318 as structured data, or at a data storage NF using standardized interfaces. The stored information can then be re-exposed by the NEF 1318 to other NFs and AFs, and/or used for other purposes such as analytics. In this example, the NEF 1318 provides an interface to a MEC host in a MEC system 1490, 1491, which can be used to process wireless connections with the RAN 1404.

The NRF 1420 supports service discovery functions, receives NF discovery requests from NF instances or the SCP 1428, and provides the information of the discovered (or to be discovered) NF instances to the NF instances or the SCP 1428. The NRF 1420 maintains NF profiles of available NF instances and their supported services (e.g., NF instance ID, NF type, PLMN ID, FQDN or IP address of NF, NF capacity information, NF priority information, etc.). The SCP 1428 (or individual instances of the SCP 1428) supports indirect communication (see e.g., [R14] section 7.1.1) between two or more NFs; delegated discovery (see e.g., [R14] section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [R14] section 6.3). Load balancing, monitoring, overload control functionality provided by the SCP 1428 may be implementation specific. The SCP 1428 may be deployed in a distributed manner. More than one SCP 1428 can be present in the communication path between various NF Services. The SCP 1428, although not an NF instance, can also be deployed distributed, redundant, and scalable.

The MEC system 1490 can include a MEC orchestrator 1470 (operating at a system level) as well as the following MEC entities operating at a distributed host level: one or more apps 1472, one or more services 1474, virtualization infrastructure 1476, a MEC platform 1478, and a MEC platform manager 1480. Components of the MEC system 1490 are discussed in greater detail infra.

The integrated MEC deployment 14B includes the same MEC and 5GC NFs as in the non-integrated deployment 14A discussed previously. In this implementation, the integrated MEC deployment 14B is located at least partially within the 5G network 1401. The 5G network 1401 is the same or similar to the 5G system 1400, however, not all of the NFs in 5G network 1401 are shown. The integrated MEC deployment 14B can be configured using one or more of the following techniques: (1) Local Routing and Traffic Steering; (2) The ability of an AF 1426 to influence UPF 1406 (re)selection and traffic routing directly via the PCF 1422 or indirectly via the NEF 1418, depending on the operator's policies; (3) The Session and Service Continuity (SSC) modes for UE 1402 and application mobility scenarios; (4) Support of Local Area Data Network (LADN) 1408 by the 5G network 1401 by providing support to connect to the LADN 1408 in a certain area where the apps 1472 are deployed. The access to a LADN 1408 may be available in a specific LADN service area, defined as a set of Tracking Areas in the serving PLMN of the UE. The LADN 1408 can be configured as a service provided by the serving PLMN of the UE. For local routing and traffic steering, the 5G network 1401 can be configured to select traffic to be routed to the apps 1472 in the LADN 1408, which can be part of the MEC system 1491. A PDU session may have multiple N6 interfaces towards the data network 1408. The UPFs 1406 that terminate these interfaces can be configured to support PDU Session Anchor functionality. Traffic steering by the UPF 1406 is supported by UL Classifiers that operate on a set of traffic filters matching the steered traffic, or alternatively, by IPv6 multi-homing, where multiple IPv6 prefixes have been associated with the PDU session in question.

The NFs within the 5G network 1401 and the services they produce are registered in the NRF 1420, while in the MEC system 1491 the services produced by the MEC applications 1472 are registered in the service registry of the MEC platform 1478. Service registration can be part of the application enablement functionality. To use the service, if authorized, an NF can directly interact with the NF that produces the service. The list of available MEC services can be discovered from the NRF 1420. Some of the services may be accessible via the NEF 1418, which is also available to untrusted entities that are external to the domain, to access the service. Put another way, the NEF 1418 can function as a centralized point for service exposure and also has a key role in authorizing all access requests originating from outside of the system. Procedures related to authentication can be served by the AUSF 1410.

The 5G network 1401 can use network slicing which allows the allocation of the required features and resources from the available NFs to different services or to tenants that are using the services. The Network Slice Selection Function (NSSF) 1416 can be configured to assist in the selection of suitable network slice instances for users, and in the allocation of the necessary AMF 1412. A MEC app 1472 (e.g., an application hosted in the distributed cloud of the MEC system 1490) can belong to one or more network slices that have been configured in the 5G network 1401.

The PCF 1422 is also the function whose services an AF 1426, such as a MEC platform 1478, requests in order to impact the traffic steering rules. The PCF 1422 can be accessed either directly, or via the NEF 1418, depending on whether the AF 1426 is considered trusted or not, and in the case of traffic steering, whether the corresponding PDU session is known at the time of the request. The UDM 1424 is responsible for services related to users and subscriptions. For example, the UDM 1424 can be configured to generate 3GPP authentication and key agreement (AKA) authentication credentials, handle user identification related information, manage access authorization (e.g., roaming restrictions), register the user serving NFs (serving AMF 1412, SMF 1414), support service continuity by keeping record of SMF/DNN assignments, support interception procedures in outbound roaming by acting as a contact point, and perform subscription management procedures.

The UPF 1406 can be configured to assist in an integrated MEC deployment in the 5G network 1401. UPFs 1406 can be considered as a distributed and configurable data plane from the MEC system 1491 perspective. The control of that data plane, such as in a traffic rules configuration, may follow the NEF-PCF-SMF communication route. Consequently, the local UPF 1406 may be part of the MEC implementation as illustrated in deployment 14B.

The MEC orchestrator 1470 in deployment 14B is a MEC system level functional entity that, acting as an AF, can interact with the NEF 1418, or in some scenarios directly with the target 5G NFs. At the distributed host level (or "MEC host level"), the MEC platform 1478 can be configured to interact with the 5G NFs, again in the role of an AF 1426. The MEC host (see e.g., MEC host 1502 in FIG. 15) and/or other host level functional entities, may be deployed in a data network (e.g., 1408) in the 5G system. While the NEF 1418 as a 5GC NF is a system level entity deployed centrally together with similar NFs, an instance of NEF 1418 can also be deployed in the edge to allow low latency, high throughput service access from a MEC host.

In deployment 14B, the MEC system 1491 is deployed on the N6 reference point of the UPF 1406, which may be in a data network 1408 external to the 5G system 1401. This functionality can be enabled by flexibility in locating the UPF 1406. The distributed MEC host can accommodate, apart from MEC apps 1472, a message broker as a MEC platform service 1474, and another MEC platform service to steer traffic to local accelerators. The choice to run a service as a MEC app or as a platform service can be implementation-specific and can factor in the level of sharing and authentication needed to access the service. A MEC service such as a message broker could be initially deployed as a MEC app 1472 and then become available as a MEC platform service 1474.

MEC hosts of the MEC system 1491 are deployed in the edge or in a central data network. The UPF 1406 can be configured to manage to steer the user plane traffic towards the targeted MEC apps 1472 in the DN 1408. The locations of the DN(s) 1408 and the UPF(s) 1406 are a choice of the network operator and the network operator may choose to place the physical computing resources based on technical and business parameters such as available site facilities, supported applications and their requirements, measured or estimated user load, etc. The MEC management system, orchestrating the operation of MEC hosts and applications, may decide dynamically where to deploy the MEC apps 1472. In terms of physical deployment of MEC hosts, the following options may be used in different aspects: (1) the MEC host and the local UPF 1406 are co-located with the base station of a base station edge layer; (2) the MEC host co-located with a transmission node which may include a local UPF 1406; (3) the MEC host and the local UPF 1406 co-located with a network aggregation point; and (4) the MEC host is co-located with the 5G core NFs (e.g., in the same data center).

FIG. 15 illustrates a MEC system reference architecture (or MEC architecture) 1500 providing functionalities in accordance with [R05]. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 1500 includes MEC hosts 1502, a virtualization infrastructure manager (VIM) 1508, an MEC platform manager 1506, an MEC orchestrator 1510, an operations support system (OSS) 1512, a user app proxy 1514, a UE app 1518 running on UE 1520, and CFS portal 1516. The MEC host 1502 can include a MEC platform 1532 with filtering rules control component 1540, a DNS handling component 1542, a service registry 1538, and MEC services 1536. The MEC services 1536 can include at least one scheduler, which can be used to select resources for instantiating MEC apps (or NFVs) 1526 upon virtualization infrastructure (VI) 1522. The MEC apps 1526 can be configured to provide services 1530, which can include processing network communications traffic of different types associated with one or more wireless connections (e.g., connections to one or more RANs or core network functions) and/or some other services such as those discussed herein. The other MEC host 1502 may have a same or similar configuration/implementation as the MEC host 1502, and the other MEC app 1526 instantiated within other MEC host 1502 can be similar to the MEC apps 1526 instantiated within MEC host 1502. The VI 1522 includes a data plane 1524 coupled to the MEC platform 1522 via an MP2 interface. Additional interfaces between various network entities of the MEC architecture 1500 are illustrated in FIG. 15.

The MEC system 1500 includes three groups of reference points, including "Mp" reference points regarding the MEC platform functionality; "Mm" reference points, which are management reference points; and "Mx" reference points, which connect MEC entities to external entities. The interfaces/reference points in the MEC system 1500 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The logical connections between various entities of the MEC architecture 1500 may be access-agnostic and not dependent on a particular deployment. MEC enables implementation of MEC apps 1526 as software-only entities that run on top of a VI 1522, which is located in or close to the network edge. A MEC app 1526 is an application that can be instantiated on a MEC host 1502 within the MEC system 1500 and can potentially provide or consume MEC services 1536.

The MEC entities depicted by FIG. 15 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 1520, and is discussed in more detail infra. The MEC host level includes one or more MEC hosts 1502, 1504 and MEC management entities, which provide functionality to run MEC Apps 1526 within an operator network or a subset of an operator network. The MEC management entities include various components that handle the management of the MEC-specific functionality of a particular MEC platform 1532, MEC host 1502, and the MEC Apps 1526 to be run.

The MEC platform manager 1506 is a MEC management entity including MEC platform element management component 1544, MEC app rules and requirements management component 1546, and MEC app lifecycle management component 1548. The various entities within the MEC architecture 1500 can perform functionalities as discussed in [R05]. The remote app 1550 is configured to communicate with the MEC host 1502 (e.g., with the MEC apps 1526) via the MEC orchestrator 1510 and the MEC platform manager 1506.

The MEC host 1502 is an entity that contains an MEC platform 1532 and VI 1522 which provides compute, storage, and network resources for the purpose of running MEC Apps 1526. The VI 1522 includes a data plane (DP) 1524 that executes traffic rules 1540 received by the MEC platform 1532, and routes the traffic among MEC Apps 1526, MEC services 1536, DNS server/proxy (see e.g., via DNS handling entity 1542), 3GPP network, local networks, and external networks. The MEC DP 1524 may be connected with the (R)AN nodes and the 3GPP core network, and/or may be connected with an access point via a wider network, such as the internet, an enterprise network, or the like.

The MEC platform 1532 is a collection of essential functionality required to run MEC Apps 1526 on a particular VI 1522 and enable them to provide and consume MEC services 1536, and that can provide itself a number of MEC services 937a. The MEC platform 1532 can also provide various services and/or functions, such as offering an environment where the MEC Apps 1526 can discover, advertise, consume and offer MEC services 1536 (discussed infra), including MEC services 1536 available via other platforms when supported. The MEC platform 1532 may be able to allow authorized MEC Apps 1526 to communicate with third party servers located in external networks. The MEC platform 1532 may receive traffic rules from the MEC platform manager 1506, applications, or services, and instruct the data plane accordingly (see e.g., Traffic Rules Control 1540). The MEC platform 1532 may send instructions to the DP 1524 within the VI 1522 via the Mp2 reference point. The Mp2 reference point between the MEC platform 1532 and the DP 1524 of the VI 1522 may be used to instruct the DP 1534 on how to route traffic among applications, networks, services, etc. The MEC platform 1532 may translate tokens representing UEs 1520 in the traffic rules into specific IP addresses. The MEC platform 1532 also receives DNS records from the MEC platform manager 1506 and configures a DNS proxy/server accordingly. The MEC platform 1532 hosts MEC services 1536 including the multi-access edge services discussed infra, and provide access to persistent storage and time of day information. Furthermore, the MEC platform 1532 may communicate with other MEC platforms 1532 of other MEC servers 1502 via the Mp3 reference point.

The VI 1522 represents the totality of all hardware and software components which build up the environment in which MEC Apps 1526 and/or MEC platform 1532 are deployed, managed and executed. The VI 1522 may span across several locations, and the network providing connectivity between these locations is regarded to be part of the VI 1522. The physical hardware resources of the VI 1522 includes computing, storage and network resources that provide processing, storage and connectivity to MEC Apps 1526 and/or MEC platform 1532 through a virtualization layer (e.g., a hypervisor, VM monitor (VMM), or the like). The virtualization layer may abstract and/or logically partition the physical hardware resources of the MEC server 1502 as a hardware abstraction layer. The virtualization layer may also enable the software that implements the MEC Apps 1526 and/or MEC platform 1532 to use the underlying VI 1522, and may provide virtualized resources to the MEC Apps 1526 and/or MEC platform 1532, so that the MEC Apps 1526 and/or MEC platform 1532 can be executed.

The MEC Apps 1526 are applications that can be instantiated on a MEC host/server 1502 within the MEC system 1500 and can potentially provide or consume MEC services 1536. The term "MEC service" refers to a service provided via a MEC platform 1532 either by the MEC platform 1532 itself or by a MEC App 1526. MEC Apps 1526 may run as VM on top of the VI 1522 provided by the MEC server 1502, and can interact with the MEC platform 1532 to consume and provide the MEC services 1536. The Mp1 reference point between the MEC platform 1532 and the MEC Apps 1526 is used for consuming and providing service specific functionality. Mp1 provides service registration 1538, service discovery, and communication support for various services, such as the MEC services 1536 provided by MEC host 1502. Mp1 may also provide application availability, session state relocation support procedures, traffic rules and DNS rules activation, access to persistent storage and time of day information, and/or the like.

The MEC Apps 1526 are instantiated on the VI 1522 of the MEC server 1502 based on configuration or requests validated by the MEC management (e.g., MEC platform manager 1506). The MEC Apps 1526 can also interact with the MEC platform 1532 to perform certain support procedures related to the lifecycle of the MEC Apps 1526, such as indicating availability, preparing relocation of user state, etc. The MEC Apps 1526 may have a certain number of rules and requirements associated to them, such as required resources, maximum latency, required or useful services, etc. These requirements may be validated by the MEC management, and can be assigned to default values if missing. MEC services 1536 are services provided and/or consumed either by the MEC platform 1532 and/or MEC Apps 1526. The service consumers (e.g., MEC Apps 1526 and/or MEC platform 1532) may communicate with particular MEC services 1536 over individual APIs (including MEC V2X API and the other MEC APIs discussed herein). When provided by an application, a MEC service 1536 can be registered in a list of services in the service registries 1538 to the MEC platform 1532 over the Mp1 reference point. Additionally, a MEC App 1526 can subscribe to one or more services 1530/1536 for which it is authorized over the Mp1 reference point.

Examples of MEC services 1536 include the VIS, RNIS [R09], LS [R10], UE_ID Services [R11], BWMS [R12], WAIS, FAIS [R13], and/or other MEC services. The RNIS, when available, provides authorized MEC Apps 1526 with radio network related information, and expose appropriate up-to-date radio network information to the MEC Apps 1526. The RNI may include, inter alia, radio network conditions, measurement and statistics information related to the user plane, information related to UEs 1520 served by the radio node(s) associated with the MEC host 1502 (e.g., UE context and radio access bearers), changes on information related to UEs 1520 served by the radio node(s) associated with the MEC host XE136, and/or the like. The RNI may be provided at the relevant granularity (e.g., per UE 1520, per cell, per period of time).

The service consumers (e.g., MEC Apps 1526, MEC platform 1532, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 1532 (not shown). A MEC App 1526 may query information on a message broker via a transport information query procedure, wherein the transport information may be pre-provisioned to the MEC App 1526 via a suitable configuration mechanism. The various messages communicated via the RNI API may be in XML, JSON, Protobuf, or some other suitable format.

The VIS provides supports various V2X applications including the journey-aware QoS predictions according to the various embodiments discussed herein. The RNI may be used by MEC Apps 1526 and MEC platform 1532 to optimize the existing services and to provide new types of services that are based on up to date information on radio conditions. As an example, a MEC App 1526 may use RNI to optimize current services such as video throughput guidance. In throughput guidance, a radio analytics MEC App 1526 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 1502. RNI may be also used by the MEC platform 1532 to optimize the mobility procedures required to support service continuity, such as when a certain MEC App 1526 requests a single piece of information using a simple request-response model (e.g., using RESTful mechanisms) while other MEC Apps 1526 subscribe to multiple different notifications regarding information changes (e.g., using a pub/sub mechanism and/or message broker mechanisms).

The LS, when available, may provide authorized MEC Apps 1526 with location-related information, and expose such information to the MEC Apps 1526. With location related information, the MEC platform 1532 or one or more MEC Apps 1526 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1520 currently served by the radio node(s) associated with the MEC server 1502, information about the location of all UEs 1520 currently served by the radio node(s) associated with the MEC server XE136, information about the location of a certain category of UEs 1520 currently served by the radio node(s) associated with the MEC server XE136, a list of UEs 1520 in a particular location, information about the location of all radio nodes currently associated with the MEC host 1502, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 1502, or a subset thereof, according to a desired deployment. In this regard, the OMA Zonal Presence API provides means for MEC Apps 1526 to retrieve information about a zone, the access points associated to the zones and the users that are connected to the access points. In addition, the OMA Zonal Presence API, allows authorized application to subscribe to a notification mechanism, reporting about user activities within a zone. A MEC server 1502 may access location information or zonal presence information of individual UEs 1520 using the OMA Zonal Presence API to identify the relative location or positions of the UEs 1520.

The BWMS provides for the allocation of bandwidth to certain traffic routed to and from MEC Apps 1526, and specify static/dynamic up/down bandwidth resources, including bandwidth size and bandwidth priority. MEC Apps 1526 may use the BWMS to update/receive bandwidth information to/from the MEC platform 1532. Different MEC Apps 1526 running in parallel on the same MEC server 1502 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system 1500. When the MEC system 1500 supports the UE Identity feature, the MEC platform 1532 provides the functionality (e.g., UE Identity API) for a MEC App 1526 to register a tag representing a UE 1520 or a list of tags representing respective UEs 1520. Each tag is mapped into a specific UE 1520 in the MNO's system, and the MEC platform 1532 is provided with the mapping information. The UE Identity tag registration triggers the MEC platform 1532 to activate the corresponding traffic rule(s) 1540 linked to the tag. The MEC platform 1532 also provides the functionality (e.g., UE Identity API) for a MEC App 1526 to invoke a de-registration procedure to disable or otherwise stop using the traffic rule for that user.

The WAIS is a service that provides WLAN access related information to service consumers within the MEC System 1500. The WAIS is available for authorized MEC Apps 1526 and is discovered over the Mp1 reference point as specified in [R03]. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 1500. The FAIS is available for the authorized MEC Apps 1526 and is discovered over the Mp1 reference point. The FAI may be used by MEC Apps 1526 and the MEC platform 1532 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 1526 and the MEC platform 1532 may consume the FAIS; and both the MEC platform 1532 and the MEC Apps 1526 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 1506 and the VI manager (VIM) 1508, and handles the management of MEC-specific functionality of a particular MEC server 1502 and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 1506 is responsible for managing the life cycle of applications including informing the MEC orchestrator (MEC-O) 1510 of relevant application related events. The MEC platform manager 1506 may also provide MEC Platform Element management functions 1544 to the MEC platform 1532, manage MEC App rules and requirements 1546 including service authorizations, traffic rules, DNS configuration and resolving conflicts, and manage MEC App lifecycles mgmt 1548. The MEC platform manager 1506 may also receive virtualized resources, fault reports, and performance measurements from the VIM 1508 for further processing. The Mm5 reference point between the MEC platform manager 1506 and the MEC platform 1532 is used to perform platform configuration, configuration of the MEC Platform element mgmt 1544, MEC App rules and reqts 1546, MEC App lifecycles mgmt 1548, and management of application relocation.

The VIM 1508 may be an entity that allocates, manages and releases virtualized (compute, storage and networking) resources of the VI 1522, and prepares the VI 1522 to run a software image. To do so, the VIM 1508 may communicate with the VI 1522 over the Mm7 reference point between the VIM 1508 and the VI 1522. Preparing the VI 1522 may include configuring the VI 1522, and receiving/storing the software image. When supported, the VIM 1508 may provide rapid provisioning of applications, such as described in "Openstack++ for Cloudlet Deployments", available at http://reports-archive.adm.cs.cmu.edu/anon/2015/CMU-CS-15-123.pdf. The VIM 1508 may also collect and report performance and fault information about the virtualized resources, and perform application relocation when supported. For application relocation from/to external cloud environments, the VIM 1508 may interact with an external cloud manager to perform the application relocation, for example using the mechanism described in "Adaptive VM Handoff Across Cloudlets", and/or possibly through a proxy. Furthermore, the VIM 1508 may communicate with the MEC platform manager 1506 via the Mm6 reference point, which may be used to manage virtualized resources, for example, to realize the application lifecycle management. Moreover, the VIM 1508 may communicate with the MEC-O 1510 via the Mm4 reference point, which may be used to manage virtualized resources of the MEC server

1502, and to manage application images. Managing the virtualized resources may include tracking available resource capacity, etc.

The MEC system level management includes the MEC-O 1510, which has an overview of the complete MEC system 1500. The MEC-O 1510 may maintain an overall view of the MEC system 1500 based on deployed MEC hosts 1502, available resources, available MEC services 1536, and topology. The Mm3 reference point between the MEC-O 1510 and the MEC platform manager 1506 may be used for the management of the application lifecycle, application rules and requirements and keeping track of available MEC services 1536. The MEC-O 1510 may communicate with the user application lifecycle management proxy (UALMP) 1514 via the Mm9 reference point in order to manage MEC Apps 1526 requested by UE app 1518.

The MEC-O 1510 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1508 to handle the applications. The MEC-O 1510 may select appropriate MEC host(s) 901 for application instantiation based on constraints, such as latency, available resources, and available services. The MEC-O 1510 may also trigger application instantiation and termination, as well as trigger application relocation as needed and when supported.

The Operations Support System (OSS) 1512 is the OSS of an operator that receives requests via the Customer Facing Service (CFS) portal 1516 over the Mx1 reference point and from UE apps 1518 for instantiation or termination of MEC Apps 1526. The OSS 1512 decides on the granting of these requests. The CFS portal 1516 (and the Mx1 interface) may be used by third-parties to request the MEC system 1500 to run apps 1518 in the MEC system 1500. Granted requests may be forwarded to the MEC-O 1510 for further processing. When supported, the OSS 1512 also receives requests from UE apps 1518 for relocating applications between external clouds and the MEC system 1500. The Mm2 reference point between the OSS 1512 and the MEC platform manager 1506 is used for the MEC platform manager 1506 configuration, fault and performance management. The Mm1 reference point between the MEC-O 1510 and the OSS 1512 is used for triggering the instantiation and the termination of MEC Apps 1526 in the MEC system 1500.

The UE app(s) 1518 (also referred to as "device applications" or the like) is one or more apps running in a device 1520 that has the capability to interact with the MEC system 1500 via the user application lifecycle management proxy 1514. The UE app(s) 1518 may be, include, or interact with one or more client applications, which in the context of MEC, is application software running on the device 1518 that utilizes functionality provided by one or more specific MEC Apps 1526. The user app LCM proxy 1514 may authorize requests from UE apps 1518 in the UE 1520 and interacts with the OSS 1512 and the MEC-O 1510 for further processing of these requests. The term "lifecycle management," in the context of MEC, refers to a set of functions required to manage the instantiation, maintenance and termination of a MEC App 1526 instance. The user app LCM proxy 1514 may interact with the OSS 1512 via the Mm8 reference point, and is used to handle UE 1518 requests for running applications in the MEC system 1500. A user app may be an MEC App 1526 that is instantiated in the MEC system 1500 in response to a request of a user via an application running in the UE 1520 (e.g., UE App 1518).

The user app LCM proxy 1514 allows UE apps 1518 to request on-boarding, instantiation, termination of user applications and when supported, relocation of user applications in and out of the MEC system 1500. It also allows informing the user apps about the state of the user apps. The user app LCM proxy 1514 is only accessible from within the mobile network, and may only be available when supported by the MEC system 1500. A UE app 1518 may use the Mx2 reference point between the user app LCM proxy 1514 and the UE app 1518 to request the MEC system 1500 to run an application in the MEC system 1500, or to move an application in or out of the MEC system 1500. The Mx2 reference point may only be accessible within the mobile network and may only be available when supported by the MEC system 1500.

In order to run an MEC App 1526 in the MEC system 1500, the MEC-O 1510 receives requests triggered by the OSS 1512, a third-party, or a UE app 1518. In response to receipt of such requests, the MEC-O 1510 selects a MEC server/host 1502 to host the MEC App 1526 for computational offloading, etc. These requests may include information about the application to be run, and possibly other information, such as the location where the application needs to be active, other application rules and requirements, as well as the location of the application image if it is not yet on-boarded in the MEC system 1500.

The MEC-O 1510 may select one or more MEC servers 1502 for computational intensive tasks. The selected one or more MEC servers XE136 may offload computational tasks of a UE app 1518 based on various operational parameters, such as network capabilities and conditions, computational capabilities and conditions, application requirements, and/or other like operational parameters. The application requirements may be rules and requirements associated to/with one or more MEC Apps 1526, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1526 to be able to run; multi-access edge services that the MEC Apps 1526 can take advantage of, if available; connectivity or mobility support/requirements (e.g., application state relocation, application instance relocation); required multi-access edge features, such as VM relocation support or UE identity; required network connectivity (e.g., connectivity to applications within the MEC system 1500, connectivity to local networks, or to the Internet); information on the operator's MEC system 1500 deployment or mobile network deployment (e.g., topology, cost); requirements on access to user traffic; requirements on persistent storage; traffic rules 1540; DNS rules 1542; etc.

The MEC-O 1510 considers the requirements and information listed above and information on the resources currently available in the MEC system 1500 to select one or several MEC servers 1502 to host MEC Apps 1526 and/or for computational offloading. After one or more MEC servers XE136 are selected, the MEC-O 1510 requests the selected MEC host(s) 1502 to instantiate the application(s) or application tasks. The actual algorithm used to select the MEC servers 1502 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1510 may decide to select one or more new MEC hosts 1502 to act as a master node, and initiates the transfer of an application instance or application-related state information from the one or more source MEC hosts 1502 to the one or more target MEC hosts 1502.

In a first implementation, the UPF 1374 of the 5G system 1300 is mapped into the MEC architecture 1500 as the MEC data plane 1524. In these implementations, the UPF 1374 handles the user plane path of PDU sessions. Additionally, UPF 1374 provides the interface to a data network (e.g., DNs 1372, 1376) and supports the functionality of a PDU session anchor.

In a second implementation, the AF 1364 of the 5G system 1300 is mapped into the MEC architecture 1500 as the MEC platform 1532. In these implementations, the AF 1364 is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN 1372, MEC apps 1526, 1527, and/or 1528 can be mapped in or to the DN 1372 and/or 1376 of the 5G system 1300.

In a third implementation, the RAN 1368 of 5G system 1300 can be a virtual RAN based on a VNF, and the UPF 1374 is configurable or operable to function as the MEC data plane 1524 within an NF virtualization infrastructure (NFVI) (e.g., VI 1522). In these implementations, the AF 1364 can be configured as MEC platform VNF (see e.g., discussion of FIG. 16, with MEC APIs, MEC application enablement functionality (see e.g., [R08]), and API principles functionality (see e.g., [R06]). Additionally, the local DN 1372 can include MEC apps 1526, 1527, and/or 1528 instantiated as VNFs. This implementation can be configured to provide functionalities in accordance with the [R05] and/or ETSI GR MEC 017 V1.1.1 (2018 February) ("[R07]"). The third implementation may be combined with the first implementation and/or the second implementation, or may be a standalone implementation.

Additionally or alternatively, the access level edge (e.g., the NANs 2128, 2130, and 2132 of FIG. 21 and/or the other NANs discussed previously) can use one or more APIs to communicate with local/regional level edge networks. The local/regional level edge networks can include network nodes using corresponding applications to communicate with a national level edge network. The national level edge can include various NANs that use applications for accessing one or more remote clouds within the global level edge. The NANs are also configurable or operable for vertical segment management and SLA compliance. Additionally or alternatively, MEC deployment can be based on the definition of "edge" to provide degrees of freedom to MNOs, especially when deploying MEC in an NFV environment (e.g., MEC entities can be instantiated as Virtualized NFs (VNFs), thus with high flexibility in terms of deployment for the operator).

In some embodiments, MEC system 1500 can be flexibly deployed depending on the use case/vertical segment/information to be processed. Some components of the MEC system 1500 can be co-located with other elements of the system. As an example, in certain use cases (e.g., enterprise), a MEC app 1526 may need to consume a MEC service locally, and it may be efficient to deploy a MEC host locally equipped with the needed set of APIs. In another example, deploying a MEC server 1502 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

FIG. 16 illustrates a MEC reference architecture 1600 in a NFV environment. The MEC architecture 1600 can be configured to provide functionalities in accordance with [R07]. The MEC architecture 1600 includes a MEC platform 1602, a MEC platform manager—NFV (MEPM-V) 1614, a data plane 1608, a NFV infrastructure (NFVI) 1610, VNF managers (VNFMs) 1620 and 1622, NFV orchestrator (NFVO) 1624, a MEC app orchestrator (MEAO) 1626, an OSS 1628, a user app LCM proxy 1630, a UE app 1634, and a CFS portal 1632. The MEC platform manager 1614 can include a MEC platform element management 1616 and MEC app rules and requirements management 1618. The MEC platform 1602 can be coupled to another MEC platform 1606 via an MP3 interface.

In this embodiments, the MEC platform 1602 is deployed as a VNF. The MEC applications 1604 can appear like VNFs towards the ETSI NFV Management and Orchestration (MANO) components. This allows re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 1610 and its virtualized resources are managed by the virtualized infrastructure manager (VIM) 1612. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[R31]")). The MEA-VNF 1604 are managed like individual VNFs, allowing that a MEC-in-NFV deployment can delegate certain orchestration and LCM tasks to the NFVO 1624 and VNFMs 1620 and 1622, as defined by ETSI NFV MANO.

When a MEC platform is implemented as a VNF (e.g., MEC platform VNF 1602), the MEPM-V 1614 may be configured to function as an Element Manager (EM). The MEAO 1626 uses the NFVO 1624 for resource orchestration, and for orchestration of the set of MEA-VNFs 1604 as one or more NFV Network Services (NSs). The MEPM-V 1614 delegates the LCM part to one or more VNFMs 1620 and 1622. A specific or generic VNFM 1620, 1622 is/are used to perform LCM. The MEPM-V 1614 and the VNFM (ME platform LCM) 1620 can be deployed as a single package as per the ensemble concept in 3GPP TR 32.842 v13.1.0 (2015 Dec. 21) ("[R32]"), or that the VNFM is a Generic VNFM as per [R31] and the MEC Platform VNF 1602 and the MEPM-V 1614 are provided by a single vendor.

The Mp1 reference point between a MEC app 1604 and the MEC platform 1614 can be optional for the MEC app 1604, unless it is an application that provides and/or consumes a MEC service. The Mm3* reference point between MEAO 1626 and the MEPM-V 1614 is based on the Mm3 reference point (see e.g., [R05]). Changes may be configured to this reference point to cater for the split between MEPM-V 1614 and VNFM (ME applications LCM) 1622. The following new reference points (Mv1, Mv2, and Mv3) are introduced between elements of the ETSI MEC architecture and the ETSI NFV architecture to support the management of ME app VNFs 1604.

The following reference points are related to existing NFV reference points, but only a subset of the functionality may be used for ETSI MEC, and extensions may be necessary. Mv1 is a reference point connecting the MEAO 1626 and the NFVO 1624, and is related to the Os-Ma-nfvo reference point as defined in ETSI NFV). Mv2 is a reference point connecting the VNFM 1622 that performs the LCM of the MEC app VNFs 1604 with the MEPM-V 1614 to allow LCM related notifications to be exchanged between these entities. Mv2 is related to the Ve-Vnfm-em reference point as defined in ETSI NFV, but may possibly include additions, and might not use all functionality offered by the Ve-Vnfm-em. Mv3 is a reference point connecting the VNFM 1622 with the ME app VNF 1604 instance to allow the exchange of messages (e.g., related to MEC app LCM or initial deployment-specific configuration). Mv3 is related to the Ve-Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each ME app VNF 1604 with the NFVI 1610. The Nf-Vi reference point connects the NFVI 1610 and the VIM 1612. The Os-Ma-nfvo reference point connects the OSS 1628 and the NFVO 1624 and is primarily used to manage NSs (e.g., a number of VNFs connected and orchestrated to deliver a service). The Or-Vnfm reference point connects the NFVO 1624 and the VNFM (MEC Platform LCM) 1620 and is primarily used for the NFVO 1624 to invoke VNF LCM operations. Vi-Vnfm reference point connects the VIM 1612 and the VNFM (MEC Platform LCM) 1620 and is primarily used by the VNFM 1620 to invoke resource management operations to manage cloud resources that are needed by the VNF (it is assumed in an NFV-based MEC deployment that this reference point corresponds 1:1 to Mm6). The Or-Vi reference point connects the NFVO 1624 and the VIM 1612 and is primarily used by the NFVO 1624 to manage cloud resources capacity. The Ve-Vnfm-em reference point connects the VNFM (MEC Platform LCM) 1620 with the MEPM-V 1614. The Ve-Vnfm-vnf reference point connects the VNFM (MEC Platform LCM) 1620 with the MEC Platform VNF 1602.

III.C. Hardware Components

Figure 17A:
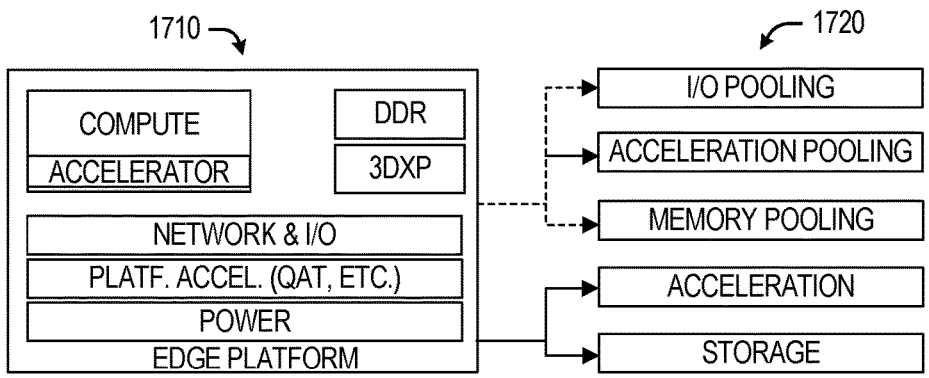
FIGS. 17A, 17B, and 17C depict examples of edge computing hardware configurations.

FIG. 17A illustrates a first edge computing hardware configuration, which maps various architectural aspects of an edge platform 1710 (e.g., compute hardware, network features, power management features, etc.) to specific edge platform capabilities 1720 (e.g., I/O pooling, acceleration pooling, memory pooling, acceleration technologies, storage capabilities). To offer the edge configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 1720, specific acceleration types may be configured or identified in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 1720 can consider which is the right type of acceleration and platform product models that needs to be selected in order to accommodate the service and throughput density as well as available power.

Figure 17B:
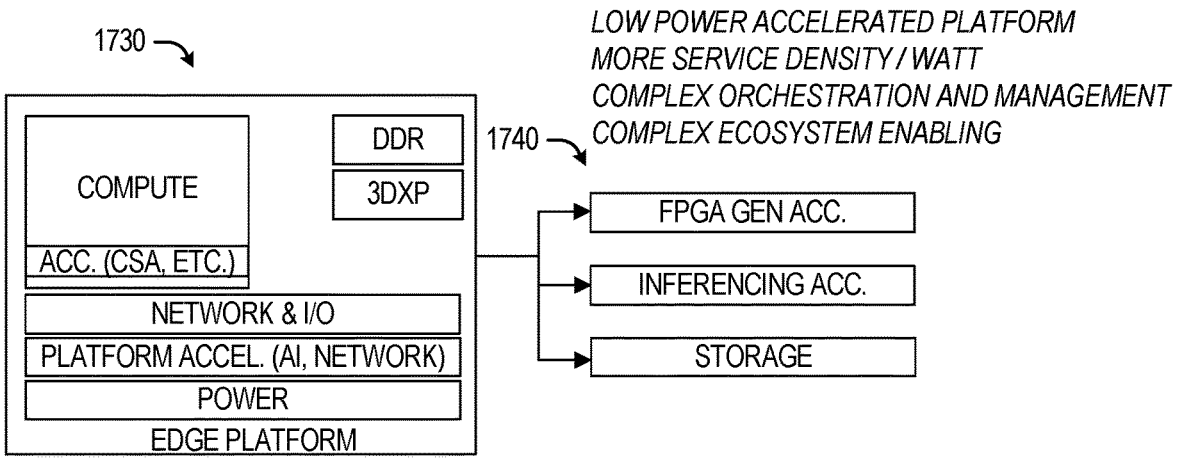

FIG. 17B illustrates a second edge computing hardware configuration, offering a second edge platform 1730 with a second set of edge platform capabilities 1740. This configuration may be deployable as a low power but more service-dense solution. This approach is targeted to define a lower power solution which uses acceleration schemes in order to achieve better service density or service throughout per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 1740 may be designed to be favorable in terms of power envelope as well in terms of physical space. As a result, the configuration of FIG. 17B may provide a suitable target for base station deployments. However, the platform capabilities 1740 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 17C:
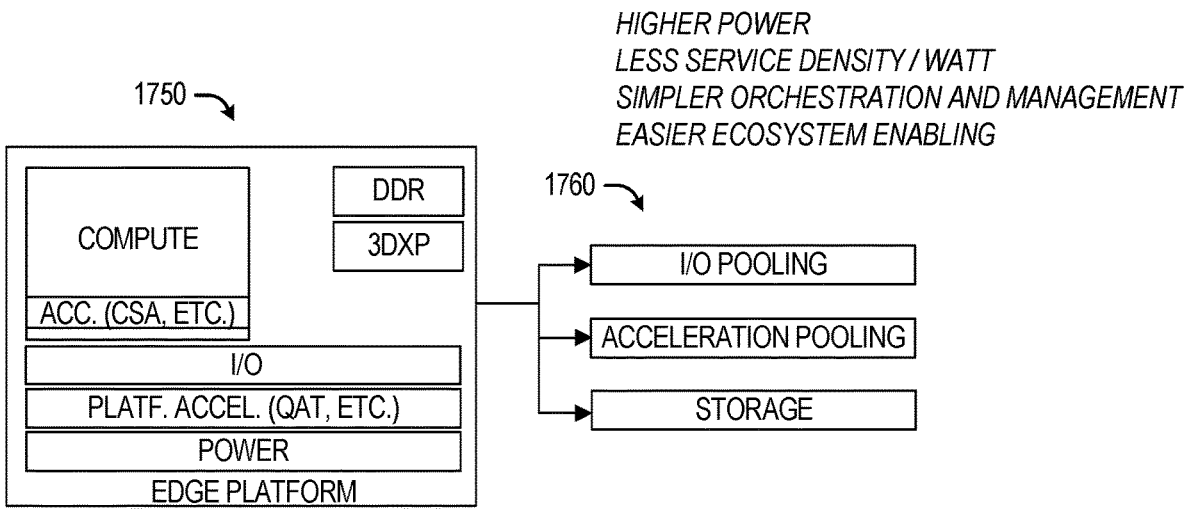

FIG. 17C illustrates a third edge computing hardware configuration, offering a third edge platform 1750 with a second set of edge platform capabilities 1760. This configuration offers a high power yet homogenous and generic architecture. FIG. 17C provides an approach that is opposite as compared FIG. 17B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 1760 may implement general purpose acceleration (such as in the form of FPGAs).

Other derivative functions of the edge platforms depicted in FIGS. 17A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

Figure 18:
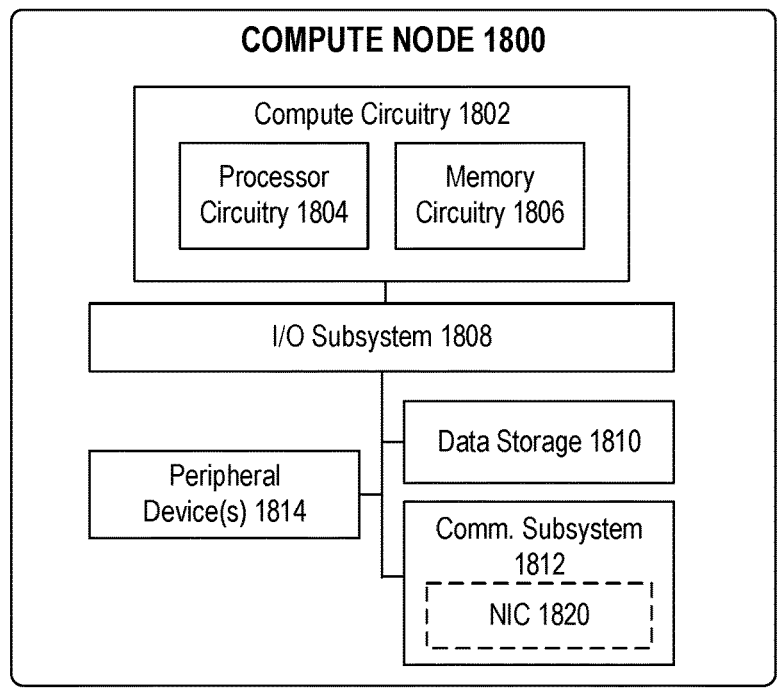
FIGS. 18 and 19 depict example components of various compute nodes in edge computing system(s).
Figure 19:
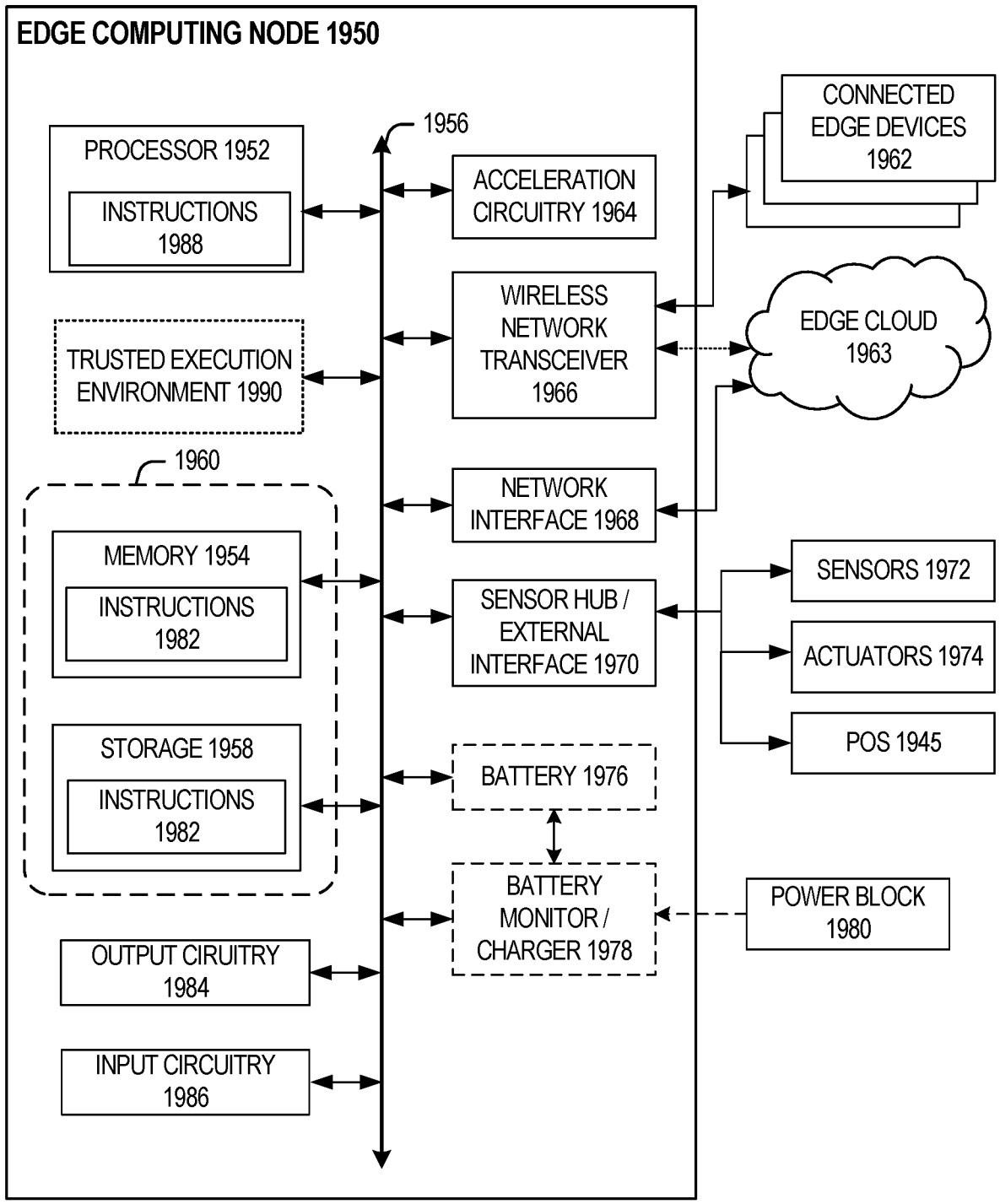

FIGS. 18 and 19 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 18, an edge compute node 1800 includes a compute engine (also referred to herein as "compute circuitry") 1802, an input/output (I/O) subsystem 1808, data storage 1810, a communication circuitry subsystem 1812, and, optionally, one or more peripheral devices 1814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1800 may be embodied as any type of engine, device, or collection of devices capable of performing various compute functions. In some examples, the compute node 1800 may be embodied as a single device such as an integrated circuit, an embedded system, an FPGA, a System-on-Chip (SoC), or other integrated system or device. The compute node 1800 includes or is embodied as a processor 1804 and a memory 1806. The processor 1804 may be embodied as any type of processor capable of performing the functions described herein (e.g., executing an application). For example, the processor 1804 may be embodied as a multi-core processor(s), a microcontroller, or other processor or processing/controlling circuit. In some examples, the processor 1804 may be embodied as, include, or be coupled to an FPGA, an application specific integrated circuit (ASIC), reconfigurable hardware or hardware circuitry, or other specialized hardware to facilitate performance of the functions described herein.

The main memory 1806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1806 may be integrated into the processor 1804. The main memory 1806 may store various software and data used during operation such as one or more applications, data operated on by the application(s), libraries, and drivers.

The compute circuitry 1802 is communicatively coupled to other components of the compute node 1800 via the I/O subsystem 1808, which may be embodied as circuitry and/or components to facilitate input/output operations with the compute circuitry 1802 (e.g., with the processor 1804 and/or the main memory 1806) and other components of the compute circuitry 1802. For example, the I/O subsystem 1808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1808 may form a portion of a system-on-a-chip (SoC) and be incorporated, along with one or more of the processor 1804, the main memory 1806, and other components of the compute circuitry 1802, into the compute circuitry 1802.

The one or more illustrative data storage devices 1810 may be embodied as any type of devices configured for short-term or long-term storage of data such as, for example, memory devices and circuits, memory cards, hard disk drives, solid-state drives, or other data storage devices. Individual data storage devices 1810 may include a system partition that stores data and firmware code for the data storage device 1810. Individual data storage devices 1810 may also include one or more operating system partitions that store data files and executables for operating systems depending on, for example, the type of compute node 1800.

The communication circuitry 1812 may be embodied as any communication circuit, device, or collection thereof, capable of enabling communications over a network between the compute circuitry 1802 and another compute device (e.g., an edge gateway node or the like). The communication circuitry 1812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1812 includes a network interface controller (NIC) 1820, which may also be referred to as a host fabric interface (HFI). The NIC 1820 may be embodied as one or more add-in-boards, daughter cards, network interface cards, controller chips, chipsets, or other devices that may be used by the compute node 1800 to connect with another compute device. In some examples, the NIC 1820 may be embodied as part of a system-on-a-chip (SoC) that includes one or more processors, or included on a multichip package that also contains one or more processors. In some examples, the NIC 1820 may include a local processor (not shown) and/or a local memory (not shown) that are both local to the NIC 1820. In such examples, the local processor of the NIC 1820 may be capable of performing one or more of the functions of the compute circuitry 1802 described herein. Additionally, or alternatively, in such examples, the local memory of the NIC 1820 may be integrated into one or more components of the client compute node at the board level, socket level, chip level, and/or other levels.

Additionally, in some examples, a respective compute node 1800 may include one or more peripheral devices 1814. Such peripheral devices 1814 may include any type of peripheral device found in a compute device or server such as audio input devices, a display, other input/output devices, interface devices, and/or other peripheral devices, depending on the particular type of the compute node 1800. In further examples, the compute node 1800 may be embodied by a respective edge compute node in an edge computing system (e.g., client compute node, edge gateway node, edge aggregation node, vUEs discussed previous, etc.) or like forms of appliances, computers, subsystems, circuitry, or other components.

FIG. 19 illustrates an example of components that may be present in an edge computing node 1950 for implementing the techniques (e.g., operations, processes, methods, and methodologies) described herein. This edge computing node 1950 provides a closer view of the respective components of node 1900 when implemented as or as part of a computing device (e.g., as a mobile device, a base station, server, gateway, etc.). The edge computing node 1950 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1950, or as components otherwise incorporated within a chassis of a larger system.

The edge computing node 1950 includes processing circuitry in the form of one or more processors 1852. The processor circuitry 1952 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1952 may include one or more hardware accelerators (e.g., same or similar to acceleration circuitry 1964), which may be microprocessors, programmable processing devices (e.g., FPGA, ASIC, etc.), or the like. The one or more accelerators may include, for example, computer vision and/or deep learning accelerators. In some implementations, the processor circuitry 1952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1952 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1952 may be coupled with or may include memory/storage and may be configured to execute instructions stored in the memory/storage to enable various applications or operating systems to run on the platform 1950. The processors (or cores) 1952 is configured to operate application software to provide a specific service to a user of the platform 1950. In some embodiments, the processor(s) 1952 may be a special-purpose processor(s)/controller(s) configured (or configurable) to operate according to the various embodiments herein.

As examples, the processor(s) 1952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1952 may be a part of a system on a chip (SoC), System-in-Package (SiP), a multi-chip package (MCP), and/or the like, in which the processor(s) 1952 and other components are formed into a single integrated circuit, or a single package, such as the Edison™ or Galileo™ SoC boards from Intel® Corporation. Other examples of the processor(s) 1952 are mentioned elsewhere in the present disclosure.

The processor(s) 1952 may communicate with system memory 1954 over an interconnect (IX) 1956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the IX 1956. In an example, the storage 1958 may be implemented via a solid-state disk drive (SSDD) and/or high-speed electrically erasable memory (commonly referred to as "flash memory"). Other devices that may be used for the storage 1958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1954 and/or storage circuitry 1958 may also incorporate three-dimensional (3D) cross-point (XPOINT) memories from Intel® and Micron®.

In low power implementations, the storage 1958 may be on-die memory or registers associated with the processor 1952. However, in some examples, the storage 1858 may be implemented using a micro hard disk drive (HDD). Further, any number of new technologies may be used for the storage 1958 in addition to, or instead of, the technologies described, such resistance change memories, phase change memories, holographic memories, or chemical memories, among others.

The components of edge computing device 1950 may communicate over the IX 1956. The IX 1956 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1956 may be a proprietary bus, for example, used in a SoC based system.

The IX 1956 couples the processor 1952 to communication circuitry 1966 for communications with other devices, such as a remote server (not shown) and/or the connected edge devices 1962. The communication circuitry 1966 is a hardware element, or collection of hardware elements, used to communicate over one or more networks (e.g., cloud 1963) and/or with other devices (e.g., edge devices 1962).

The transceiver 1966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1966 (or multiple transceivers) may communicate using multiple standards or radios for communications at a different range. For example, the edge computing node 1950 may communicate with close devices, e.g., within about 10 meters, using a local transceiver based on BLE, or another low power radio, to save power. More distant connected edge devices 1962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1966 (e.g., a radio transceiver) may be included to communicate with devices or services in the edge cloud 1963 via local or wide area network protocols. The wireless network transceiver 1966 may be an LPWA transceiver that follows the IEEE 802.15.4, or IEEE 802.15.4g standards, among others. The edge computing node 1963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1966, as described herein. For example, the transceiver 1966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1966 may include radios that are compatible with any number of 3GPP specifications, such as LTE and 5G/NR communication systems, discussed in further detail at the end of the present disclosure. A network interface controller (NIC) 1968 may be included to provide a wired communication to nodes of the edge cloud 1963 or to other devices, such as the connected edge devices 1962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1968 may be included to enable connecting to a second network, for example, a first NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1964, 1966, 191868, or 1970. Accordingly, in various examples, applicable means for communicating (e.g., receiving, transmitting, etc.) may be embodied by such communications circuitry.

The edge computing node 1950 may include or be coupled to acceleration circuitry 1964, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1964 may comprise logic blocks or logic fabric and other interconnected resources that may be programmed (configured) to perform various functions, such as the procedures, methods, functions, etc. of the various embodiments discussed herein. In such implementations, the acceleration circuitry 1964 may also include memory cells (e.g., EPROM, EEPROM, flash memory, static memory (e.g., SRAM, anti-fuses, etc.) used to store logic blocks, logic fabric, data, etc. in LUTs and the like.

The IX 1956 also couples the processor 1952 to a sensor hub or external interface 1970 that is used to connect additional devices or subsystems. The additional/external devices may include sensors 1972, actuators 1974, and positioning circuitry 1945.

The sensor circuitry 1972 includes devices, modules, or subsystems whose purpose is to detect events or changes in its environment and send the information (sensor data) about the detected events to some other a device, module, subsystem, etc. Examples of such sensors 1972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1974, allow platform 1950 to change its state, position, and/or orientation, or move or control a mechanism or system. The actuators 1974 comprise electrical and/or mechanical devices for moving or controlling a mechanism or system, and converts energy (e.g., electric current or moving air and/or liquid) into some kind of motion. The actuators 1974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1974 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1950 may be configured to operate one or more actuators 1974 based on one or more captured events and/or instructions or control signals received from a service provider and/or various client systems The positioning circuitry 1945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1945 may include a Micro-Technology for Positioning, Navigation, and Timing (Micro-PNT) IC that uses a master timing clock to perform position tracking/estimation without GNSS assistance. The positioning circuitry 1945 may also be part of, or interact with, the communication circuitry 1966 to communicate with the nodes and components of the positioning network. The positioning circuitry 1945 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1945 is, or includes an INS, which is a system or device that uses sensor circuitry 1972 (e.g., motion sensors such as accelerometers, rotation sensors such as gyroscopes, and altimimeters, magentic sensors, and/or the like to continuously calculate (e.g., using dead by dead reckoning, triangulation, or the like) a position, orientation, and/or velocity (including direction and speed of movement) of the platform 1950 without the need for external references.

In some optional examples, various input/output (I/O) devices may be present within or connected to, the edge computing node 1950, which are referred to as input circuitry 1986 and output circuitry 1984 in FIG. 19. The input circuitry 191886 and output circuitry 1984 include one or more user interfaces designed to enable user interaction with the platform 1950 and/or peripheral component interfaces designed to enable peripheral component interaction with the platform 1950. Input circuitry 1986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1984 may be included to show information or otherwise convey information, such as sensor readings, actuator position(s), or other like information. Data and/or graphics may be displayed on one or more user interface components of the output circuitry 1984. Output circuitry 1984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1950. The output circuitry 1984 may also include speakers or other audio emitting devices, printer(s), and/or the like. In some embodiments, the sensor circuitry 191872 may be used as the input circuitry 1984 (e.g., an image capture device, motion capture device, or the like) and one or more actuators 1974 may be used as the output device circuitry 1984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1976 may power the edge computing node 1950, although, in examples in which the edge computing node 1950 is mounted in a fixed location, it may have a power supply coupled to an electrical grid, or the battery may be used as a backup or for temporary capabilities. The battery 1976 may be a lithium ion battery, or a metal-air battery, such as a zinc-air battery, an aluminum-air battery, a lithium-air battery, and the like.

A battery monitor/charger 1978 may be included in the edge computing node 1950 to track the state of charge (SoCh) of the battery 1976, if included. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1978 may communicate the information on the battery 1976 to the processor 1952 over the IX 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the edge computing node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the edge computing node 1950. A wireless battery charging circuit, such as an LTC4020 chip from Linear Technologies of Milpitas, California, among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1982 in the form of software, firmware, or hardware commands to implement the techniques described herein. Although such instructions 1982 are shown as code blocks included in the memory 1954 and the storage 1958, it may be understood that any of the code blocks may be replaced with hardwired circuits, for example, built into an application specific integrated circuit (ASIC).

In an example, the instructions 1882 provided via the memory 1954, the storage 1958, or the processor 1952 may be embodied as a non-transitory, machine-readable medium 1960 including code to direct the processor 1952 to perform electronic operations in the edge computing node 1950. The processor 1952 may access the non-transitory, machine-readable medium 1960 over the IX 1956. For instance, the non-transitory, machine-readable medium 1960 may be embodied by devices described for the storage 1958 or may include specific storage units such as optical disks, flash drives, or any number of other hardware devices. The non-transitory, machine-readable medium 1960 may include instructions to direct the processor 1952 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 20:
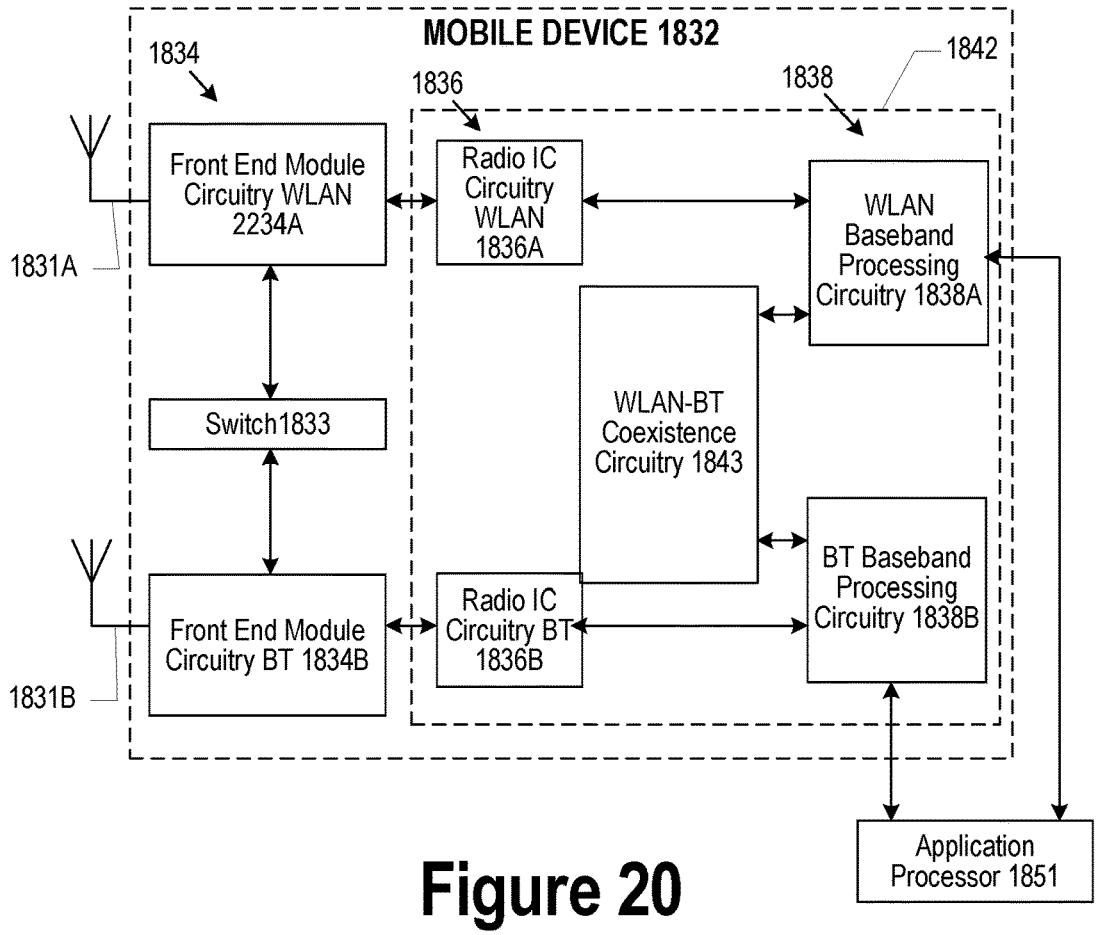
FIG. 20 depicts an example mobile computing device in an edge computing system.

FIG. 20 depicts communication components within an example mobile device 1832. This mobile device 1832 provides a closer view of the communication processing components of node 1800 or device 1850 when implemented as a user equipment or a component of a user equipment. The mobile device 1832 may include radio front-end module (FEM) circuitry 1834, radio IC circuitry 1836 and baseband processing circuitry 1838. The mobile device 1832 as shown includes both Wireless Local Area Network (WLAN) functionality and Bluetooth (BT) functionality although aspects of the device are not so limited, and other radio technologies discussed herein may be implemented by similar circuitry. FEM circuitry 1834 may include, for example, a WLAN or Wi-Fi FEM circuitry 1834A and a Bluetooth (BT) FEM circuitry 1834B. The WLAN FEM circuitry 1834A may include a receive signal path comprising circuitry configured to operate on WLAN RF signals received from one or more antennas 1831A, to amplify the received signals and to provide the amplified versions of the received signals to the WLAN radio IC circuitry 1836A for further processing. The BT FEM circuitry 1834B may include a receive signal path which may include circuitry configured to operate on BT RF signals received from one or more antennas 1831B, to amplify the received signals and to provide the amplified versions of the received signals to the BT radio IC circuitry 1836B for further processing. FEM circuitry 1834A may also include a transmit signal path which may include circuitry configured to amplify WLAN signals provided by the radio IC circuitry 1836A for wireless transmission by one or more of the antennas 1831A. In addition, FEM circuitry 1834B may also include a transmit signal path which may include circuitry configured to amplify BT signals provided by the radio IC circuitry 1836B for wireless transmission by the one or more antennas 1831B. In the example of FIG. 20, although FEM 1834A and FEM 1834B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1836 as shown may include WLAN radio IC circuitry 1836A and BT radio IC circuitry 1836B. The WLAN radio IC circuitry 1836A may include a receive signal path which may include circuitry to down-convert WLAN RF signals received from the FEM circuitry 1834A and provide baseband signals to WLAN baseband processing circuitry 1838A. BT radio IC circuitry 1836B may in turn include a receive signal path which may include circuitry to down-convert BT RF signals received from the FEM circuitry 1834B and provide baseband signals to BT baseband processing circuitry 1838B. WLAN radio IC circuitry 1836A may also include a transmit signal path which may include circuitry to up-convert WLAN baseband signals provided by the WLAN baseband processing circuitry 1838A and provide WLAN RF output signals to the FEM circuitry 1834A for subsequent wireless transmission by the one or more antennas 1831A. BT radio IC circuitry 1836B may also include a transmit signal path which may include circuitry to up-convert BT baseband signals provided by the BT baseband processing circuitry 1838B and provide BT RF output signals to the FEM circuitry 1834B for subsequent wireless transmission by the one or more antennas 1831B. In the example of FIG. 20, although radio IC circuitries 1836A and 1836B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1838 may include a WLAN baseband processing circuitry 1838A and a BT baseband processing circuitry 1838B. The WLAN baseband processing circuitry 1838A may include a memory, such as, for example, a set of RAM arrays in a Fast Fourier Transform or Inverse Fast Fourier Transform block (not shown) of the WLAN baseband processing circuitry 1838A. Each of the WLAN baseband circuitry 1838A and the BT baseband circuitry 1838B may further include one or more processors and control logic to process the signals received from the corresponding WLAN or BT receive signal path of the radio IC circuitry 1836, and to also generate corresponding WLAN or BT baseband signals for the transmit signal path of the radio IC circuitry 1836. Each of the baseband processing circuitries 1838A and 1838B may further include physical layer (PHY) and medium access control layer (MAC) circuitry, and may further interface with application processor 1851 (or, in other examples, processor circuitry 1850) for generation and processing of the baseband signals and for controlling operations of the radio IC circuitry 1836.

Referring still to FIG. 20, according to the illustrated aspects, WLAN-BT coexistence circuitry 1843 may include logic providing an interface between the WLAN baseband circuitry 1838A and the BT baseband circuitry 1838B to enable use cases requiring WLAN and BT coexistence. In addition, a switch 1833 may be provided between the WLAN FEM circuitry 1834A and the BT FEM circuitry 1834B to allow switching between the WLAN and BT radios according to application needs. In addition, although the antennas 1831A, 1831B are depicted as being respectively connected to the WLAN FEM circuitry 1834A and the BT FEM circuitry 1834B, aspects of the present disclosure include within their scope the sharing of one or more antennas as between the WLAN and BT FEMs, or the provision of more than one antenna connected to each of FEM 1834A or 1834B.

In some aspects of the present disclosure, the front-end module circuitry 1834, the radio IC circuitry 1836, and baseband processing circuitry 1838 may be provided on a single radio card. In other aspects, the one or more antennas 1831A, 1831B, the FEM circuitry 1834 and the radio IC circuitry 1836 may be provided on a single radio card. In some other aspects of the present disclosure, the radio IC circuitry 1836 and the baseband processing circuitry 1838 may be provided on a single chip or integrated circuit (IC).

Figure 21:
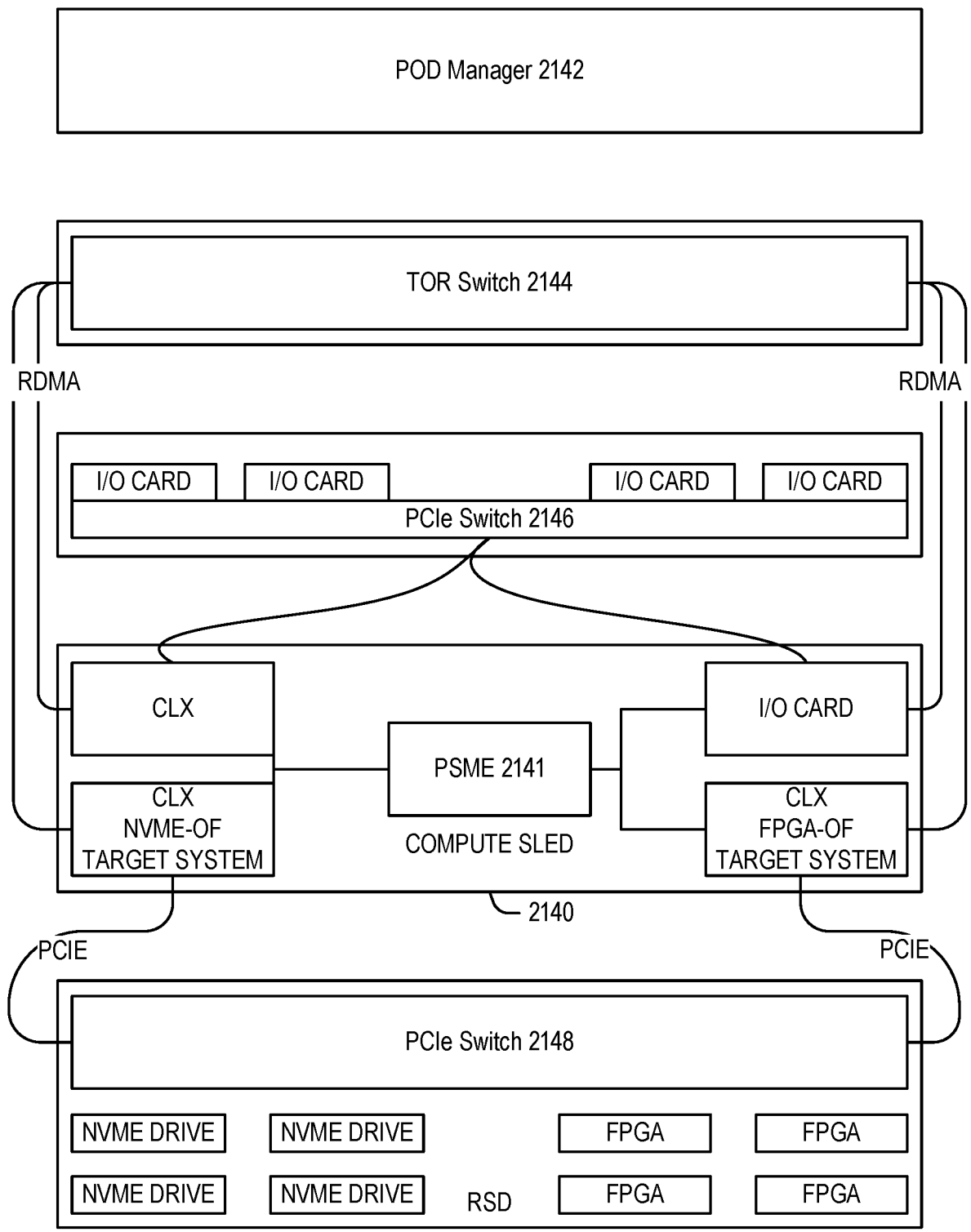
FIG. 21 depicts an example of a configurable server rack in an edge computing system.

FIG. 21 illustrates Rack Scale Design (RSD) components that may be included a part of a server or other discrete compute node in an edge platform architecture. This arrangement provides a closer view of the configurable processing components of node 1800 or device 1950 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible NFs. This architecture enables scaling network interfaces according to the expected data rate or network load for a particular VNF. This architecture also enables flexibility to map different network cards to compute nodes depending on the type of network processing happening at a given node.

The illustrated RSD architecture includes a point of delivery (POD) Manager 2142. The POD Manager 2142 is responsible of managing the resources—including compute and disaggregated resources—within a POD (e.g., one or more racks). The POD Manager 2142 exposes interfaces to an orchestrator in order to create, manage, or destroy composed nodes. Managing a composed node includes the feature of scaling up or down the amount of pooled resources 2148 connected to a particular compute sled 2140. The POD Manager 2142 typically runs on a node controller. The POD Manager 2142 is responsible for discovery of resources in the POD, configuring and managing the resources, and composing a logical server. In an example, the POD Manager 2142 is an optional separate component and will not be required in-rack. However, in an example, to be "RSD conformant" a Rack is manageable by a certified POD Manager.

The following are some example attributes of a POD Manager 2142. For example, a rack may include a set of compute sleds 2140 used to execute edge services and other related system software stacks (e.g., such as orchestration or other system services). One type of compute sled 2140 may be a Pooled Resources Sled. This compute sled 2140 may manage a set of disaggregated resources. Here, a compute sled 1840 may include a pooled System Management Engine software (PSME) 2141. The PSME 2141 provides a management interface to manage the modules or blades at a drawer level. In an example, a rack contains one or more logical PSME(s). For example, each drawer may have a PSME or server drawers may share a PSME, or a PSME may run on a top-of-rack (TOR) 2144 switch or on a separate host. In an example, the PSME 2141 supports the RSD APIs.

In an example, the compute sled 2140 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 2146 providing access to the target resources (FPGA or NVME in the RSD 2148).

Various RSD edge-composed node flavors may be used in the compute sled 2140 to run edge services. Services running on those nodes may use client software libraries or drivers to provide transparent access to the disaggregated FPGAS and NVME in the RSD 2148. In a further example, the rack includes one or more PCIe switches connecting the compute sleds 2140 to a set of disaggregated resources (e.g., RSD 2148).

The illustrations of FIGS. 18, 19, 20, and 21 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 18, 19, 20, and 21 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

IV. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method of operating a MEC host co-located with network access infrastructure, the method comprising: receiving a request message for predicted Quality of Service (QoS) for wireless communication service along a planned route of a vehicular user equipment (vUE), the request message including location information (LocationInfo) for each point of at least two points along the planned route and a timestamp for each point of the at least two points; and determining in response to receipt of the request message, the predicted QoS for the wireless communication service for the vUE along the planned route based on the location and the timestamp for each point.

Example 2a includes the method of example 1 and/or some other example(s) herein, wherein the request message further comprises a routes data element, the routes data element including information related to a potential route of the vUE.

Example 2b includes the method of example 2a and/or some other example(s) herein, wherein the request message further comprises a predicted QoS data structure, and the predicted QoS data structure includes the routes data element.

Example 3a includes the method of examples 1-2a and/or some other example(s) herein, wherein the routes data element comprises a route information (routeInfo) data element for each point of the at least two points.

Example 3b includes the method of example 2b and/or some other example(s) herein, wherein the predicted QoS data structure includes the routes data element, and a routeInfo data element for each point of the at least two points.

Example 4 includes the method of examples 3a-3b and/or some other example(s) herein, wherein a first routeInfo data element included in the routes data element corresponds to an origin of the planned route, and a last routeInfo data element included in the routes data element corresponds to a destination of the planned route.

Example 5 includes the method of example 4 and/or some other example(s) herein, wherein the routes data element further comprises one or more intermediate routeInfo data elements, each of which corresponds to a respective intermediate point between the origin of the planned route and the destination of the planned route.

Example 6 includes the method of examples 3a-5 and/or some other example(s) herein, wherein the routeInfo data element for each point comprises a location data element including the LocationInfo and a time data element including the timestamp.

Example 7 includes the method of example 6 and/or some other example(s) herein, wherein the LocationInfo includes latitude and longitude coordinates or a global cell identifier of a cell serving to which the vUE is attached, and the timestamp is an estimated time at a location indicated by the LocationInfo.

Example 8a includes the method of examples 3a-6, and/or some other example(s) herein, wherein the request message further comprises a time granularity data element and a location granularity data element, the time granularity data element including timestamp value indicating a time granularity of visiting a location and the location granularity data element including a string indicating a granularity of a visited location by latitudinal and longitudinal margins measured in meters.

Example 8b includes the method of example 8a and/or some other example(s) herein, wherein the time granularity data element and the location granularity data element are included in the predicted QoS data structure.

Example 9a includes the method of examples 1-8b and/or some other example(s) herein, further comprising: generating a response message including a radio measurement for each point along the planned route; and transmitting the response message to the vUE.

Example 9b includes the method of example 9a and/or some other example(s) herein, further comprising: generating the response message to include another predicted QoS data structure, the other predicted QoS data structure including the radio measurement for each point along the planned route.

Example 10a includes the method of examples 9a-9b and/or some other example(s) herein, wherein the response message further comprises another routes data element, the other routes data element comprises another routeInfo data element for each point of the at least two points, and the routeInfo data element for each point comprises a location data element including LocationInfo of a corresponding point of the at least two points, a reference signal received power (rsrp) data element including a predicted rsrp value for the corresponding point, and a reference signal received quality (rsrq) data element including a predicted rsrq value for the corresponding point.

Example 10b includes the method of example 10a and/or some other example(s) herein, wherein the other predicted QoS data structure comprises the other routes data element.

Example 11 includes the method of example 10 and/or some other example(s) herein, wherein a first other routeInfo data element included in the other routes data element corresponds to an origin of the planned route, a last other routeInfo data element included in the other routes data element corresponds to a destination of the planned route, and one or more other intermediate routeInfo data elements included in the other routes data element correspond to a respective intermediate points between the origin of the planned route and the destination of the planned route.

Example 12 includes the method of examples 9-11, wherein the request and the response are communicated over a VIS application programming interfaces (API).

Example 13 includes the method of examples 1-12 and/or some other example(s) herein, wherein, determining the predicted QoS for the vUE along the planned route comprises: identifying space-time correlations between radio information collected by one or more other vUEs and the at least two points along the planned route.

Example 14a includes the method of examples 1-13 and/or some other example(s) herein, wherein, determining the predicted QoS for the vUE for the wireless communication service for the vUE along the planned route comprises: requesting information from a MEC information service via a corresponding MEC API; receiving the requested information from the MEC information service; and predicting radio signal quality at each point of the at least two points using the received information, wherein the MEC information service is a radio network information service, a MEC location service, a user identity service, a bandwidth management service, a wireless local area network access information service, or a Fixed Access Information Service. Example 14b, includes the method of example 14a and/or some other example(s) herein, wherein the radio signal quality prediction indicates a level or amount of network congestion.

Example 15 includes a method of operating a vUE, the method comprising: generating a request message to request a Quality of Service (QoS) prediction for Vehicle-to-Everything (V2X) services along a planned route, the request message including a predicted QoS data structure, the predicted QoS data structure including location information (LocationInfo) for each point of at least two points along the planned route and a timestamp for each point of the at least two points; and transmitting the request message to a Multi-access Edge Computing (MEC) host via a V2X Information Services (VIS) Application Programming Interface (API); and receiving a response message from the MEC host via the VIS API, the response message including another predicted QoS data structure including a predicted QoS for the V2X services for each point of the at least two points.

Example 16 includes the method of example 15 and/or some other example(s) herein, wherein the predicted QoS data structure comprises a routes data element, the routes data element including a route information (routeInfo) data element for a corresponding point of the at least two points, and the routeInfo data element for the corresponding point comprises a location data element including the LocationInfo of the corresponding point and a time data element including the timestamp for the corresponding point.

Example 17 includes the method of example 16 and/or some other example(s) herein, wherein the corresponding point of a first routeInfo data element included in the routes data element is an origin point of the planned route, and the corresponding point of a last routeInfo data element included in the routes data element is a destination point of the planned route.

Example 18 includes the method of example 17 and/or some other example(s) herein, wherein the timestamp for the origin point is a time that the vUE visited a location indicated by the LocationInfo in the first routeInfo data element, and the timestamp for the destination point is a predicted time that the vUE will visit a location indicated by the LocationInfo in the last routeInfo data element.

Example 19 includes the method of examples 17-18 and/or some other example(s) herein, wherein the routes data element further comprises one or more intermediate routeInfo data elements, each intermediate routeInfo data element of the one or more intermediate routeInfo data elements corresponds to a waypoint between the origin point and the destination point.

Example 20 includes the method of example 19 and/or some other example(s) herein, wherein the timestamp for at least one waypoint is a time that the vUE visited a location indicated by the LocationInfo in the intermediate routeInfo data element corresponding to the at least one waypoint, and the timestamp for another waypoint point is a predicted time that the vUE will visit a location indicated by the LocationInfo in the routeInfo data element corresponding to the other waypoint.

Example 21 includes the method of examples 16-20 and/or some other example(s) herein, wherein the other predicted QoS data structure comprises another routes data element, the other routes data element including another routeInfo data element for the corresponding point of the at least two points, and the routeInfo data element for the corresponding point comprises: a location data element including the LocationInfo of the corresponding point, a time data element including the timestamp for the corresponding point, a reference signal received power (rsrp) data element including a predicted rsrp value at a location indicated by the LocationInfo of the corresponding point and during a time of the timestamp in the time data element, and a reference signal received quality (rsrq) data element including a predicted rsrq value at the location indicated by the LocationInfo of the corresponding point and during the time of the timestamp in the time data element.

Example 22 includes a method for obtaining journey-specific QoS predictions for V2X services, the method comprising: transmitting, by a vUE, a request for the journey-specific QoS predictions to a MEC host via a VIS API, the request indicating a planned route including an origin point, a destination point, and zero or more waypoints between the origin point and the destination point; and receiving, by the vUE, a response message from the MEC host via the VIS API, the response message including a predicted QoS for V2X services for the origin point, the destination point, and each of the zero or more waypoints.

Example 23a includes the method of example 22 and/or some other example(s) herein, further comprising: at each period of a determined radio information reporting periodicity, collecting radio information including one or more radio measurement reports; and transmitting the radio information to the MEC host via the VIS API or another MEC API.

Example 23b includes the method of examples 22-23a and/or some other example(s) herein, further comprising: determining whether to perform a data transfer at each point of the at least two points based on the predicted QoS for each point.

Example 24 includes a method comprising instructions for providing journey-specific QoS predictions for network service, the method comprising: receiving, by a MEC host, a request for the journey-specific QoS predictions from a vehicular user equipment (vUE) via a Vehicle-to-Everything Information Services (VIS) Application Programming Interface (API), the request indicating a planned route of the vUE, the planned route including an origin point, a destination point, and zero or more waypoints planned to be visited at certain points in time between the origin point and the destination point; obtaining, by the MEC host, radio information from one or more vUEs and other information from one or more other MEC hosts using a corresponding MEC API; determining, by the MEC host, a predicted QoS for network service for each of the origin point, the destination point, and the zero or more waypoints based on the radio information and the other information; and sending, by the MEC host, a response message to the vUE via the VIS API, the response message including the predicted QoS for network service at the origin point, the destination point, and the zero or more waypoints at the times of interest.

Example 25 includes the method of example 24 and/or some other example(s) herein, wherein the other information is one or more of radio network information (RNI) obtained from an RNI service, location information obtained from a location service, user identity information obtained from a user identity service, bandwidth management (BWM) information obtained from a BWM service, a wireless local area network access information (WAI) obtained from a WAI service, and Fixed Access Information (FAI) obtained from an FAI service.

An example implementation is an edge computing system, including respective edge processing devices and nodes to invoke or perform the operations of examples 1-25, or other subject matter described herein. Another example implementation is a client endpoint node, operable to invoke or perform the operations of examples 1-25, or other subject matter described herein. Another example implementation is an aggregation node, network hub node, gateway node, or core data processing node, within or coupled to an edge computing system, operable to invoke or perform the operations of examples 1-25, or other subject matter described herein. Another example implementation is an access point, base station, road-side unit, street-side unit, or on-premise unit, within or coupled to an edge computing system, operable to invoke or perform the operations of examples 1-25, or other subject matter described herein. Another example implementation is an edge provisioning node, service orchestration node, application orchestration node, or multi-tenant management node, within or coupled to an edge computing system, operable to invoke or perform the operations of examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-25, or other subject matter described herein. Another example implementation is an edge computing system operable as an edge mesh, as an edge mesh with side car loading, or with mesh-to-mesh communications, operable to invoke or perform the operations of examples 1-25, or other subject matter described herein. Another example implementation is an edge computing system including aspects of network functions, acceleration functions, acceleration hardware, storage hardware, or computation hardware resources, operable to invoke or perform the use cases discussed herein, with use of examples 1-25, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-25, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-25, or other subject matter described herein.

Example Z01 includes an apparatus comprising means to perform one or more elements of a method described in or related to any of examples 1-25, or any other method or process described herein. Example Z02 includes one or more non-transitory computer-readable media comprising instructions, wherein execution of the instructions by an electronic device is operable to cause the electronic device to perform one or more elements of a method described in or related to any of examples 1-25, and/or any other method or process described herein. Example Z03 includes a computer program comprising instructions, wherein execution of the program by a processing element is operable to cause the processing element to carry out the method, techniques, or process as described in or related to any of examples 1-25, and/or portions thereof. Example Z04 includes an apparatus comprising logic, modules, or circuitry to perform one or more elements of a method described in or related to any of examples 1-25, and/or any other method or process described herein. Example Z05 includes an apparatus configured to perform one or more elements of a method described in or related to any of examples 1-25, and/or any other method or process described herein.

Example Z06 includes a method, technique, or process as described in or related to any of examples 1-25, and/or portions or parts thereof. Example Z07 includes an apparatus comprising: processor circuitry and computer-readable media comprising instructions, wherein the one or more processors are configurable to perform the method, techniques, or process as described in or related to any of examples 1-25, and/or portions thereof. Example Z08 includes a signal as described in or related to any of examples 1-25, and/or portions or parts thereof. Example Z09 includes a datagram, packet, frame, segment, protocol data unit (PDU), or message as described in or related to any of examples 1-25, or portions or parts thereof, and/or otherwise described in the present disclosure. Example Z10 includes a signal encoded with a datagram, packet, frame, segment, PDU, or message as described in or related to any of examples 1-25, or portions or parts thereof, or otherwise described in the present disclosure.

Example Z11 includes a signal encoded with data as described in or related to any of examples 1-25, or portions or parts thereof, or otherwise described in the present disclosure. Example Z12 includes an electromagnetic signal carrying computer-readable instructions, wherein execution of the computer-readable instructions by one or more processors is operable or configurable to cause the one or more processors to perform a method, technique, or process as described in or related to any of examples 1-25, or portions thereof. Example Z13 includes an API or specification defining functions, methods, variables, data structures, protocols, etc., defining or involving use of any of examples 1-25 or portions thereof, or otherwise related to any of examples 1-25 or portions thereof. Example Z14, includes a Multi-access Edge Computing (MEC) host executing a service as part of one or more MEC applications instantiated on a virtualization infrastructure, the service being related to any of examples 1-25 or portions thereof, and wherein the MEC host is configured to operate according to a standard from one or more ETSI MEC standards families.

Example Z15 includes a signal in a wireless network as shown and described herein. Example Z16 includes a method of communicating in a wireless network as shown and described herein. Example Z17 includes a system for providing wireless communication as shown and described herein. Example Z18 includes a device for providing wireless communication as shown and described herein.

V. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies (RATs).

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The term "Quality of Service" or "QoS' refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS refers to traffic prioritization and resource reservation control mechanisms rather than the achieved perception of service quality. In these cases, QoS is the ability to provide different priorities to different applications, users, or data flows, or to guarantee a certain level of performance to a data flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be employed as a Multi-access Edge Computing (MEC) host co-located with network access infrastructure, the apparatus comprising:
   interface circuitry arranged to receive a request message for predicted Quality of Service (QoS) for wireless communication service along a planned route of a vehicular user equipment (vUE), the request message including location information (LocationInfo) for each point of at least two points along the planned route and a timestamp for each point of the at least two points; and
   processor circuitry communicatively coupled with the interface circuitry, the processor circuitry arranged to determine, in response to receipt of the request message, the predicted QoS for the wireless communication service for the vUE along the planned route based on the LocationInfo and the timestamp for each point.

2. The apparatus of claim 1, wherein the request message further comprises a routes data element, the routes data element including information related to a potential route of the vUE.

3. The apparatus of claim 2, wherein the routes data element comprises a route information (routeInfo) data element for each point of the at least two points.

4. The apparatus of claim 3, wherein a first routeInfo data element included in the routes data element corresponds to an origin of the planned route, and a last routeInfo data element included in the routes data element corresponds to a destination of the planned route.

5. The apparatus of claim 4, wherein the routes data element further comprises one or more intermediate routeInfo data elements, each of which corresponds to a respective intermediate point between the origin of the planned route and the destination of the planned route.

6. The apparatus of claim 3, wherein the routeInfo data element for each point comprises a location data element including the LocationInfo and a time data element including the timestamp.

7. The apparatus of claim 6, wherein the LocationInfo includes latitude and longitude coordinates or a global cell identifier of a cell serving to which the vUE is attached, and the timestamp is an estimated time at a location indicated by the LocationInfo.

8. The apparatus of claim 3, wherein:
the request message further comprises a time granularity data element and a location granularity data element;
the time granularity data element including timestamp value indicating a time granularity of visiting a location; and
the location granularity data element including a string indicating a granularity of a visited location by latitudinal and longitudinal margins measured in meters.

9. The apparatus of claim 1, wherein:
the processor circuitry is arranged to generate a response message, including a radio measurement for each point along the planned route; and
the interface circuitry is arranged to send the response message to the vUE.

10. The apparatus of claim 9, wherein:
the response message further comprises a routes data element;;
the routes data element comprises a routeInfo data element for each point of the at least two points; and
the routeInfo data element for each point comprises a location data element, including:
LocationInfo of a corresponding point of the at least two points; a reference signal received power (rsrp) data element, including a predicted rsrp value for the corresponding point; and a reference signal received quality (rsrq) data element, including a predicted rsrq value for the corresponding point.

11. The apparatus of claim 10, wherein:
a first routeInfo data element included in the routes data element corresponds to an origin of the planned route;
a last routeInfo data element included in the routes data element corresponds to a destination of the planned route; and
one or more other intermediate routeInfo data elements included in the routes data element correspond to respective intermediate points between the origin of the planned route and the destination of the planned route.

12. The apparatus of claim 9, wherein the request and the response are communicated over a Vehicle-to-Everything Information Services (VIS) application programming interface (API).

13. The apparatus of claim 1, wherein, to determine the predicted QoS for the vUE along the planned route, the processor circuitry is arranged to:
identify space-time correlations between radio information collected by one or more other vUEs and the at least two points along the planned route.

14. The apparatus of claim 1, wherein, to determine the predicted QoS for the wireless communication service for the vUE along the planned route, the processor circuitry is arranged to:
request information from a MEC information service via a corresponding MEC application programming interface (API);
receive the requested information from the MEC information service; and
predict radio signal quality network at each point of the at least two points using the received information, wherein the MEC information service is a radio network information service, a MEC location service, a user identity service, a bandwidth management service, a wireless local area network access information service, or a Fixed Access Information Service.

15. One or more non-transitory computer-readable media (NTCRM) comprising instructions, wherein execution of the instructions by one or more processors of a computing device is to cause the computing device to:
receive a request message for predicted Quality of Service (QOS) for wireless communication service along a planned route of a vehicular user equipment (vUE), the request message including location information (LocationInfo) for each point of at least two points along the planned route and a timestamp for each point of the at least two points; and
determine, in response to receipt of the request message, the predicted QoS for the wireless communication service for the vUE along the planned route based on the LocationInfo and the timestamp for each point.

16. The one or more NTCRM of claim 15, wherein the request message further comprises a routes data element, the routes data element including information related to a potential route of the vUE.

17. The one or more NTCRM of claim 15, wherein execution of the instructions by the one or more processors is to cause the computing device to:
generate a response message including a radio measurement for each point along the planned route; and
send the response message to the vUE.

18. The one or more NTCRM of claim 15, wherein, to determine the predicted QoS for the vUE along the planned route, execution of the instructions by the one or more processors is to cause the computing device to:
identify space-time correlations between radio information collected by one or more other vUEs and the at least two points along the planned route.

19. The one or more NTCRM of claim 15, wherein, to determine the predicted QoS for the wireless communication service for the vUE along the planned route, execution of the instructions by the one or more processors is to cause the computing device to:
request information from a Multi-access Edge Computing (MEC) information service via a corresponding MEC application programming interface (API);
receive the requested information from the MEC information service; and
predict radio signal quality network at each point of the at least two points using the received information, wherein the MEC information service is a radio network information service, a MEC location service, a user identity service, a bandwidth management service, a wireless local area network access information service, or a Fixed Access Information Service.

20. A method in a Multi-access Edge Computing (MEC) host co-located with network access infrastructure, the method comprising:
- receiving a request message for predicted Quality of Service (QOS) for wireless communication service along a planned route of a vehicular user equipment (vUE), the request message including location information (LocationInfo) for each point of at least two points along the planned route and a timestamp for each point of the at least two points; and
- determining, in response to receipt of the request message, the predicted QoS for the wireless communication service for the vUE along the planned route based on the LocationInfo and the timestamp for each point.

21. The method of claim 20, wherein the request message further comprises a routes data element, the routes data element including information related to a potential route of the vUE.

22. The method of claim 20, further comprising:
- generating a response message including a radio measurement for each point along the planned route; and
- sending the response message to the vUE.

23. The method of claim 20, further comprising, to determine the predicted QoS for the VUE along the planned route, identifying space-time correlations between radio information collected by one or more other vUEs and the at least two points along the planned route.

24. The method of claim 20, further comprising, to determine the predicted QoS for the wireless communication service for the vUE along the planned route:
- request information from a MEC information service via a corresponding MEC application programming interface (API);
- receive the requested information from the MEC information service; and
- predict radio signal quality network at each point of the at least two points using the received information, wherein the MEC information service is a radio network information service, a MEC location service, a user identity service, a bandwidth management service, a wireless local area network access information service, or a Fixed Access Information Service.

* * * * *

UNITED STATES PATENT AND TRADEMARK OFFICE
CERTIFICATE OF CORRECTION

PATENT NO. : 12,156,071 B2
APPLICATION NO. : 17/437553
DATED : November 26, 2024
INVENTOR(S) : Miltiadis Filippou and Dario Sabella Page 1 of 1

It is certified that error appears in the above-identified patent and that said Letters Patent is hereby corrected as shown below:

In the Claims

Column 91
Line 37 "element;;" should read --element;--

Column 92
Line 23 "(QOS) for wireless communication service along a" should read --(QoS) for wireless communication service along a--

Column 93
Line 5 "Service (QOS) for wireless communication service" should read --Service (QoS) for wireless communication service--

Column 94
Line 2 "determine the predicted QoS for the VUE along the planned" should read --determine the predicted QoS for the vUE along the planned--

Signed and Sealed this
Twenty-sixth Day of August, 2025

Coke Morgan Stewart
*Acting Director of the United States Patent and Trademark Office*